US012658584B2

(12) United States Patent
Kim et al.

(10) Patent No.: US 12,658,584 B2
(45) Date of Patent: Jun. 16, 2026

(54) ANTENNA MODULE ARRANGED IN VEHICLE

(71) Applicant: LG ELECTRONICS INC., Seoul (KR)

(72) Inventors: Dongjin Kim, Seoul (KR); Kangjae Jung, Seoul (KR); Kukheon Choi, Seoul (KR); Byeongyong Park, Seoul (KR); Byungwoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/125,989

(22) PCT Filed: Nov. 15, 2022

(86) PCT No.: PCT/KR2022/017983
§ 371 (c)(1),
(2) Date: Apr. 30, 2025

(87) PCT Pub. No.: WO2024/106553
PCT Pub. Date: May 23, 2024

(65) Prior Publication Data

US 2026/0011919 A1 Jan. 8, 2026

(51) Int. Cl.
*H01Q 5/48* (2015.01)
*H01Q 1/42* (2006.01)
*H01Q 9/30* (2006.01)

(52) U.S. Cl.
CPC ............... *H01Q 5/48* (2015.01); *H01Q 1/422* (2013.01); *H01Q 9/30* (2013.01)

(58) Field of Classification Search
CPC ............ H01Q 5/48; H01Q 1/422; H01Q 9/30; H01Q 1/325
See application file for complete search history.

(56) References Cited

U.S. PATENT DOCUMENTS 5,792,298 A * 8/1998 Sauer .................. B29C 63/0095 156/230
2008/0169989 A1 7/2008 Li et al.
(Continued)

FOREIGN PATENT DOCUMENTS

CN 102468531 5/2012
EP 2458672 8/2016
(Continued)

OTHER PUBLICATIONS

PCT International Application No. PCT/KR2022/017983, Written Opinion of the International Searching Authority dated Aug. 8, 2023, 4 pages.
(Continued)

*Primary Examiner* — Dieu Hien T Duong
(74) *Attorney, Agent, or Firm* — LEE, HONG, DEGERMAN, KANG & WAIMEY

(57) ABSTRACT

This antenna assembly includes: a first dielectric substrate which forms a transparent area and has formed therein a first conductive pattern and a second conductive pattern; and a second dielectric substrate which forms an opaque area and has formed therein a ground conductive pattern and a feeding pattern. The ground conductive pattern of the second dielectric substrate may include a first region and a second region. The first region of the ground conductive pattern may be connected to a ground of a coaxial cable, and a portion of the first region may be connected to the second conductive pattern. The second region of the ground conductive pattern may be configured to operate as a radiator of an Ultra High Band (UHB), which is a higher frequency band than operating frequency bands of the first conductive pattern and the second conductive pattern.

20 Claims, 39 Drawing Sheets

(56) References Cited

U.S. PATENT DOCUMENTS

| | | | | |
|---|---|---|---|---|
| 2008/0180332 | A1 | 7/2008 | Noro et al. | |
| 2008/0198084 | A1* | 8/2008 | Yeap | H01Q 9/26<br>343/795 |
| 2013/0033411 | A1 | 2/2013 | Tsai et al. | |

FOREIGN PATENT DOCUMENTS

| | | |
|---|---|---|
| EP | 4554001 | 5/2025 |
| JP | 2020162120 | 10/2020 |
| KR | 10-2022-0131335 | 9/2022 |

OTHER PUBLICATIONS

European Patent Office Application Serial No. 22965874.5, Search Report dated Jul. 8, 2025, 8 pages.

* cited by examiner (a)

(b)

(a)

(b)

(a)

(b)

(a)

(b)

(a)

(b)

(b)

(a)

(b)

(a)

(b)

(a)

(b)

(a)

(b)

(a)

(b)

(a)

(b)

(a)

(b)

(a)

(b)

ANTENNA MODULE ARRANGED IN VEHICLE

CROSS-REFERENCE TO RELATED APPLICATION

This application is the National Stage filing under 35 U.S.C. 371 of International Application No. PCT/KR2022/017983, filed on Nov. 15, 2022, the contents of which are hereby incorporated by reference herein its entirety.

TECHNICAL FIELD

The present specification relates to a transparent antenna disposed on a vehicle. One or more embodiments relate to an antenna assembly made of a transparent material to suppress an antenna region from being visible on vehicle glass.

BACKGROUND ART

A vehicle may perform wireless communication services with other vehicles, nearby objects, infrastructures, or a base station. In this regard, various communication services may be provided through a wireless communication system to which an LTE communication technology or a 5G communication technology is applied. Meanwhile, some of LTE frequency bands may be allocated for 5G communication services.

Meanwhile, a vehicle body and a vehicle roof are formed of a metallic material, which causes a problem of blocking radio waves. Accordingly, a separate antenna structure may be disposed on top of the vehicle body or roof. Alternatively, when the antenna structure is disposed below the vehicle body or roof, a portion of the vehicle body or roof corresponding to an antenna arrangement region may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

In relation to this, to increase communication capacity without a change in the exterior design of the vehicle, a transparent antenna may be disposed on glass corresponding to a window of the vehicle. However, antenna radiation efficiency and impedance bandwidth characteristics are deteriorated due to electrical loss of the transparent antenna.

When an antenna pattern is formed with a metal mesh structure in which metal lines are interconnected on a dielectric substrate, a transparent antenna in which the metal lines are not visually distinguishable may be implemented. However, when a metal mesh structure is not formed in a dielectric region surrounding an antenna region where an antenna pattern is formed, there is a problem in that the antenna region and the dielectric region are visually distinguished, causing a difference in visibility.

To solve the problem, dummy mesh grids may be arranged even in the dielectric region, but as the dummy mesh grids are arranged, interference occurs between the dummy mesh grids and the antenna pattern, causing a problem in that antenna performance degrades.

Meanwhile, when a transparent antenna is arranged on vehicle glass, the transparent antenna for the vehicle may be electrically connected to a feeding pattern arranged on a separate dielectric substrate. In this regard, the transparent antenna for the vehicle is designed primarily for the performance of an antenna itself placed on a glass panel, which has a problem in that an actual attachment environment to the vehicle is not sufficiently reflected. This causes a problem that antenna resonance characteristics and antenna performance deteriorate depending on a location where the transparent antenna for the vehicle is attached and a direction in which a metal chassis of a vehicle body and cables for feeding are arranged.

DISCLOSURE OF INVENTION

Technical Problem

One aspect of the specification is to solve the aforementioned problems and other drawbacks. Another aspect of the specification is to provide a broadband transparent antenna assembly that may be arranged on vehicle glass.

Still another aspect of the specification is to improve antenna efficiency of a broadband transparent antenna assembly that may be disposed on vehicle glass.

Still another aspect of the specification is to provide a broadband antenna structure made of a transparent material that is capable of reducing feeding loss and improving antenna efficiency while operating in a wide band.

Still another aspect of the specification is to provide a method of designing a broadband antenna considering an actual attachment environment to a vehicle by analyzing the change in antenna performance according to the affection by a metal chassis as well as a glass panel of the vehicle and a cable structure.

Still another aspect of the specification is to provide a coplanar waveguide (CPW) flexible printed circuit board (FPCB) stub structure to improve an antenna performance degradation phenomenon in an ultra-high band (UHB) band of 4 GHz to 6 GHz due to a coaxial cable which is arranged perpendicular to a CPW feeding line.

Solution to Problem

To achieve those aspects and other advantages of the disclosure, there is provided an antenna assembly including a first dielectric substrate forming a transparent region and including a first conductive pattern and a second conductive pattern, and a second dielectric substrate forming an opaque region and including a ground conductive pattern and a feeding pattern. The ground conductive pattern of the second dielectric substrate may include a first region and a second region. The first region of the ground conductive pattern may be connected to a ground of a coaxial cable, and a portion of the first region may be connected to the second conductive pattern. The second region of the ground conductive pattern may operate as a radiator of an ultra high band (UHB), which is a frequency band higher than operating frequency bands of the first conductive pattern and the second conductive pattern.

In an embodiment, the first conductive pattern may include a first part and a second part perpendicular to the first part. The second conductive pattern may include a third part and a second fourth perpendicular to the third part. The second part of the first conductive pattern may be connected to the feeding pattern, and the fourth part of the second conductive pattern may be connected to the first region of the ground conductive pattern.

In an embodiment, a signal line corresponding to one end of the coaxial cable may be connected to the feeding pattern. The ground of the coaxial cable may be connected to a contact portion formed concavely to receive the coaxial cable, and the contact portion may be arranged in a first sub-region of the first region of the ground conductive pattern.

In an embodiment, the first region of the ground conductive pattern may include the first sub-region and a second sub-region. A second length of the second sub-region may be longer than a first length of the first sub-region in a first axial direction. A second width of the second sub-region may be narrower than a first width of the first sub-region in a second axial direction. The coaxial cable may be arranged spaced apart from the second sub-region.

In an embodiment, the second part of the first conductive pattern may be connected to the signal line of the coaxial cable through the feeding pattern. The fourth part of the second conductive pattern may be connected to the ground of the coaxial cable through the first sub-region of the second region of the ground conductive pattern.

In an embodiment, the second region of the ground conductive pattern may include a third sub-region arranged spaced apart from one end of the feeding pattern, and formed in a rectangular shape having a first width in the second axial direction, and a fourth sub-region connected to the third sub-region, and formed in a rectangular shape having a third width narrower than the first width in the second axial direction.

In an embodiment, the second region of the ground conductive pattern may include a third sub-region arranged spaced apart from one end of the feeding pattern, and formed in a triangular shape with a certain angle of inclination, and a fourth sub-region connected to the third sub-region and formed in a rectangular shape.

In an embodiment, a length from the contact portion to an end of the fourth sub-region of the second region of the ground conductive pattern may be in a range of 0.5 to 1 time a specific wavelength corresponding to a specific frequency of the UHB.

In an embodiment, the second region of the ground conductive pattern may be arranged below the second part of the first conductive pattern.

In an embodiment, the first conductive pattern and the second conductive pattern may be formed at a first height in the second axial direction. The fourth part of the second conductive pattern may include a slot region from which a conductive pattern has been removed by a second height. The second height of the slot region may be at least 0.5 times the first height.

In an embodiment, the first conductive pattern and the second conductive pattern may operate in a dipole antenna mode in the first frequency band. The first conductive pattern and the third conductive pattern may form an asymmetrical structure. The first part of the first conductive pattern may have an upper end and a lower end each formed in a step shape, and the third part of the second conductive pattern may have a lower end formed in a step shape.

In an embodiment, the first conductive pattern may operate in a monopole antenna mode in a second frequency band. The second region of the ground conductive pattern may operate as a radiator in the third frequency band. The second frequency band may be higher than the first frequency band, and the third frequency band may be higher than the second frequency band.

In an embodiment, the first conductive pattern and the second conductive pattern may be formed in a metal mesh shape with a plurality of open regions on the first dielectric substrate. The first conductive pattern and the second conductive pattern may form a radiator region. The first conductive pattern and the second conductive pattern may form a coplanar waveguide (CPW) structure on the first dielectric substrate.

In an embodiment, the antenna assembly may include a plurality of dummy mesh grid patterns on an outer portion of the radiator region on the first dielectric substrate. The plurality of dummy mesh grid patterns may not be connected to the feeding pattern and the ground conductive pattern. The plurality of dummy mesh grid patterns may be separated from each other.

According to another aspect of the specification, a vehicle includes: a metal frame in which an opening is formed; a glass panel including a transparent region and an opaque region; and an antenna assembly arranged on the glass panel. The antenna assembly may include a first dielectric substrate forming a transparent region and including a first conductive pattern and a second conductive pattern; and a second dielectric substrate forming an opaque region and including a ground conductive pattern and a feeding pattern. The ground conductive pattern of the second dielectric substrate may include a first region and a second region. The first region of the ground conductive pattern may be connected to a ground of a coaxial cable, and a portion of the first region may be connected to the second conductive pattern. The second region of the ground conductive pattern may operate as a radiator of an ultra high band (UHB), which is a frequency band higher than operating frequency bands of the first conductive pattern and the second conductive pattern.

In an embodiment, the first conductive pattern may include a first part and a second part perpendicular to the first part. The second conductive pattern may include a third part and a second fourth perpendicular to the third part. The second part of the first conductive pattern may be connected to the feeding pattern, and the fourth part of the second conductive pattern may be connected to the first region of the ground conductive pattern.

In an embodiment, a signal line corresponding to one end of the coaxial cable may be connected to the feeding pattern. The ground of the coaxial cable may be connected to a contact portion formed concavely to receive the coaxial cable, and the contact portion may be arranged in a first sub-region of the second region of the ground conductive pattern.

In an embodiment, the first region of the ground conductive pattern may include the first sub-region and a second sub-region. A second length of the second sub-region may be longer than a first length of the first sub-region in a first axial direction. A second width of the second sub-region may be narrower than a first width of the first sub-region in a second axial direction. The coaxial cable may be arranged spaced apart from the second sub-region.

In an embodiment, the second part of the first conductive pattern may be connected to the signal line of the coaxial cable through the feeding pattern. The fourth part of the second conductive pattern may be connected to the ground of the coaxial cable through the first sub-region of the second region of the ground conductive pattern.

In an embodiment, the second region of the ground conductive pattern may include a third sub-region arranged spaced apart from one end of the feeding pattern, and formed in a triangular shape with a certain angle of inclination, and a fourth sub-region connected to the first sub-region and formed in a rectangular shape.

In an embodiment, a length from the contact portion to an end of the fourth sub-region of the second region of the ground conductive pattern may be in a range of 0.5 to 1 time a specific wavelength corresponding to a specific frequency of the first frequency band.

In an embodiment, the first conductive pattern and the second conductive pattern may operate in a dipole antenna mode in the first frequency band. The first conductive pattern and the third conductive pattern may form an asymmetrical structure. The first part of the first conductive pattern may have an upper end and a lower end each formed in a step shape, and the third part of the second conductive pattern may have a lower end formed in a step shape. The first conductive pattern may operate in a monopole antenna mode in a second frequency band. The second region of the ground conductive pattern may operate as a radiator in the third frequency band. The second frequency band may be higher than the first frequency band, and the third frequency band may be higher than the second frequency band.

Advantageous Effects of Invention

Hereinafter, the technical effects of a broadband transparent antenna assembly that may be disposed on vehicle glass will be described.

According to the specification, 4G/5G broadband wireless communications in a vehicle may be enabled by providing a broadband transparent antenna assembly, which may be arranged on vehicle glass and includes conductive patterns and an FPCB stub structure.

According to the specification, antenna efficiency may be improved by optimizing the shapes of conductive patterns and an FPCB stub shape and employing an asymmetrical antenna structure in a broadband transparent antenna assembly, which may be arranged on vehicle glass.

According to the specification, a broadband antenna structure made of a transparent material may be implemented, which can improve antenna efficiency by setting a different antenna operation mode for each frequency band while reducing feeding loss.

According to the specification, a broadband antenna structure considering an actual environment, in which the broadband antenna structure is attached to a vehicle, by analyzing the change in antenna performance according to the affection by a metal chassis as well as a glass panel of the vehicle and a cable structure.

According to the specification, a CPW FPCB stub structure may be provided to improve degradation of antenna performance in a UHB band of 4 GHz to 6 GHz due to a coaxial cable, which is arranged perpendicular to a CPW feeding line.

According to the specification, a transparent antenna structure, which enables wireless communications in 4G and 5G frequency bands while minimizing changes in antenna performance and a difference in transparency between an antenna region and a surrounding region, may be provided.

Further scope of applicability of the disclosure will become apparent from the following detailed description. It should be understood, however, that the detailed description and specific examples, such as the preferred embodiments, are given by way of illustration only, since various changes and modifications within the technical idea and scope of the disclosure will be apparent to those skilled in the art.

MODE FOR THE INVENTION

Figure 1:
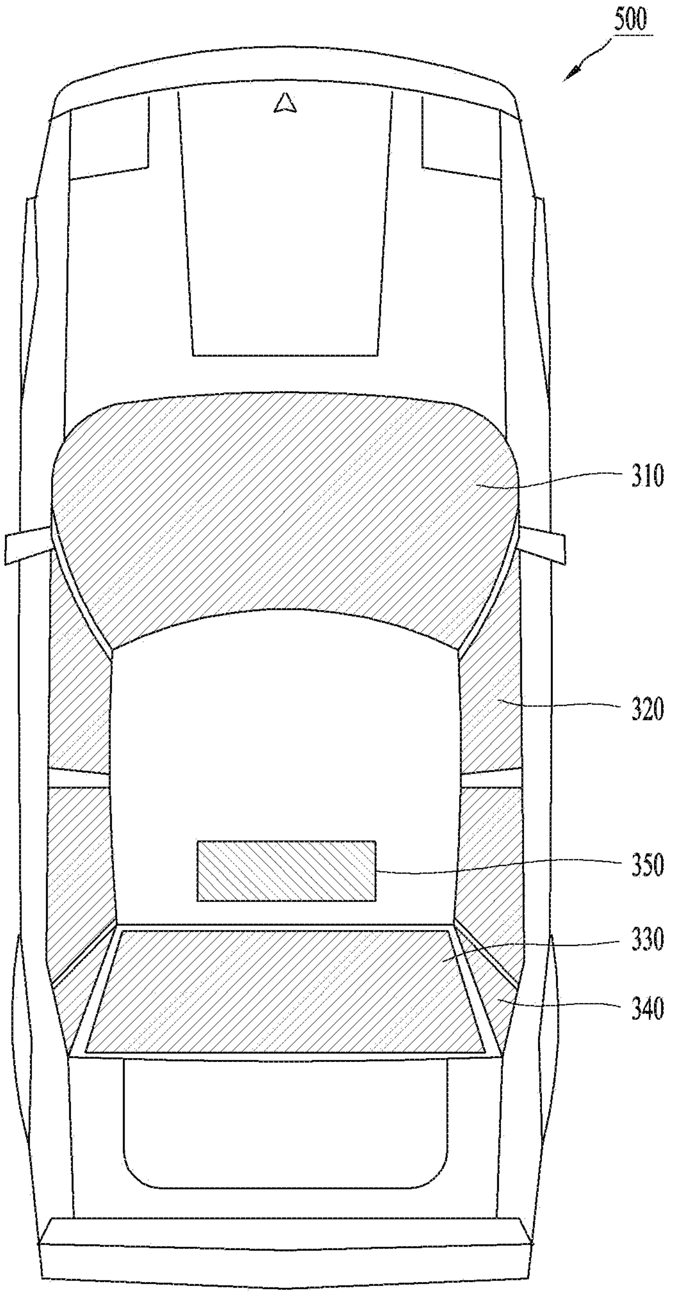
FIG. 1 is a diagram of vehicle glass on which an antenna structure according to an embodiment is to be disposed.

A description will now be given in detail according to one or more embodiments disclosed herein, with reference to the accompanying drawings. For the sake of a brief description with reference to the drawings, the same or like components regardless reference numerals may be assigned the same reference numeral, and a redundant description thereof will be omitted. Suffixes "module" and "unit" used for elements disclosed in the following description are merely intended for easy description of the specification, and each suffix itself is not intended to give any special meaning or function. In describing the embodiments disclosed herein, moreover, the detailed description will be omitted when a specific description for publicly known technologies to which the invention pertains is judged to obscure the gist of the disclosure. The accompanying drawings are used to help easily understand various technical features, and it should be understood that the embodiments presented herein are not limited by the accompanying drawings. As such, the disclosure should be construed to extend to any alterations, equivalents, and substitutes in addition to those which are particularly set forth in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected to" or "coupled to" another element, the element may be connected to or coupled to the another element or intervening elements may also be present. In contrast, when an element is referred to as being "directly connected to" or "coupled to" another element, there are no intervening elements present.

A singular representation may include a plural representation unless mentioned clearly and differently in context.

In this application, the terms "comprising," "including," "having," etc. should not be construed to necessarily include all of the features, numbers, steps, operations, components, elements, or combinations thereof disclosed herein, and should be construed not to include some of the features, numbers, steps, operations, components, elements, or combinations thereof, or should be construed to further include additional features, numbers, steps, operations, components, elements, or combinations thereof.

An antenna system described herein may be mounted on a vehicle. Configurations and operations according to embodiments may also be applied to a communication system, namely, an antenna system mounted on a vehicle. In this regard, the antenna system mounted on the vehicle may include a plurality of antennas, and a transceiver circuit and a processor both configured to control the plurality of antennas.

Hereinafter, a description will be given of an antenna assembly (antenna module) that may be disposed on a window of a vehicle according to the disclosure, and an antenna system for a vehicle that includes the antenna assembly. In this regard, the antenna assembly may refer to a structure in which conductive patterns are combined on a dielectric substrate, and may also be referred to as an antenna module.

In this regard, FIG. 1 illustrates glass of a vehicle on which an antenna structure according to an embodiment may be arranged. Referring to FIG. 1, a vehicle 500 may include front glass 310, door glass 320, rear glass 330, and quarter glass 340. In some examples, the vehicle 500 may further include top glass 350 disposed on a roof in an upper region.

Therefore, the glass constituting the window of the vehicle 500 may include the front glass 310 disposed in a front region of the vehicle, the door glass 320 disposed in a door region of the vehicle, and the rear glass 330 disposed in a rear region of the vehicle. In some examples, the glass constituting the window of the vehicle 500 may further include the quarter class 340 disposed in a partial region of the door region of the vehicle. In addition, the glass constituting the window of the vehicle 500 may further include the top glass 350 spaced apart from the rear glass 330 and disposed in an upper region of the vehicle. Accordingly, each glass constituting the window of the vehicle 500 may also be referred to as a window.

The front glass 310 may be referred to as a front windshield because it suppresses wind blown from a front side from entering the inside of the vehicle. The front glass 310 may have a two-layer bonding structure having a thickness of about 5.0 to 5.5 mm. The front glass 310 may have a bonding structure of glass/shatterproof film/glass.

The door glass 320 may have a two-layer bonding structure or may be formed of single-layer compressed glass. The rear glass 330 may have a two-layer bonding structure having a thickness of about 3.5 to 5.5 mm or may be formed of single-layer compressed glass. In the rear glass 330, a spaced distance may be required between a transparent antenna and a heat line and AM/FM antenna. The quarter glass 340 may be formed of single-layer compressed glass with a thickness of about 3.5 to 4.0 mm, but is not limited thereto.

The size of the quarter glass 340 may vary depending on a type of vehicle, and may have a size smaller than the sizes of the front glass 310 and the rear glass 330.

Figure 2A:
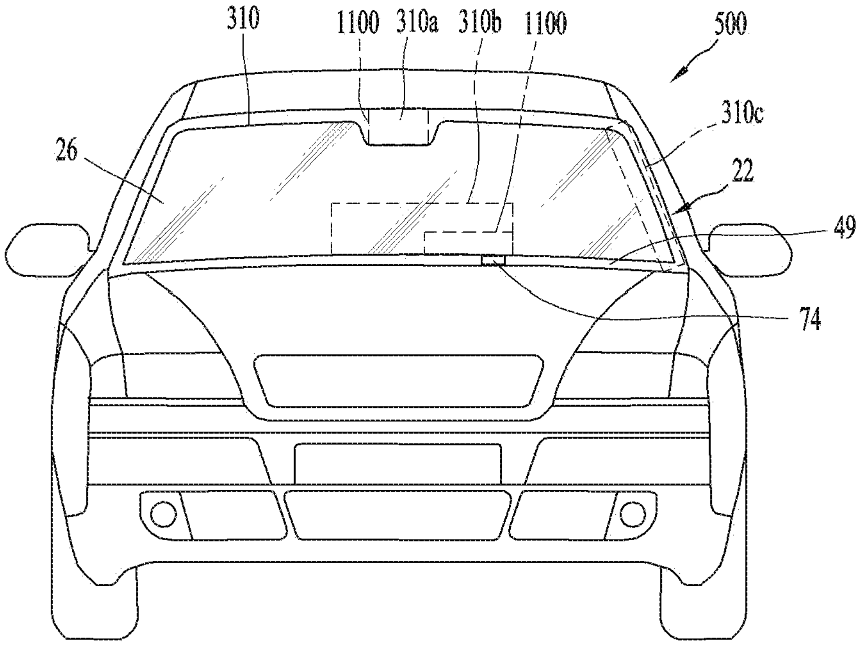
FIG. 2A is a front view of the vehicle of FIG. 1, which has an antenna assembly disposed in different regions of front glass.
Figure 2B:
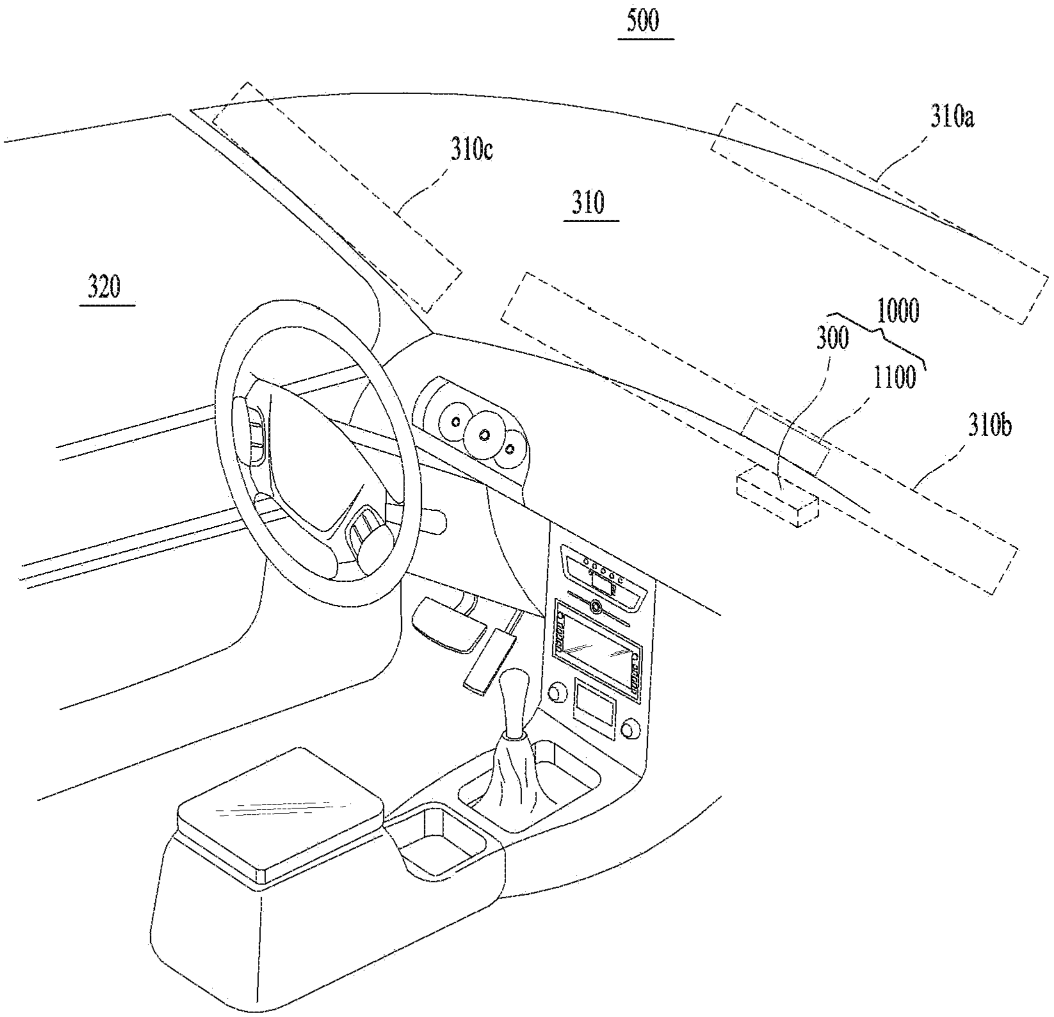
FIG. 2B is a front perspective view of the inside of the vehicle of FIG. 1, which has the antenna assembly disposed in the different regions of the front glass.
Figure 2C:
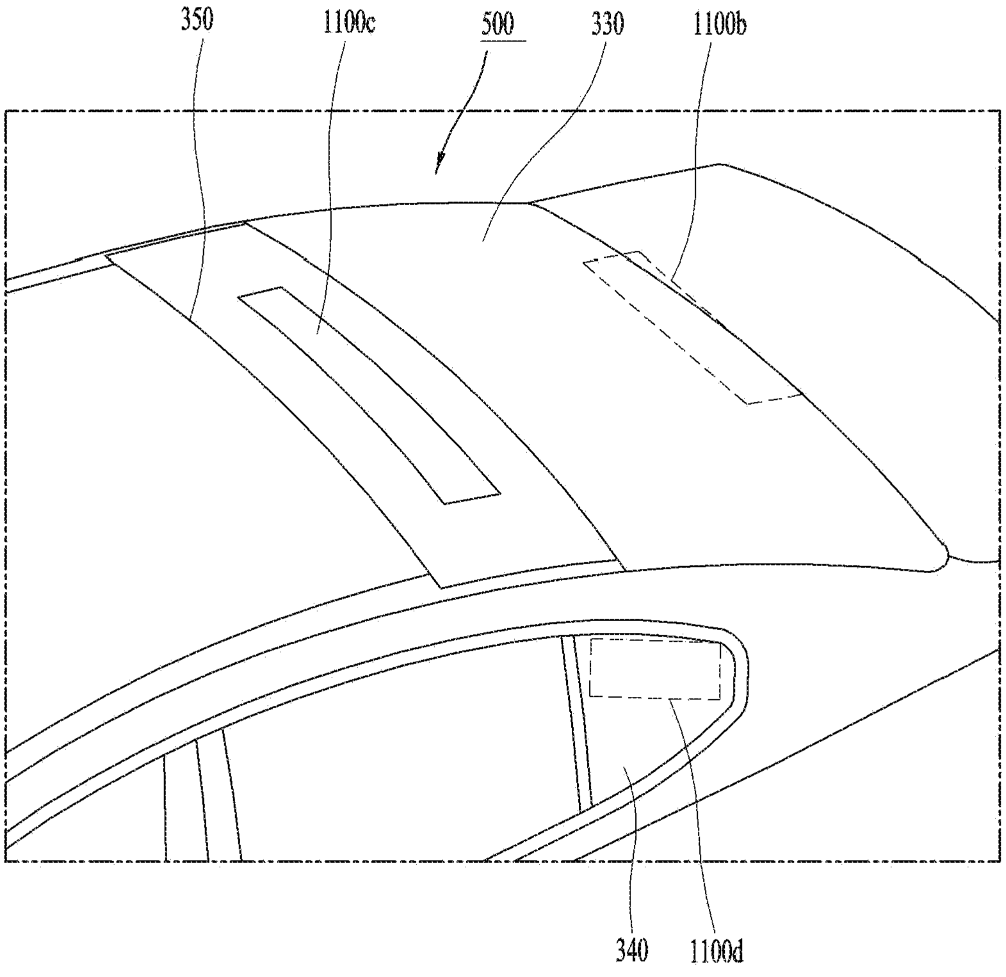
FIG. 2C is a lateral perspective view of the vehicle of FIG. 1, which has the antenna assembly disposed on upper glass.

Hereinafter, a structure in which an antenna assembly according to the disclosure is disposed in different regions of the front glass of a vehicle will be described. An antenna assembly attached to vehicle glass may be implemented as a transparent antenna. In this regard, FIG. 2A is a front view of the vehicle of FIG. 1, which has an antenna assembly disposed in different regions of the front glass. FIG. 2B is a front perspective view illustrating the inside of the vehicle of FIG. 1, which has the antenna assembly disposed in the different regions of the front glass. FIG. 2C is a lateral perspective view of the vehicle of FIG. 1, which has the antenna assembly disposed on upper glass.

Referring to FIG. 2A which is the front view of the vehicle 500, a configuration in which the transparent antenna for the vehicle according to the specification may be arranged is illustrated. A pane assembly 22 may include an antenna disposed in an upper region 310*a*. The pane assembly 22 may include an antenna in the upper region 310*a*, an antenna in a lower region 310*b*, and/or an antenna in a side region 310*c*. The pane assembly 22 may also include translucent pane glass 26 formed of a dielectric substrate. The antenna in the upper region 310*a*, the antenna in the lower region 310*b*, and/or the antenna in the side region 310*c* may be configured to support any one or more of various communication systems.

An antenna module 1100 may be disposed in the upper region 310*a*, the lower region 310*b*, or the side region 310*c* of the front glass 310. When the antenna module 1100 is arranged in the lower region 310*b* of the front glass 310, the antenna module 1100 may extend to a body 49 of a lower region of the translucent pane glass 26. The body 49 of the lower region of the translucent pane glass 26 may have lower transparency than other portions. A portion of a feeder and other interface lines may be arranged on the body 49 of the lower region of the translucent pane glass 26. A connector assembly 74 may be implemented on the body 49 of the lower region of the translucent pane glass 26. The body 49 of the lower region may constitute a vehicle body made of a metal material.

Referring to FIG. 2B, an antenna assembly 1000 may include a telematics control unit (TCU) 300 and an antenna module 1100. The antenna module 1100 may be located in a different region of glass of the vehicle.

Referring to FIGS. 2A and 2B, the antenna assembly may be disposed in the upper region 310*a*, the lower region 310*b*, and/or the side region 310*c* of the vehicle glass. Referring to FIGS. 2A to 2C, the antenna assembly may be arranged on the front glass 310, rear glass 330, quarter glass 340, and upper glass 350 of the vehicle.

Referring to FIGS. 2A to 2C, the antenna arranged in the upper region 310*a* of the front glass 310 of the vehicle may be configured to operate in a low band (LB), a mid band (MB), a high band (HB), and a 5G Sub6 band of 4G/5G communication systems. The antenna in the lower region 310*b* and/or the antenna in the side region 310*c* may also be configured to operate in the LB, MB, HB, and 5G Sub6 band of the 4G/5G communication systems. An antenna structure 1100*b* on the rear glass 330 of the vehicle may also be configured to operate in the LB, MB, HB, and 5G Sub6 band of the 4G/5G communication systems. An antenna structure 1100*c* on the upper glass 350 of the vehicle may also be configured to operate in the LB, MB, HB, and 5G Sub6 band of the 4G/5G communication systems. An antenna structure 1100*d* on the quarter glass 350 of the vehicle may also be configured to operate in the LB, MB, HB, and 5G Sub6 band of the 4G/5G communication systems.

At least a portion of an outer region of the front glass 310 of the vehicle may be defined by the translucent pane glass 26. The translucent pane glass 26 may include a first part in which an antenna and a portion of a feeder are formed, and a second part in which another portion of the feeder and a dummy structure are formed. The translucent pane glass 26 may further include a dummy region in which conductive patterns are not formed. For example, a transparent region of the translucent pane glass 22 may be transparent to secure light transmission and a field of view.

Although it is exemplarily illustrated that conductive patterns may be formed in a partial region of the front glass 310, the conductive patterns may extend to the side glass 320 and the rear glass 330 of FIG. 1, and an arbitrary glass structure. In the vehicle 500, the occupants or driver may view road and surrounding environment through the pane assembly 22. In addition, the occupants or driver may view the road and surrounding environment without interference by the antenna in the upper region 310*a*, the antenna in the lower region 310*b*, and/or the antenna in the side region 310*c*.

Figure 3:
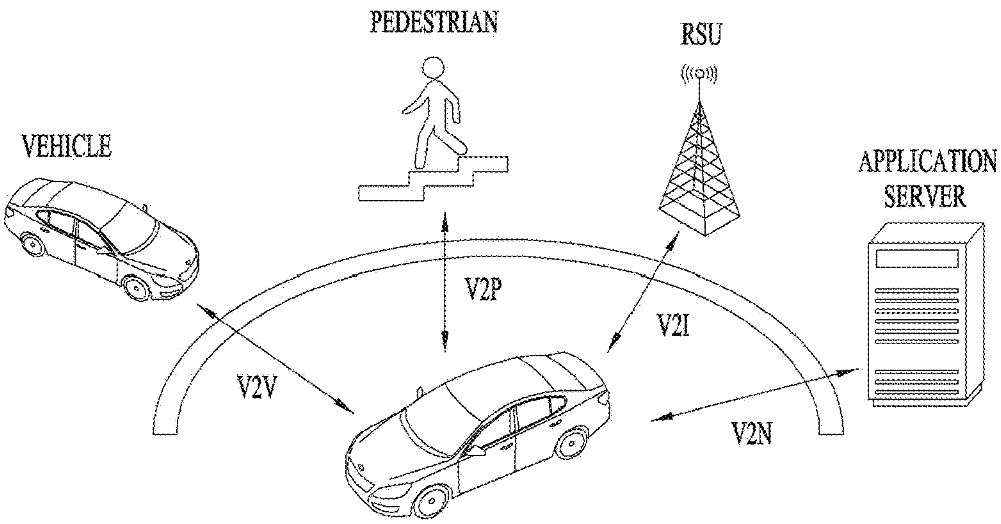
FIG. 3 illustrates types of V2X applications.

The vehicle 500 may be configured to communicate with pedestrians, adjacent infrastructures, and/or servers in addition to adjacent vehicles. FIG. 3 illustrates types of V2X applications. Referring to FIG. 3, vehicle-to-everything (V2X) communication may include communication between a vehicle and each of all entities, such as vehicle-to-vehicle (V2V) communication which refers to communication between vehicles, vehicle-to-infrastructure (V2I) communication which refers to communication between a vehicle and an eNB or a road side unit (RSU), vehicle-to-pedestrian (V2P) communication which refers to communication between a vehicle and a terminal carried by a person (a pedestrian, a cyclist, a vehicle driver, or a passenger), vehicle-to-network (V2N) communication, and the like.

Figure 4:
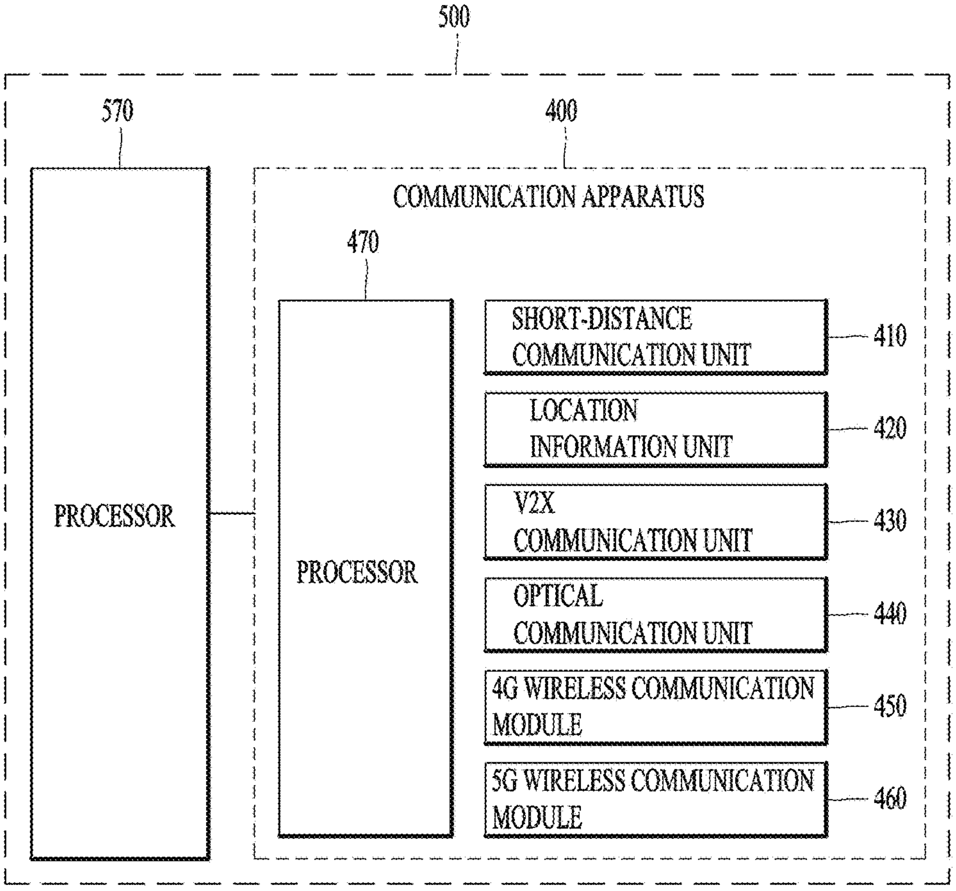
FIG. 4 is a block diagram referenced for explaining a vehicle and an antenna system mounted on the vehicle according to an embodiment of the disclosure.

Meanwhile, FIG. 4 is a block diagram illustrating a vehicle and an antenna system mounted on the vehicle according to an embodiment.

The vehicle 500 may include a communication device 400 and a processor 570. The communication device 400 may correspond to the telematics control unit (TCU) of the vehicle 500.

The communication device 400 may be a device for performing communication with an external device. Here, the external device may be another vehicle, a mobile terminal, or a server. In order to perform communication, the communication device 400 may include a transmission antenna, a reception antenna, and at least one of a radio frequency (RF) circuit and an RF element which may implement various communication protocols. In this regard, the communication device 400 may include a short-range communication unit 410, a location information unit 420, a V2X communication unit 430, an optical communication unit 440, a 4G wireless communication module 450, and a 5G wireless communication module 460. The communication device 400 may include a processor 470. According to an embodiment, the communication device 400 may further include other components in addition to the components described, or may not include some of the components described.

The 4G wireless communication module 450 and the 5G wireless communication module 460 may perform wireless communications with one or more communication systems through one or more antenna modules. The 4G wireless communication module 450 may transmit and/or receive signals to and/or from a device in a first communication system through a first antenna module. Also, the 5G wireless communication module 460 may transmit and/or receive signals to and/or from a device in a second communication system through a second antenna module. The 4G wireless communication module 450 and 5G wireless communication module 460 may also be physically implemented as one integrated communication module. For example, the first communication system and the second communication system may be an LTE communication system and a 5G communication system, respectively. However, the first communication system and the second communication system may not be limited thereto, and may expand to any different communication systems.

The processor of the device within the vehicle 500 may be implemented as a micro control unit (MCU) or a modem. The processor 470 of the communication device 400 may correspond to a modem, and the processor 470 may be implemented as an integrated modem. The processor 470 may acquire surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

In some examples, the antenna module arranged in the vehicle 500 may include a wireless communication unit. The 4G wireless communication module 450 may perform transmission and reception of 4G signals with a 4G base station through a 4G mobile communication network. In this instance, the 4G wireless communication module 450 may transmit at least one 4G transmission signal to the 4G base station. In addition, the 4G wireless communication module 450 may receive at least one 4G reception signal from the 4G base station. In this regard, uplink (UL) multi-input/multi-output (MIMO) may be performed based on a plurality of 4G transmission signals transmitted to the 4G base station. In addition, downlink (DL) MIMO may be performed based on a plurality of 4G reception signals received from the 4G base station.

The 5G wireless communication module 460 may perform transmission and reception of 5G signals with a 5G base station through a 5G wireless communication network. Here, the 4G base station and the 5G base station may have a non-stand-alone (NSA) architecture. The 4G base station and the 5G base station may be disposed, for example, in the non-stand-alone (NSA) architecture. Alternatively, the 5G base station may be disposed in a stand-alone (SA) architecture at a separate location from the 4G base station. The 5G wireless communication module 460 may perform transmission and reception of 5G signals with a 5G base station through a 5G wireless communication network. In this instance, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a band of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, MIMO may be supported to be performed a plurality of times, to improve a transmission rate. In this instance, UL MIMO may be performed by a plurality of 5G transmission signals that are transmitted to a 5G base station. DL MIMO may be performed by a plurality of 5G reception signals that are received from the 5G base station.

In some examples, a state of dual connectivity (DC) with both the 4G base station and the 5G base station may be attained through the 4G wireless communication module 450 and the 5G wireless communication module 460. As such, the dual connectivity with the 4G base station and the 5G base station may be referred to as EUTRAN NR DC (EN-DC). In some examples, when the 4G base station and the 5G base station are disposed in a co-located structure, throughput improvement may be achieved by inter-carrier aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460. Short-range communication between electronic devices (e.g., vehicles) may be performed using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, carrier aggregation (CA) may be carried out using at least one of the 4G wireless communication module 450 and the 5G wireless communication module 460 and a WiFi communication module. In this regard, 4G+WiFi carrier aggregation (CA) may be performed using the 4G wireless communication module 450 and the WiFi communication module 113. Or, 5G+WiFi CA may be performed using the 5G wireless communication module 460 and the WiFi communication module.

In some examples, the communication device 400 may implement a display device for a vehicle together with a user interface device. In this instance, the display device for the vehicle may be referred to as a telematics apparatus or an audio video navigation (AVN) apparatus.

In some examples, a broadband transparent antenna structure that may be disposed on vehicle glass may be implemented with a single dielectric substrate on the same plane as a CPW feeder. In addition, the broadband transparent antenna structure that may be disposed on the vehicle glass may be implemented with a structure in which grounds are formed on both sides of a radiator, to constitute a broadband structure.

Figure 5A:
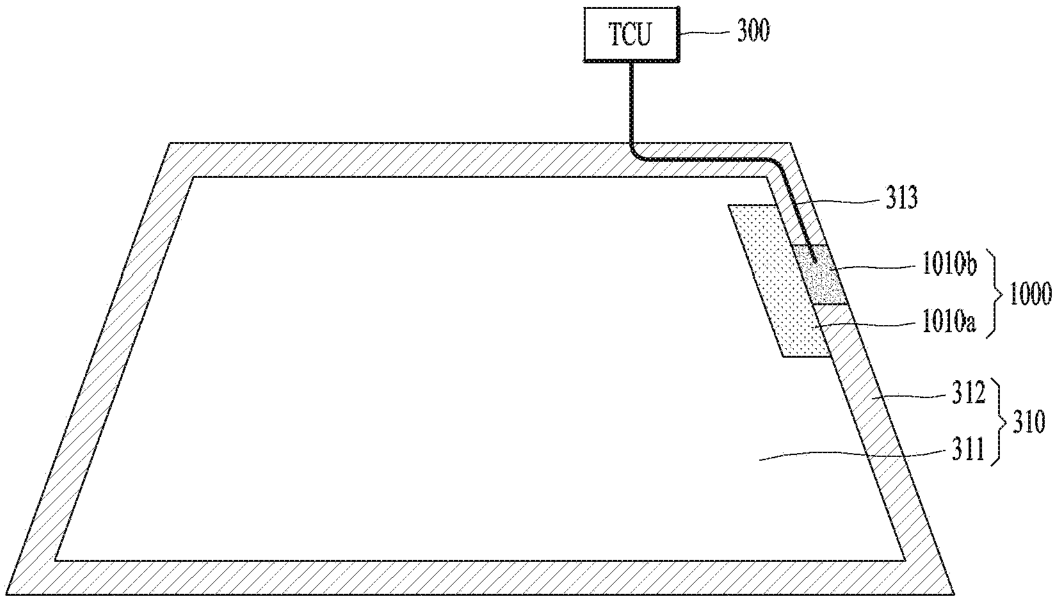
FIGS. 5A and 5C are views of a configuration in which an antenna assembly according to the disclosure is disposed on vehicle glass.
Figure 5B:
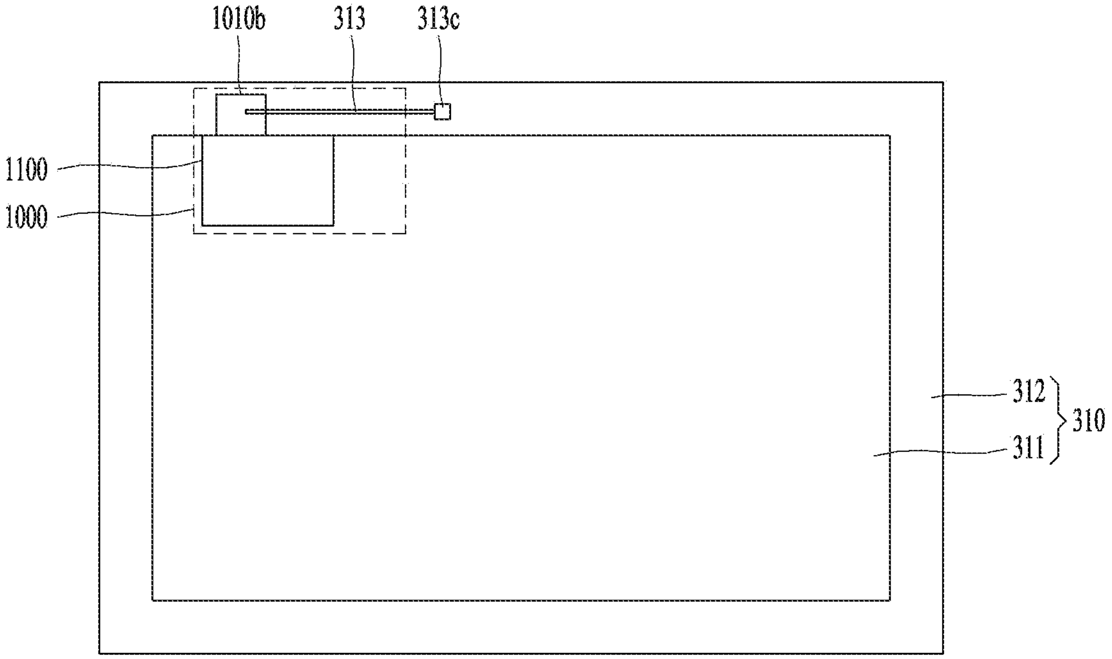

Hereinafter, an antenna assembly associated with a broadband transparent antenna structure according to the specification will be described. In this regard, FIGS. 5A and 5B illustrate configurations in which an antenna assembly according to the specification is arranged on vehicle glass. Referring to FIG. 5A, the antenna assembly 1000 may include a first dielectric substrate 1010*a* and a second dielectric substrate 1010*b*. The first dielectric substrate 1010*a* may be implemented as a transparent substrate and thus may be referred to as a transparent substrate 1010*a*. The second dielectric substrate 1010*b* may be implemented as an opaque substrate 1010*b*.

The glass panel 310 may be configured to include a transparent region 311 and an opaque region 312. The opaque region 312 of the glass panel 310 may be a frit region formed as a frit layer. The opaque region 312 may be formed to surround the transparent region 311. The opaque region 312 may be formed outside the transparent region 311. The opaque region 312 may form a boundary region of the glass panel 310.

A signal pattern formed on a dielectric substrate 1010 may be connected to the telematics control unit (TCU) 300 through a connector part 313 such as a coaxial cable. The telematics control unit (TCU) 300 may be mounted inside the vehicle, but is not limited thereto. The telematics control unit (TCU) 300 may be arranged on a dashboard inside the vehicle or a ceiling region inside the vehicle, but is not limited thereto.

Figure 5C:
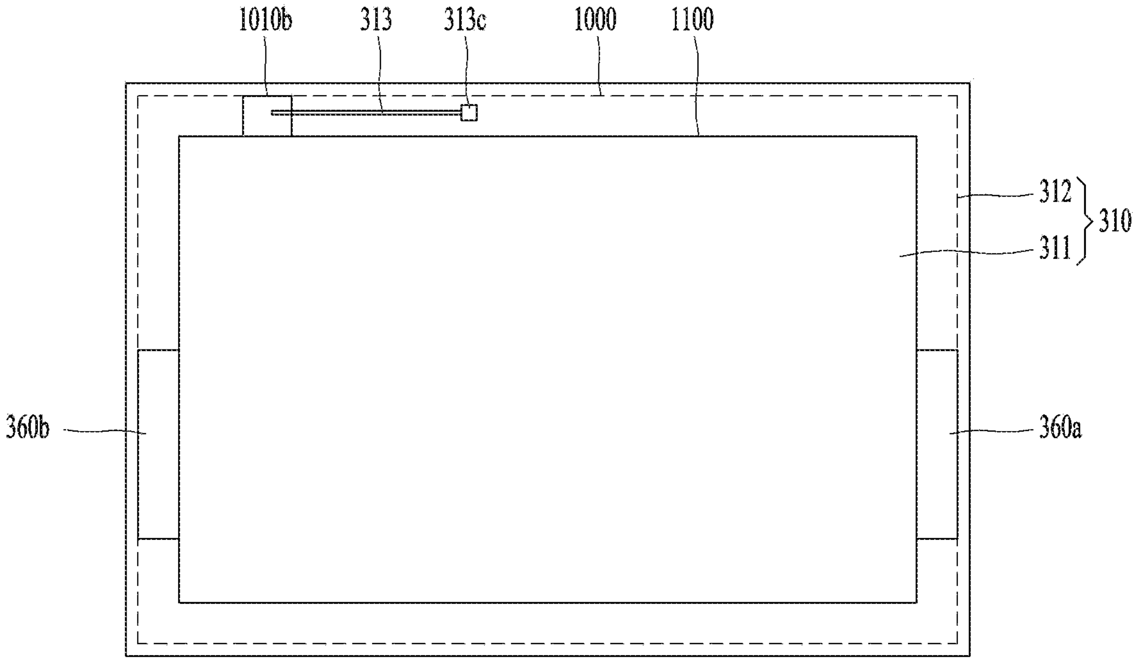

FIG. 5B illustrates a configuration in which the antenna assembly 1000 is disposed in a partial region of the glass panel 310. FIG. 5C illustrates a configuration in which the antenna assembly 1000 is disposed in an entire region of the glass panel 310.

Referring to FIGS. 5B and 5C, the glass panel 310 may include the transparent region 311 and the opaque region 312. The opaque region 312 that is a non-visible area with transparency below a certain level may be referred to as a frit region, black printing (BP) region, or black matrix (BM) region. The opaque region 312 corresponding to the non-visible arca may be formed to surround the transparent region 311. The opaque region 312 may be formed in a region outside the transparent region 311. The opaque region 312 may form a boundary region of the glass panel 310. A second dielectric substrate 1010*b* or heating pads 360*a* and 360*b* corresponding to a feeding substrate may be disposed in the opaque region 312. The second dielectric substrate 1010*b* disposed in the opaque region 312 may be referred to as an opaque substrate. Even when the antenna assembly 1000 is arranged in the entire region of the glass panel 310 as illustrated in FIG. 5C, the heating pads 360*a* and 360*b* may be arranged in the opaque region 312.

Referring to FIG. 5B, the antenna assembly 1000 may include a first transparent dielectric substrate 1010*a* and a second dielectric substrate 1010*b*. Referring to FIGS. 5B and 5C, the antenna assembly 1000 may include an antenna module 1100 configured with conductive patterns, and a second dielectric substrate 1010*b*. The antenna module 1100 may be provided with a transparent electrode part to be implemented as a transparent antenna module. The antenna module 1100 may include one or more antenna elements. The antenna module 1100 may include a MIMO antenna and/or other antenna elements for wireless communication. The other antenna elements may include at least one of GNSS/radio/broadcasting/WiFi/satellite communication/UWB, and remote keyless entry (RKE) antennas for vehicle applications.

Referring to FIGS. 5A to 5C, the antenna assembly 1000 may be interfaced with the TCU 300 through the connector part 313. The connector part 313 may include a connector 313*c* on an end of a cable to be electrically connected to the TCU 300. A signal pattern formed on the second dielectric substrate 1010*b* of the antenna assembly 1000 may be connected to the TCU 300 through the connector part 313 such as a coaxial cable. The antenna module 1100 may be electrically connected to the TCU 300 through the connector part 313. The TCU 300 may be disposed inside the vehicle, but is not limited thereto. The TCU 300 may be disposed on a dashboard inside the vehicle or a ceiling region inside the vehicle, but is not limited thereto.

In some examples, when the transparent antenna assembly according to the disclosure is attached to the inside or surface of the glass panel 310, a transparent electrode part including an antenna pattern and a dummy pattern may be disposed in the transparent region 311. On the other hand, an opaque substrate part may be disposed in the opaque region 312.

Figure 6A:
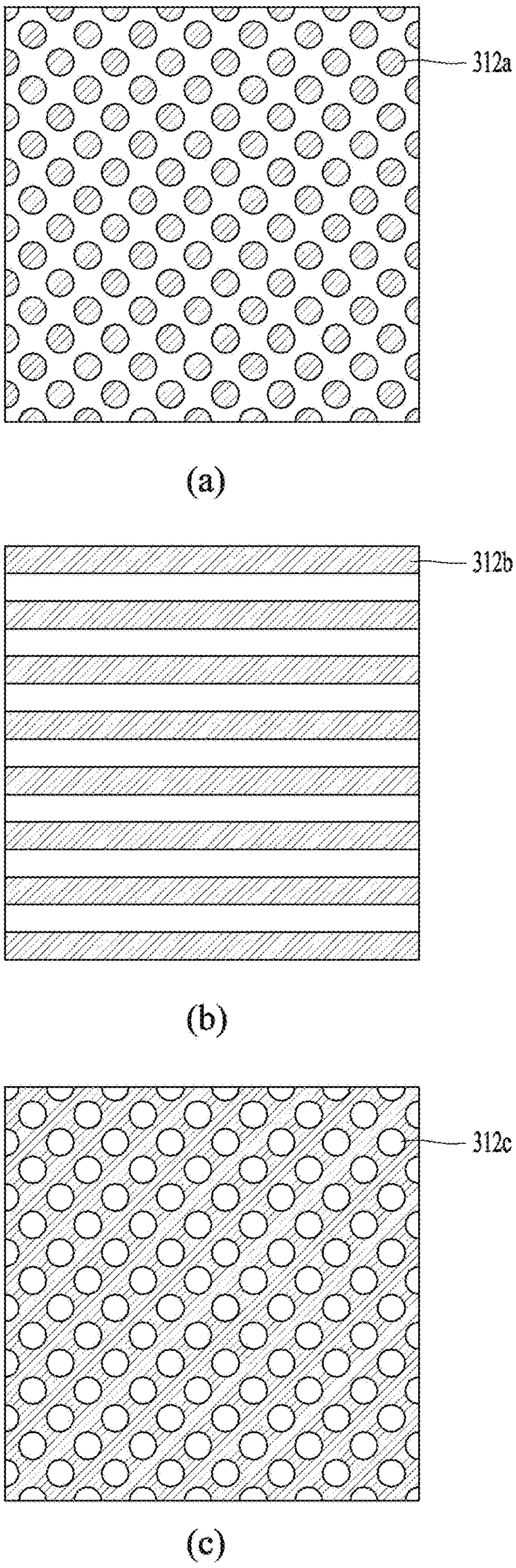
FIG. 6A illustrates various embodiments of a frit pattern according to the disclosure.
Figure 6B:
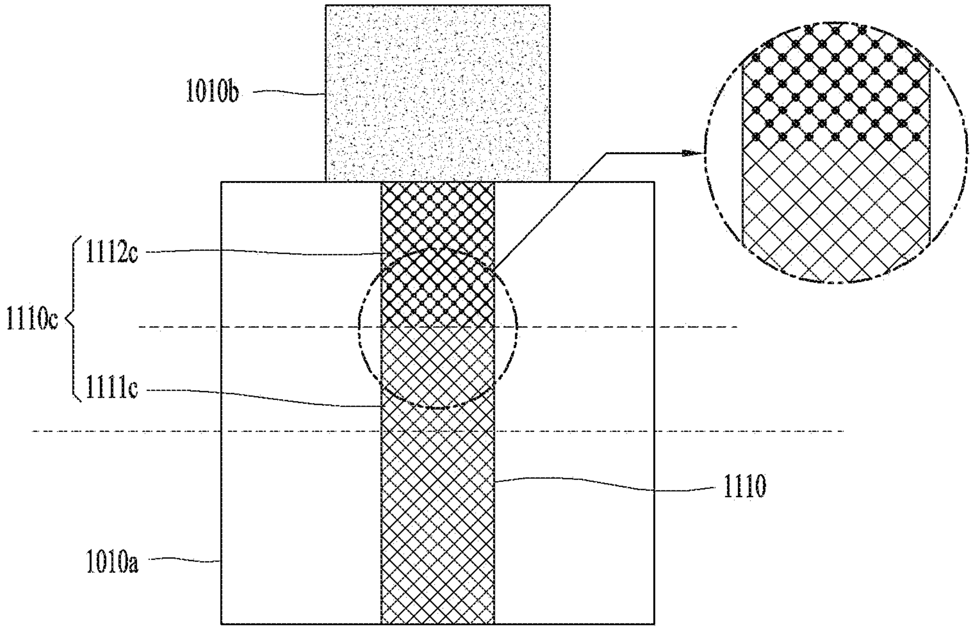
FIGS. 6B and 6C illustrate transparent antenna patterns according to embodiments and structures in which the respective transparent antenna patterns are disposed on vehicle glass.
Figure 6B:
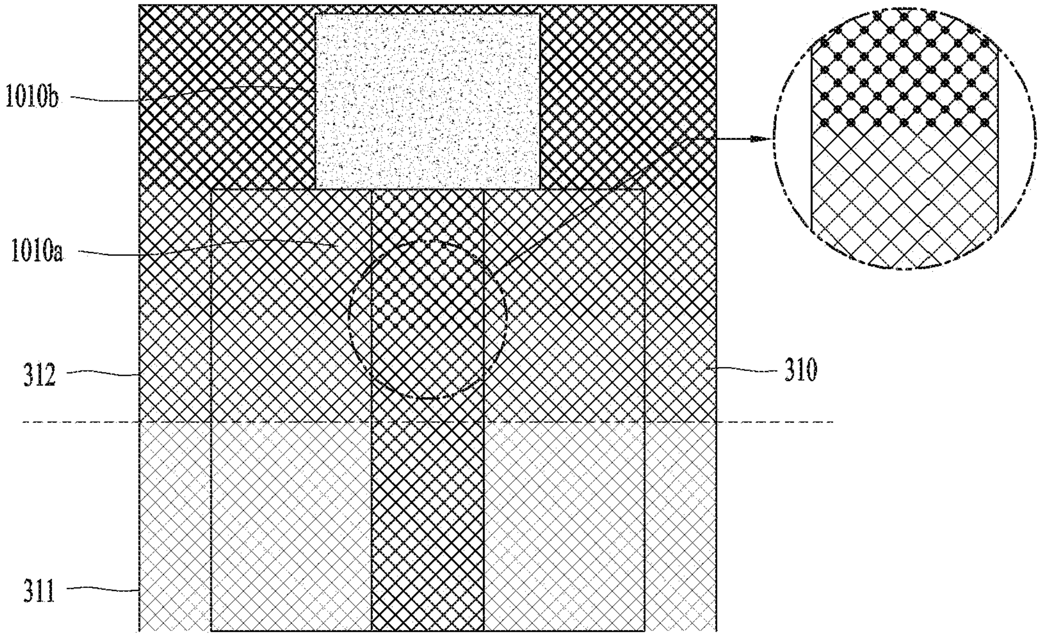
Figure 6C:
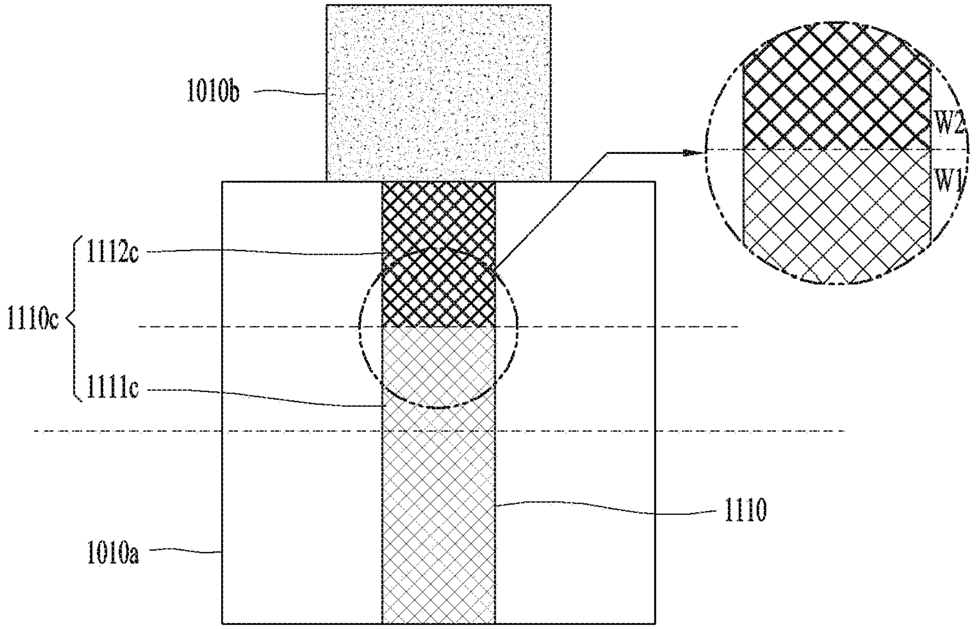
Figure 6C:
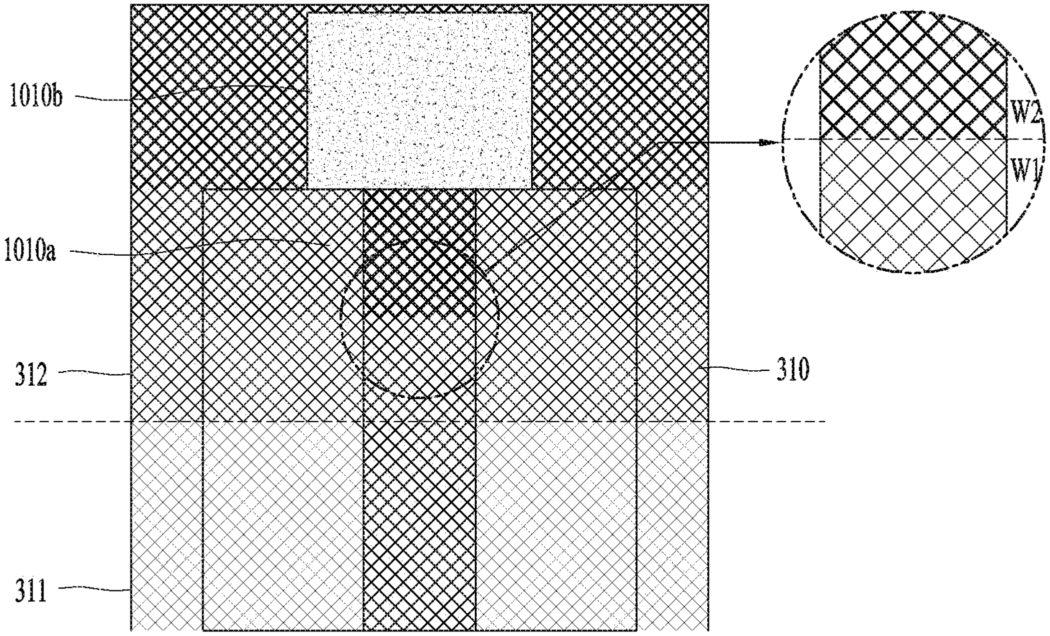

The antenna assembly formed on the vehicle glass according to the disclosure may be disposed in the transparent region and the opaque region. In this regard, FIG. 6A illustrates various embodiments of frit patterns according to the specification. FIGS. 6B and 6C illustrate transparent antenna patterns according to embodiments and structures in which the respective transparent antenna patterns are disposed on vehicle glass.

Referring to (a) of FIG. 6A, a frit pattern 312*a* may be a metal pattern in a circular (polygonal, or elliptical) shape with a certain diameter. The frit pattern 312*a* may be arranged in a two-dimensional (2D) structure in both axial directions. The frit pattern 312*a* may be formed in an offset structure where center points between patterns forming adjacent rows are spaced apart by a certain distance.

Referring to (b) of FIG. 6A, the frit pattern 312*b* may be formed as a rectangular pattern in one axial direction. The frit pattern 312*c* may be arranged in a one-dimensional structure in one axial direction or in a 2D structure in both axial directions.

Referring to (c) of FIG. 6A, the frit pattern 312*c* may be formed as a slot pattern, which is formed by removing a metal pattern in a circular (polygonal or elliptical) shape with a certain diameter. The frit pattern 312*b* may be arranged in a 2D structure in both axial directions. The frit pattern 312*c* may be formed in an offset structure where center points between patterns forming adjacent rows are spaced apart by a certain distance.

Referring to FIGS. 5A to 6C, the opaque substrate 1010*b* and the transparent substrate 1010*a* may be electrically connected to each other in the opaque region 312. In this regard, a dummy pattern, which is electrically very small to have a certain size or less, may be positioned adjacent to the antenna pattern to secure the invisibility of a transparent antenna pattern. Accordingly, a pattern within a transparent electrode may be made invisible to the naked eye without deterioration of antenna performance. The dummy pattern may be designed to have similar optical transmittance to that of the antenna pattern within a certain range.

The transparent antenna assembly including the opaque substrate 1010*b* bonded to the transparent electrode part may be mounted on the glass panel 310. In this regard, to ensure invisibility, the opaque substrate 1010*b* connected to an RF connector or coaxial cable may be disposed in the opaque region 312 of the vehicle glass. Meanwhile, the transparent electrode part may be placed in the transparent region 311 of the vehicle glass to ensure the invisibility of the antenna from the outside of the vehicle glass.

A portion of the transparent electrode part may be attached to the opaque region 312 in some cases. The frit pattern of the opaque region 312 may be gradated from the opaque region 312 to the transparent region 311. The transmission efficiency of a transmission line may be improved while improving the invisibility of the antenna when the optical transmittance of the frit pattern is adjusted to match the optical transmittance of the transparent electrode part within a certain range. Meanwhile, sheet resistance may be reduced while ensuring invisibility by adopting a metal mesh shape similar to the frit pattern. In addition, the risk of disconnection of the transparent electrode layer during manufacturing and assembly may be reduced by increasing the line width of a metal mesh grid in a region connected to the opaque substrate 1010*b*.

Referring to (a) of FIG. 6A and FIG. 6B, a conductive pattern 1110 of the antenna module may include metal mesh grids with the same line width in the opaque region 312. The conductive pattern 1110 may include a connection pattern 1110*c* for connecting the transparent substrate 1010*a* and the opaque substrate 1010*b*. In the opaque region 312, the connection pattern 1110*c* and the frit patterns of a certain shape on both side surfaces of the connection pattern 1110*c* may be arranged at certain distances. The connection pattern 1110*c* may include a first transmittance section 1111*c* with a first transmittance and a second transmittance section 1112*c* with a second transmittance.

The frit patterns 312*a* formed in the opaque region 312 may include metal grids with a certain diameter arranged in one axial direction and another axial direction. The metal grids of the frit patterns 312*a* which correspond to the second transmittance section 1112*c* of the connection pattern 1110*c* may be arranged at intersections of the metal mesh grids.

Referring to (b) of FIG. 6A and FIG. 6B, the frit patterns 312*b* formed in the opaque region 312 may include slot grids, each of which has a certain diameter and is formed by removing a metal region, disposed in one axial direction and another axial direction. The slot grids of the frit patterns 312*b* may be arranged between the metal mesh grids in the connection pattern 1110*c*. Accordingly, the metal regions of the frit patterns 312*b* where slot grids are not formed may be arranged at the intersections of the metal mesh grids.

Referring to FIGS. 6A and 6C, the connection pattern 1110*c* may include metal mesh grids with a first line width W1 in the first transmittance section 1111*c* adjacent to the transparent region 311. The connection pattern 1110*c* may be formed with a second line width W2 thicker than the first line width W1 in the second transmittance section 1112*c* adjacent to the opaque substrate 1010*b*. In this regard, the first transparency of the first transmittance section 1111*c* may be set to be higher than the second transparency of the second transmittance section 1112*c*.

When the transparent antenna assembly is attached to the inside of the vehicle glass as illustrated in FIGS. 5A to 5C, the transparent electrode part may be disposed in the transparent region 311 and the opaque substrate 1010*b* may be disposed in the opaque region 312. In this regard, the transparent electrode part may be disposed in the opaque region 312 in some cases.

Metal patterns of a low-transmittance pattern electrode part and a high-transmittance pattern electrode part that are located in the opaque region 312 may partially be arranged in a gradation area of the opaque region 312. When the antenna pattern and a transmission line portion of the low-transmission pattern electrode part are configured as a transparent electrode, a decrease in antenna gain may be caused by the deterioration of transmission efficiency due to an increase in sheet resistance. As a way to overcome this loss of gain, the transmittance of the frit pattern 312 where an electrode is located and the transmittance of the transparent electrode may be made equal to each other within a certain range.

Low sheet resistance may be achieved by increasing the line width of the transparent electrode located in a region where the transmittance of the frit pattern 312*a*, 312*b*, 312*c* is low or by adding the same shape as that of the frit pattern 312*a*, 312*b*, 312*c*. Accordingly, invisibility may be secured while solving the problem of deteriorated transmission efficiency. The transmittance and pattern of the opaque region 312 are not limited to the structure of FIG. 6A and may differ depending on a glass manufacturer or vehicle manufacturer. Accordingly, the shape and transparency (line width and separation distance) of the transparent electrode of the transmission line may change in various ways.

Figure 7A:
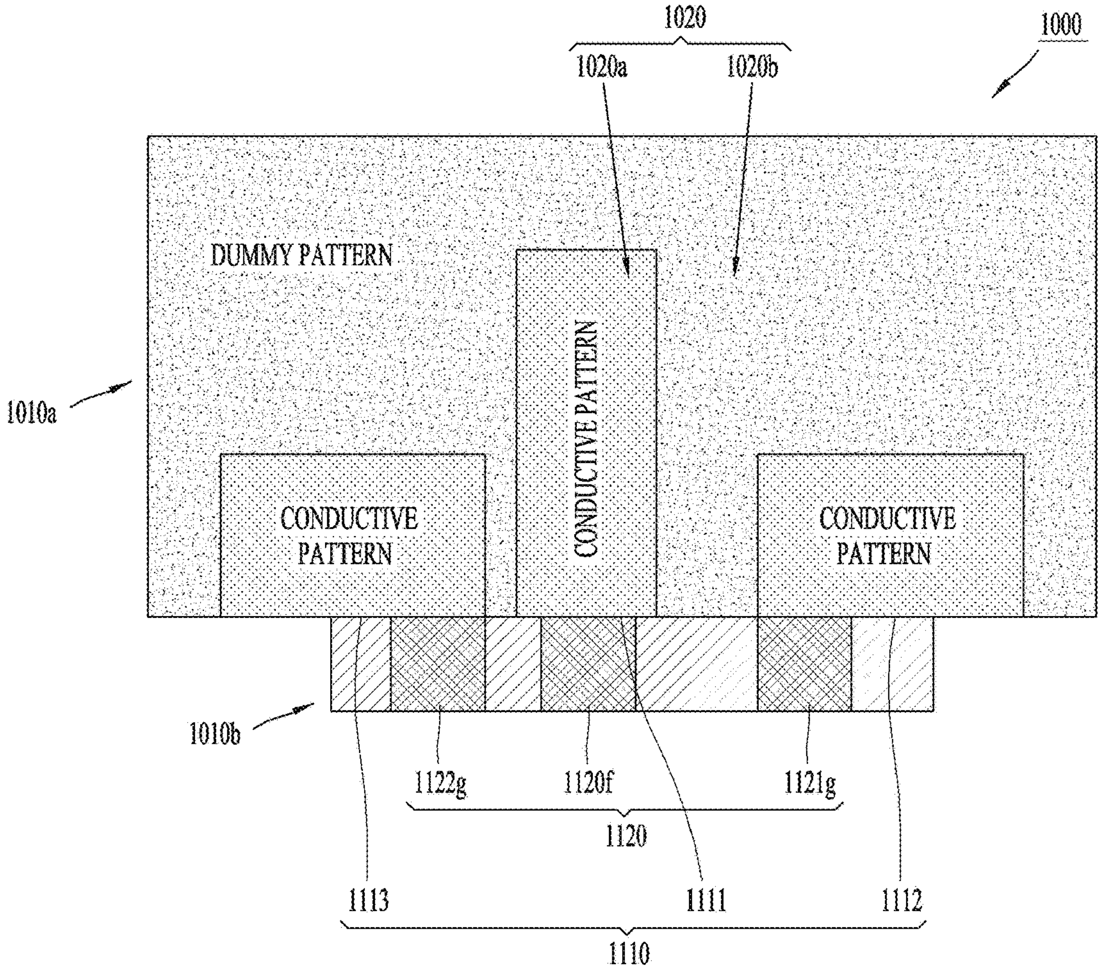
FIG. 7A shows a front view and a cross-sectional view of a transparent antenna assembly according to the disclosure.
Figure 7A:
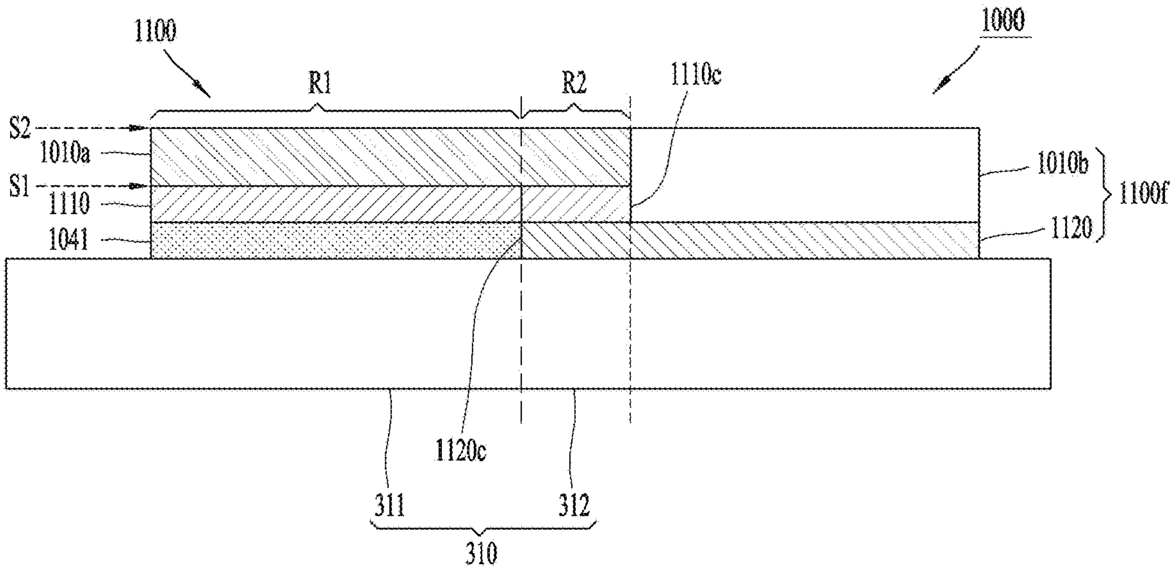
Figure 7B:
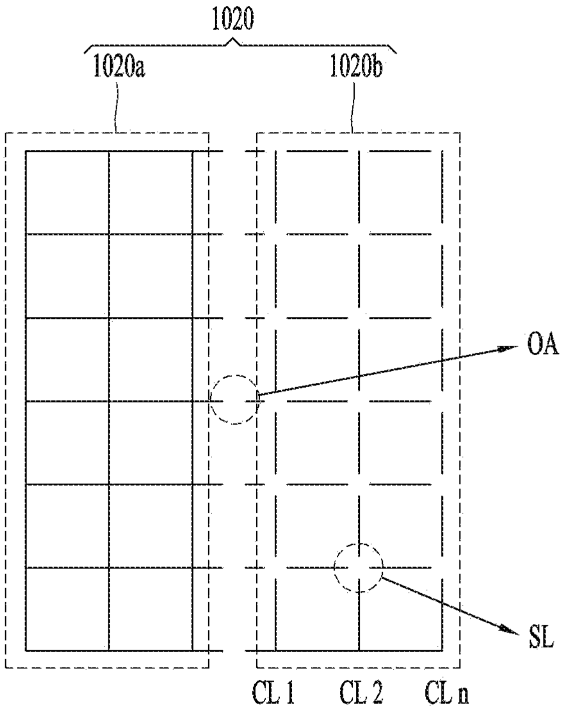
FIG. 7B illustrates a grid structure of a metal mesh radiator region and a dummy metal mesh region according to embodiments.
Figure 7B:
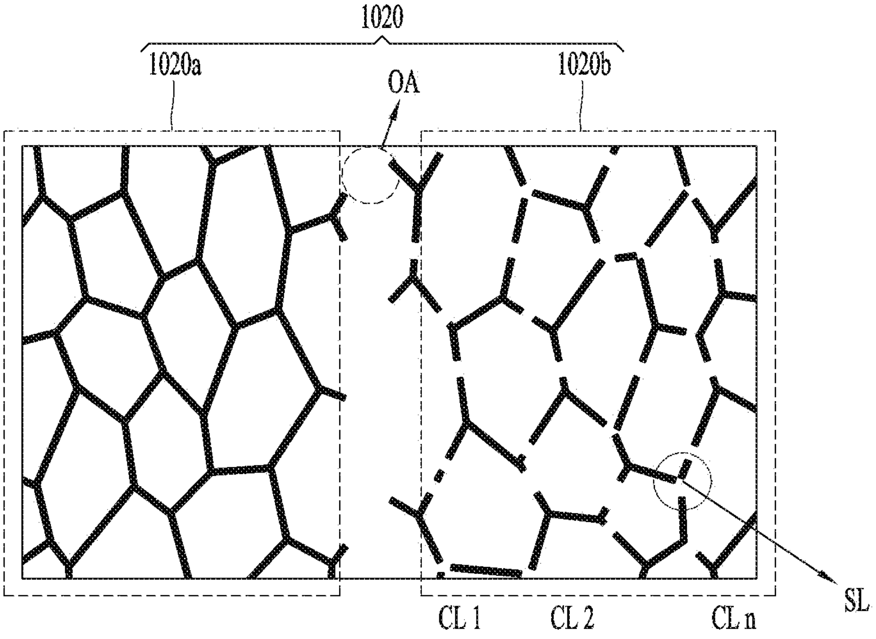

FIG. 7A shows a front view and a cross-sectional view of a transparent antenna assembly according to the disclosure. FIG. 7B illustrates a grid structure of a metal mesh radiator region and a dummy metal mesh region according to embodiments.

(a) of FIG. 7A is a front view of a transparent antenna assembly 1000, and (b) of FIG. 7A is a cross-sectional view of the transparent antenna assembly 1000, showing the layered structure of the transparent antenna assembly 1000. Referring to FIG. 7A, the antenna assembly 1000 may include a first transparent dielectric substrate 1010*a* and a second dielectric substrate 1010*b*. Conductive patterns 1110 that serves as a radiator may be disposed on one surface of the first transparent dielectric substrate 1010*a*. A feeding pattern 1120*f* and ground patterns 1121*g* and 1122*g* may be formed on one surface of the second dielectric substrate 1010*b*. The conductive patterns 1110 operating as the radiator may be configured to include one or more conductive patterns. The conductive patterns 1110 may include a first pattern 1111 connected to the feeding pattern 1120*f*, and a second pattern 1112 connected to the ground pattern 1121*g*. The conductive patterns 1110 may further include a third pattern 1113 connected to the ground pattern 1122*g*.

The conductive patterns 1110 constituting the antenna module may be implemented as a transparent antenna. Referring to FIG. 7B, the conductive patterns 1110 may be metal grid patterns 1020*a* with a certain line width or less to form a metal mesh radiator region. To maintain a certain level of transparency, dummy metal grid patterns 1020*b* may be formed in inner regions between adjacent patterns among the first to third patterns 1111, 1112, and 1113 of the conductive patterns 1100 or outer regions of them. The metal grid patterns 1020*a* and the dummy metal grid patterns 1020*b* may form a metal mesh layer 1020.

(a) of FIG. 7B illustrates a structure including typical metal grid patterns 1020*a* and dummy metal grid patterns 1020*b*. (b) of FIG. 7 illustrates a structure including atypical metal grid patterns 1020*a* and dummy metal grid patterns 1020*b*. As illustrated in (a) of FIG. 7B, the metal mesh layer 1020 may be formed in a transparent antenna structure by a plurality of metal mesh grids. The metal mesh layer 1020 may be formed in a typical metal mesh shape, such as a square shape, a diamond shape, or a polygonal shape. Conductive patterns may be configured such that the plurality of metal mesh grids operate as a feeding line or radiator. The metal mesh layer 1020 may constitute a transparent antenna region. As one example, the metal mesh layer 1020 may have a thickness of about 2 mm, but is not limited thereto.

The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form opening areas OA, thereby being electrically disconnected. The dummy metal grid patterns 1020*b* may have slits SL formed so that ends of mesh grids CL1, CL2, . . . , CLn are not connected.

Referring to (b) of FIG. 7B, the metal mesh layer 1020 may be formed by a plurality of atypical metal mesh grids. The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form the opening areas OA, thereby being electrically disconnected. The dummy metal grid patterns 1020*b* may have slits SL formed so that ends of mesh grids CL1, CL2, . . . , CLn are not connected.

Figure 8A:
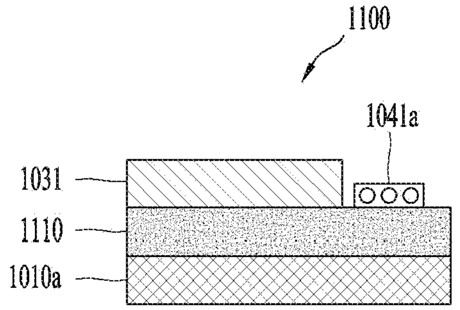
FIG. 8A is a view of the layered structure of an antenna module and a feeding module.
Figure 8A:
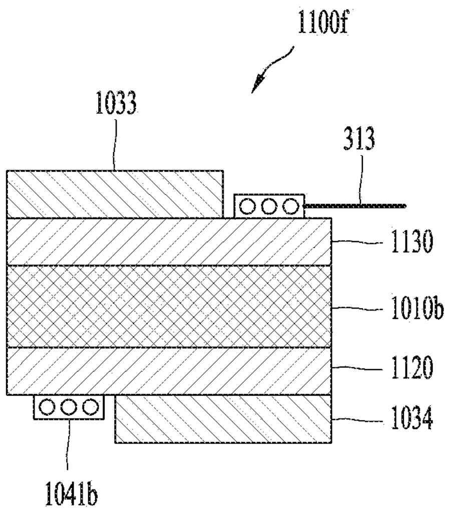
Figure 8B:
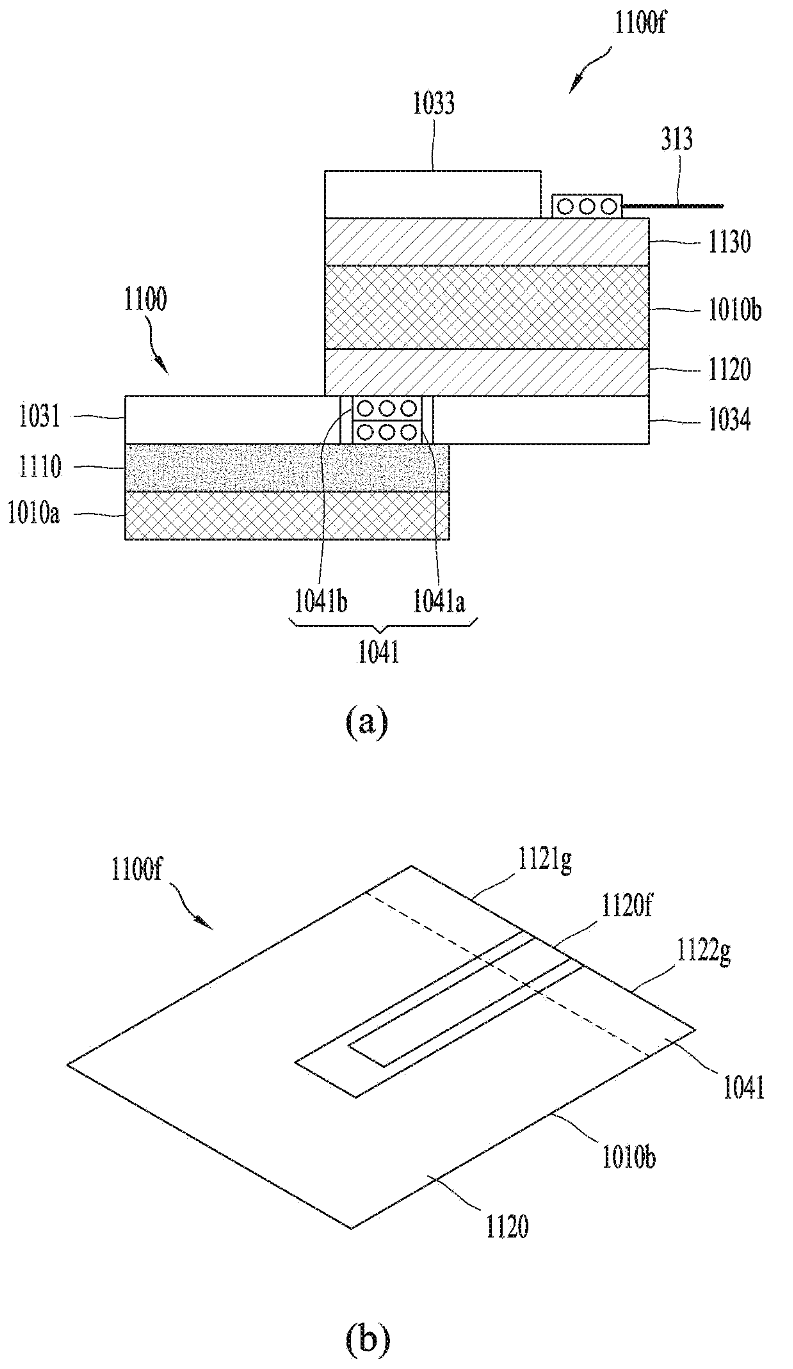
FIG. 8B is a view of an opaque substrate including a layered structure, in which the antenna module and a feeding structure are coupled to each other, and a coupling region.

Meanwhile, the transparent substrate on which the transparent antenna according to the specification is formed may be arranged on the vehicle glass. In this regard, FIG. 8A illustrates the layered structure of an antenna module and a feeding pattern. FIG. 8B illustrates an opaque substrate including the layered structure, in which the antenna module and the feeding structure are coupled to each other, and a coupling region.

Referring to (a) of FIG. 8A, the antenna module 1100 may include a first transparent dielectric substrate 1010*a* formed on a first layer, and a first conductive pattern 1110 formed on a second layer arranged on the first layer. The first conductive pattern 1110 may be implemented as the metal mesh layer 1020 including the metal grid patterns 1020*a* and the dummy metal grid patterns 1020*b*, as illustrated in FIG. 7B. The antenna module 1100 may further include a protective layer 1031 and an adhesive layer 1041*a* arranged on the second layer.

Referring to (b) of FIG. 8A, a feeding structure 1100*f* may include a second dielectric substrate 1010*b*, a second conductive pattern 1120, and a third conductive pattern 1130. The feeding structure 1100*f* may further include first and second protective layers 1033 and 1034 stacked on the second conductive pattern 1120 and the third conductive pattern 1130, respectively. The feeding structure 1100*f* may further include an adhesive layer 1041*b* formed on a partial region of the second conductive pattern 1120.

The second conductive pattern 1120 may be disposed on one surface of the second dielectric substrate 1010*b* implemented as an opaque substrate. The third conductive pattern 1130 may be disposed on another surface of the second dielectric substrate 1010*b*. The first protective layer 1033 may be formed on the third conductive pattern 1130. The second protective layer 1034 may be formed below the second conductive pattern 1120. Each of the first and second protective layers 1033 and 1034 may be configured to have a low permittivity below a certain value, enabling low-loss feeding to the transparent antenna region.

Referring to (a) of FIG. 8B, the antenna module 1100 may be coupled with the feeding structure 1100*f* including the second dielectric substrate 1010*b*, which is the opaque substrate. The first conductive pattern 1110 implemented as the metal mesh layer, which is the transparent electrode layer, may be formed on top of the first transparent dielectric substrate 1010*a*. The protective layer 1031 may be formed on top of the first conductive pattern 1110. The protective layer 1031 and the first adhesive layer 1041*a* may be formed on top of the first conductive pattern 1110. The first adhesive layer 1041*a* may be formed adjacent to the protective layer 1031.

The first adhesive layer 1041*a* formed on the first conductive pattern 1110 may be bonded to the second adhesive layer 1041*b* formed below the second conductive layer 1120. The first transparent dielectric substrate 1010*a* and the second dielectric substrate 1010*b* may be adhered by the bonding between the first and second adhesive layers 1041*a* and 1041*b*. Accordingly, the metal mesh grids formed on the first transparent dielectric substrate 1010*a* may be electrically connected to the feeding pattern formed on the second dielectric substrate 1010*b*.

The second conductive pattern 1120 and the third conductive pattern 1130 may be arranged on one surface and another surface of the second dielectric substrate 1010*b*, thereby implementing the feeding structure 1100*f*. The feeding structure 1100*f* may be implemented as a flexible printed circuit board (FPCB), but is not limited thereto. The first protective layer 1033 may be disposed on the third conductive pattern 1130, and the second protective layer 1034 may be disposed below the second conductive pattern 1120. The adhesive layer 1041*b* below the third conductive pattern 1130 may be bonded to the adhesive layer 1041*a* of the antenna module 1100. Accordingly, the feeding structure 1100*f* may be coupled with the antenna module 1100 and the first and second conductive patterns 1110 and 1120 may be electrically connected.

The antenna module 1100 implemented with the first transparent dielectric substrate 1010*a* may be formed to have a first thickness. The feeding structure 1100*f* implemented with the second dielectric substrate 1010*b* may be formed to have a second thickness. For example, the thicknesses of the dielectric substrate 1010*a*, the first conductive pattern 1110, and the protective layer 1031 of the antenna module 1100 may be 75 μm, 9 μm, and 25 μm, respectively. The first thickness of the antenna module 1100 may be 109 μm. The thicknesses of the second dielectric substrate 1010*b*, the second conductive pattern 1120, and the third conductive pattern 1130 of the feeding structure 1100*f* may be 50 μm, 18 μm, and 18 μm, respectively, and the thicknesses of the first and second protective layers 1033 and 1034 may be 28 μm. Accordingly, the second thickness of the feeding structure 1100*f* may be 142 μm. Since the adhesive layers 1041*a* and 1041*b* are formed on the first conductive pattern 1110 and below the second conductive pattern 1120, the entire thickness of the antenna assembly may be smaller than the sum of the first thickness and the second thickness. For example, the antenna assembly 1000 including the antenna module 1100 and the feeding structure 1100*f* may have a thickness of 198 μm.

Referring to (b) of FIG. 8B, the conductive pattern 1120 may be formed on one surface of the second dielectric substrate 1010*b* forming the feeding structure 1100*f*. The conductive pattern 1120 may be formed in a CPW-type feeding structure that includes the feeding pattern 1120*f* and the ground patterns 1121*g* and 1122*g* formed on both sides of the feeding pattern 1120*f*. The feeding structure 1100*f* may be coupled with the antenna module 1100, as illustrated in (a) of FIG. 8B, through a region where the adhesive layer 1041 is formed.

The antenna module and the feeding structure constituting the antenna assembly according to the specification may be arranged on the vehicle glass and coupled through a specific coupling structure. In this regard, FIG. 9A illustrates a coupling structure of a transparent antenna that is disposed in a transparent region and a frit region of a vehicle glass.

Figure 9A:
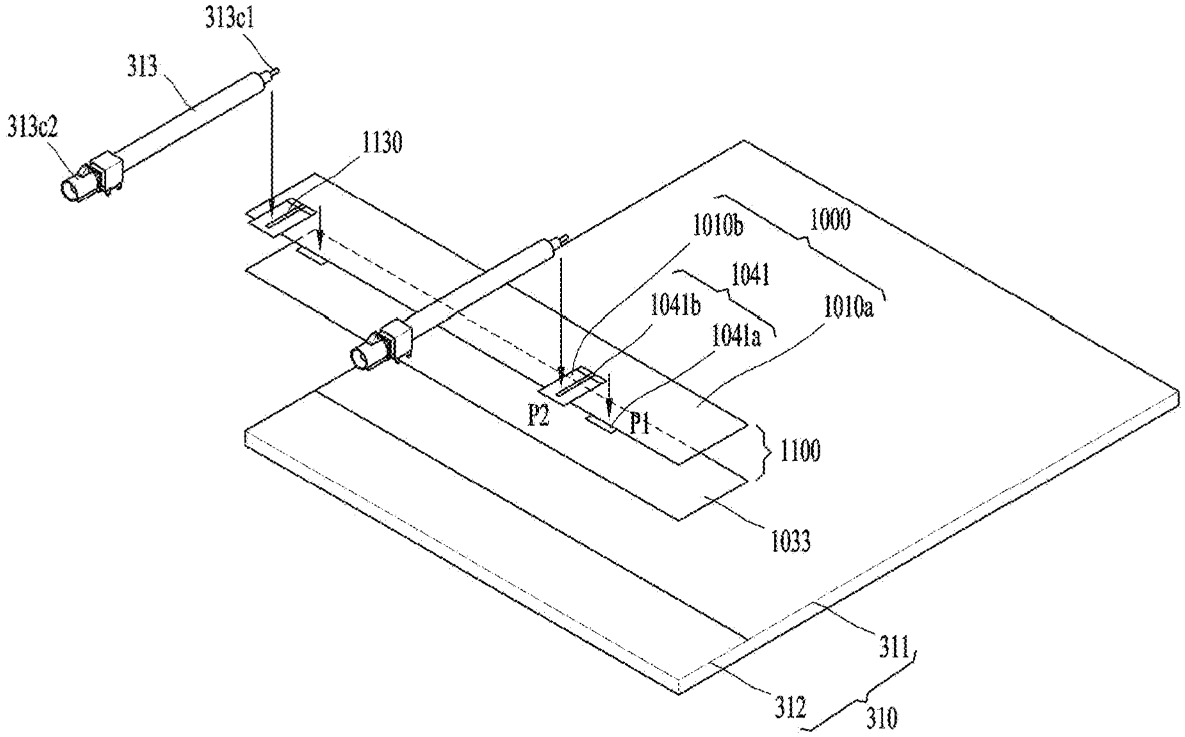
FIG. 9A is a view of a coupling structure of a transparent antenna which is disposed in a transparent region and a frit region of vehicle glass.

Referring to FIG. 9A, the first transparent dielectric substrate 1010*a* may be adhered to the glass panel 310 through the adhesive layer 1041. The conductive pattern of the first transparent dielectric substrate 1010*a* may be bonded to the conductive pattern 1130 of the second dielectric substrate 1010*b* through ACF bonding. ACF bonding involves bonding of a tape, to which metal balls are added, to a bonding surface at high temperature/high pressure (e.g., 120 to 150 degrees, 2 to 5 Mpa) for a few seconds, and may be achieved by allowing electrodes to be in contact with each other through the metal balls therebetween. ACF bonding may electrically connect conductive patterns and simultaneously provide adhesive strength by thermally hardening the adhesive layer 1041.

The first transparent dielectric substrate 1010*a*, on which the transparent electrode layer is formed, and the second dielectric substrate 1010*b* in the form of FPCB may be attached to each other through local soldering. The connection pattern of the FPCB and the transparent antenna electrode may be connected through the local soldering using a coil in a magnetic field induction manner. During such local soldering, an increase in temperature of a soldered portion may not occur or the FPCB may be maintained flat without deformation. Accordingly, an electrical connection with high reliability may be achieved through the local soldering between the conductive patterns of the first transparent dielectric substrate 1010*a* and the second dielectric substrate 1010*b*.

The first transparent dielectric substrate 1010*a*, the metal mesh layer 1020 of FIG. 7A, the protective layer 1033, and the adhesive layer 1041 may form a transparent electrode. The second dielectric substrate 1010*b*, which is the opaque substrate, may be implemented as the FPCB, but is not limited thereto. The second dielectric substrate 1010*b*, which is the FPCB with the feeding pattern, may be connected to the connector part 313 and the transparent electrode.

The second dielectric substrate 1010*b*, which is the opaque substrate, may be attached to a partial region of the first transparent dielectric substrate 1010*a*. The first transparent dielectric substrate 1010*a* may be formed in the transparent region 311 of the glass panel 310. The second dielectric substrate 1010*b* may be formed in the opaque region 312 of the glass panel 310. The partial region of the first transparent dielectric substrate 1010*a* may be formed in the opaque region 312, and the first transparent dielectric substrate 1010*a* may be coupled to the second dielectric substrate 1010*b* in the opaque region 312.

The first transparent dielectric substrate 1010*a* and the second dielectric substrate 1010*b* may be adhered by the bonding between the adhesive layers 1041*a* and 1041*b*. A position at which the second dielectric substrate 1010*b* is bonded to the adhesive layer 1041 may be set to a first position P1. A position at which the connector part 313 is soldered to the opaque substrate 1010*b* may be set to a second position P2.

Figure 9B:
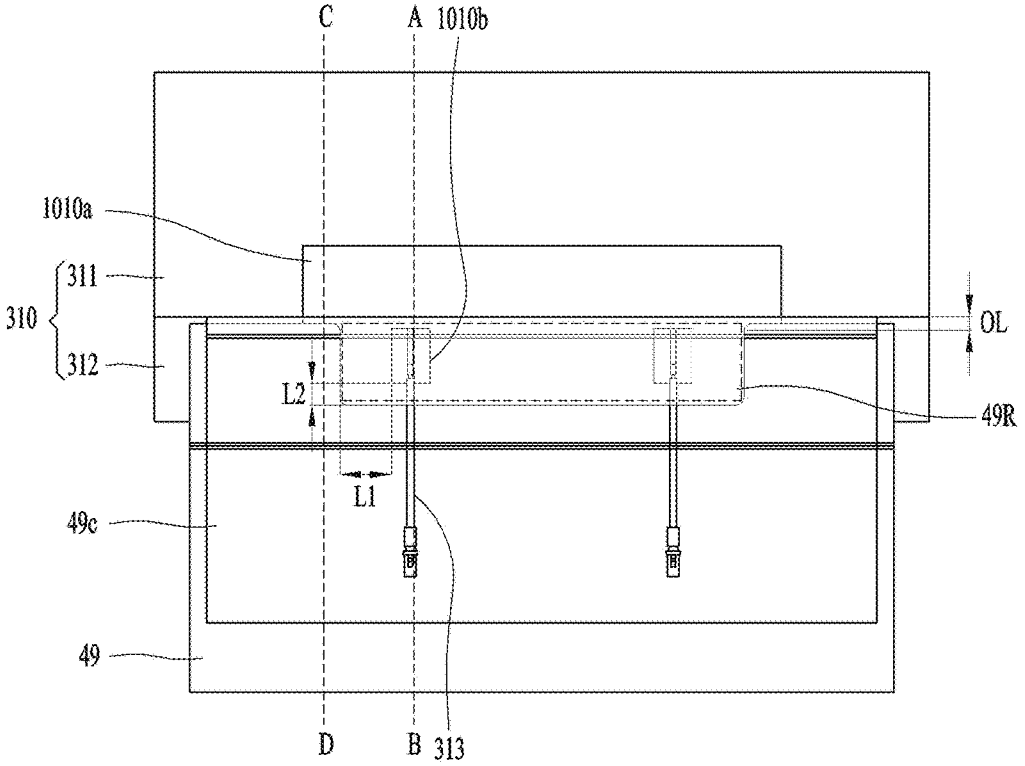
FIG. 9B is an enlarged front view of a region where glass with the transparent antenna of FIG. 9A is coupled to a body structure of the vehicle.
Figure 9C:
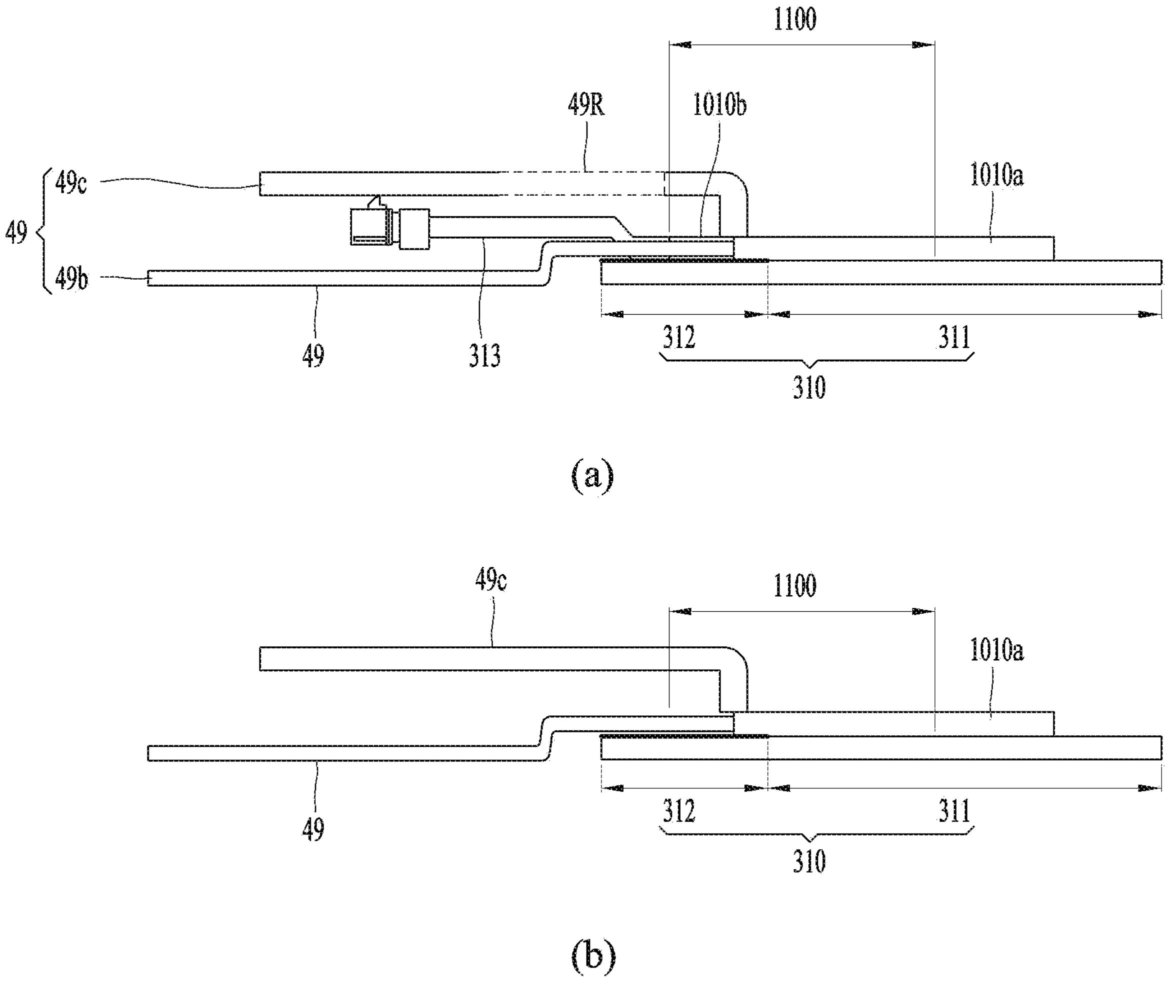
FIG. 9C is a cross-sectional view of the coupling structure between the vehicle glass and the body structure of FIG. 9B, viewed from different positions.

Meanwhile, the vehicle glass on which the antenna assembly according to the specification is formed may be coupled to a body structure of the vehicle. In this regard, FIG. 9B is an enlarged front view of a region where glass with the transparent antenna of FIG. 9A is coupled to a body structure of a vehicle. FIG. 9C is a cross-sectional view illustrating the coupling structure between the vehicle glass and the body structure of FIG. 9B, viewed from different positions.

Referring to FIG. 9B, the first transparent dielectric substrate 1010*a* on which a transparent antenna is formed may be disposed in the transparent region 311 of the glass panel 310. The second dielectric substrate 1010*b* may be disposed in the opaque region 312 of the glass panel 310. Since the transmittance of the opaque region 312 is lower than that of the transparent region 311, the opaque region 312 may also be referred to as a black matrix (BM) region. A portion of the first transparent dielectric substrate 1010*a* on which the transparent antenna is formed may extend up to the opaque region 312 corresponding to the BM region. The first transparent dielectric substrate 1010*a* and the opaque region 312 may be formed to overlap each other by an overlap length OL in one axial direction.

(a) of FIG. 9C is a cross-sectional view of the antenna assembly, cut along the line AB in FIG. 9B. (a) of FIG. 9C is a cross-sectional view of the antenna assembly, cut along the line CD in FIG. 9B.

Referring to FIG. 9B and (a) of FIG. 9C, the first transparent dielectric substrate 1010*a* on which the transparent antenna is formed may be disposed in the transparent region 311 of the glass panel 310. The second dielectric substrate 1010*b* may be disposed in the opaque region 312 of the glass panel 310. The partial region of the first transparent dielectric substrate 1010*a* may extend up to the opaque region 312, so that the feeding pattern formed on the second dielectric substrate 1010*b* and the metal mesh layer of the transparent antenna are bonded and connected to each other.

An interior cover 49*c* may be configured to accommodate the connector part 313 connected to the second dielectric substrate 1010*b*. The connector part 313 may be disposed in a space between a body 49*b* made of a metal material and the interior cover 49*c*, and the connector part 313 may be coupled to an in-vehicle cable. The interior cover 49*c* may be disposed in an upper region of the body 49*b* made of the metal material. The interior cover 49*c* may be formed with one end bent to be coupled to the metal body 49*b*.

The interior cover 49*c* may be made of a metal material or dielectric material. When the interior cover 49*c* is made of a metal material, the interior cover 49*c* and the body 49*b* made of the metal material may constitute a metal frame 49. In this regard, the vehicle may include the metal frame 49. The opaque region 312 of the glass panel 310 may be supported by a portion of the metal frame 49. To this end, a portion of the body 49*b* of the metal frame 49 may be bent to be coupled to the opaque region 312 of the glass panel 310.

When the interior cover 49*c* is made of a metal material, at least a portion of a metal region of the interior cover 49*c* in the upper region of the second dielectric substrate 1010*b* may be cut out. A recess portion 49R from which the metal region has been cut out may be formed in the interior cover 49*c*. Accordingly, the metal frame 49 may include the recess portion 49R. The second dielectric substrate 1010*b* may be placed within the recess portion 49R of the metal frame 49.

The recess portion 49R may also be referred to as a metal cut region. One side of the recess portion 49R may be formed to be spaced apart from one side of the opaque substrate 1010*b* by a first length L1 which is equal to or greater than a threshold value. A lower boundary side of the recess portion 49R may be formed to be spaced apart from a lower boundary side of the opaque substrate 1010*b* by a second length L2 which is equal to or greater than a threshold value. As the metal is removed from the partial region of the interior cover 49*c* made of the metal material, signal loss and changes in antenna characteristics due to a surrounding metal structure may be suppressed.

Referring to FIG. 9B and (b) of FIG. 9C, a recess portion like a metal cut region may not be formed in the interior cover 49*c* in a region where the connector part and the opaque substrate are not disposed. In this regard, while protecting the internal components of the antenna module 1100 by use of the interior cover 49*c*, internal heat may be dissipated to the outside through the recess portion 49R of FIG. 9B and (a) of FIG. 9C. In addition, whether it is necessary to repair a connected portion may be immediately determined through the recess portion 49R of the interior cover 49*c*. Meanwhile, since the recess portion is not formed in the interior cover 49*c* in a region where the connector part and the second dielectric substrate are not arranged, the internal components of the antenna module 1100 may be protected.

Meanwhile, an antenna assembly 1000 according to the specification may be formed in various shapes on a glass panel 310, and the glass panel 310 may be attached to a vehicle frame. In this regard, FIG. 10 illustrates a stacked structure of an antenna assembly and an attachment region between vehicle glass and a vehicle frame according to embodiments.

Figure 10:
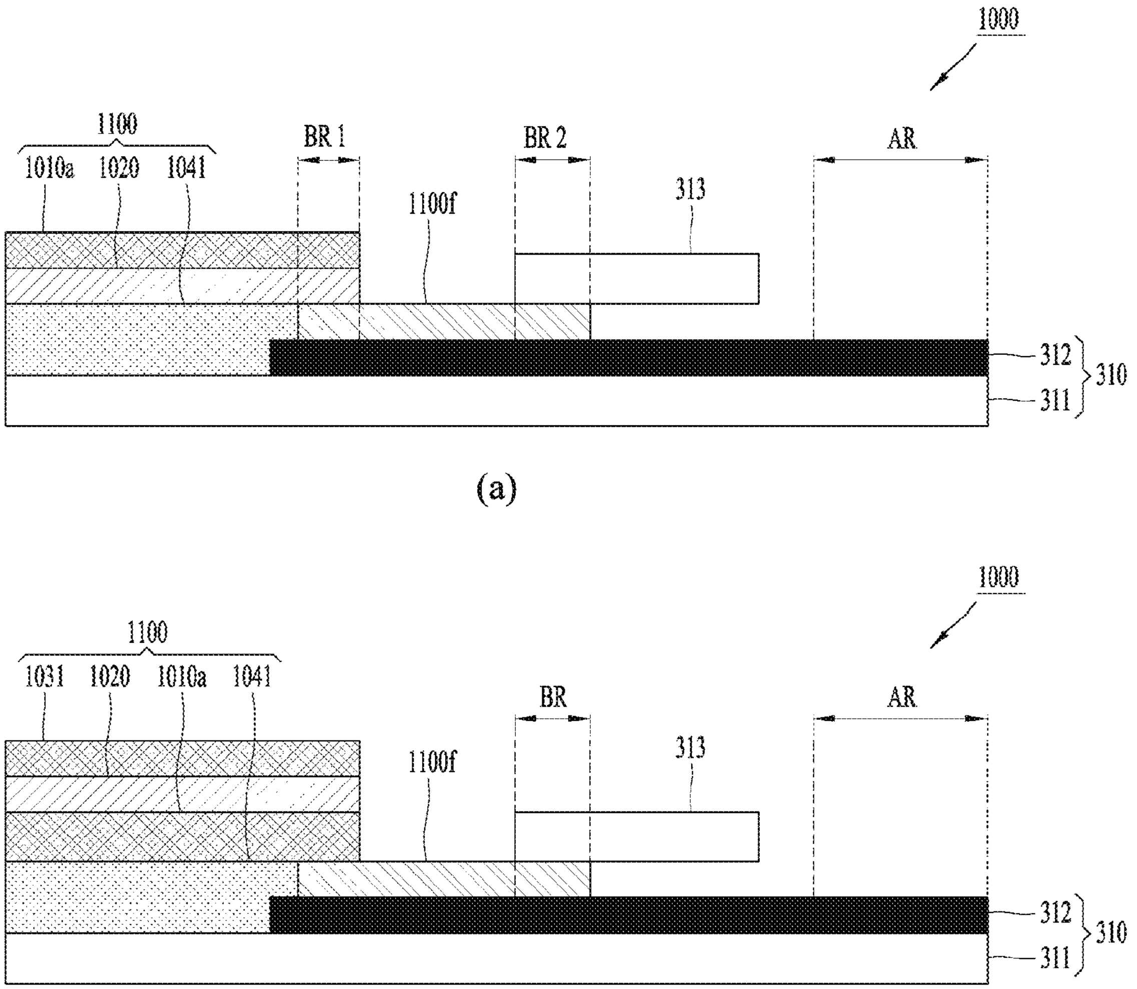
FIG. 10 is a view of a stacked structure of an antenna assembly and an attachment region between vehicle glass and a vehicle frame according to embodiments.

Referring to (a) of FIG. 10, the glass panel 310 may include a transparent region 311 and an opaque region 312. The antenna assembly 1000 may include an antenna module 1100 and a feeding structure 1100*f*. The antenna module 1100 may include a first transparent dielectric substrate 1010*a*, a transparent electrode layer 1020, and an adhesive layer 1041. The feeding structure 1100*f* implemented as the opaque substrate and the transparent electrode layer 1020 implemented as the transparent substrate may be electrically connected to each other. The feeding structure 1100*f* and the transparent electrode layer 1020 may be directly connected through a first bonding region BR1. The feeding structure 1100*f* and the connector part 313 may be directly connected through a second bonding region BR2. Heat may be applied for bonding in the first and second bonding regions BR1 and BR2. Accordingly, the bonding regions BR1 and BR2 may be referred to as heating sections. An attachment region AR corresponding to a sealant region for attachment of the glass panel 310 to the vehicle frame may be formed on a side end area in the opaque region 312 of the glass panel 310.

Referring to (b) of FIG. 10, the glass panel 310 may include a transparent region 311 and an opaque region 312. The antenna assembly 1000 may include an antenna module 1100 and a feeding structure 1100*f*. The antenna module 1100 may include a protective layer 1031, the transparent electrode layer 1020, a first transparent dielectric substrate 1010*a*, and an adhesive layer 1041. The feeding structure 1100*f* implemented as an opaque substrate may overlap a partial region of the antenna module 1100 implemented as a transparent substrate. The feeding structure 1100*f* and the transparent electrode layer 1020 of the antenna module 1100 may be connected in a coupled-feeding manner. The feeding structure 1100*f* and the connector part 313 may be directly connected through a bonding region BR. Heat may be applied for bonding in the bonding region BR1. Accordingly, the bonding region BR may be referred to as a heating section. An attachment region AR corresponding to a sealant region for attachment of the glass panel 310 to the vehicle frame may be formed on a side end area in the opaque region 312 of the glass panel 310.

Referring to (a) and (b) of FIG. 10, the transparent substrate 1010*a* may include a (hard) coating layer to protect the transparent electrode layer 1020 from an external environment. Meanwhile, a UV-cut component may be added to the adhesive layer 1041 to suppress yellowing due to sunlight.

A broadband transparent antenna structure according to the disclosure, which may be disposed on glass of a vehicle, may be implemented with a single dielectric substrate on the same plane as a CPW feeder. In addition, a broadband transparent antenna structure according to the disclosure, which may be disposed on glass of a vehicle, may be implemented with a structure in which grounds are formed at opposite sides of a radiator so as to constitute a broadband structure. Hereinafter, an antenna assembly associated with a broadband transparent antenna structure according to the specification will be described. In this regard, FIG. 11 shows a front view and a lateral view of an antenna assembly which may be attached on front glass of a vehicle.

Figure 11:
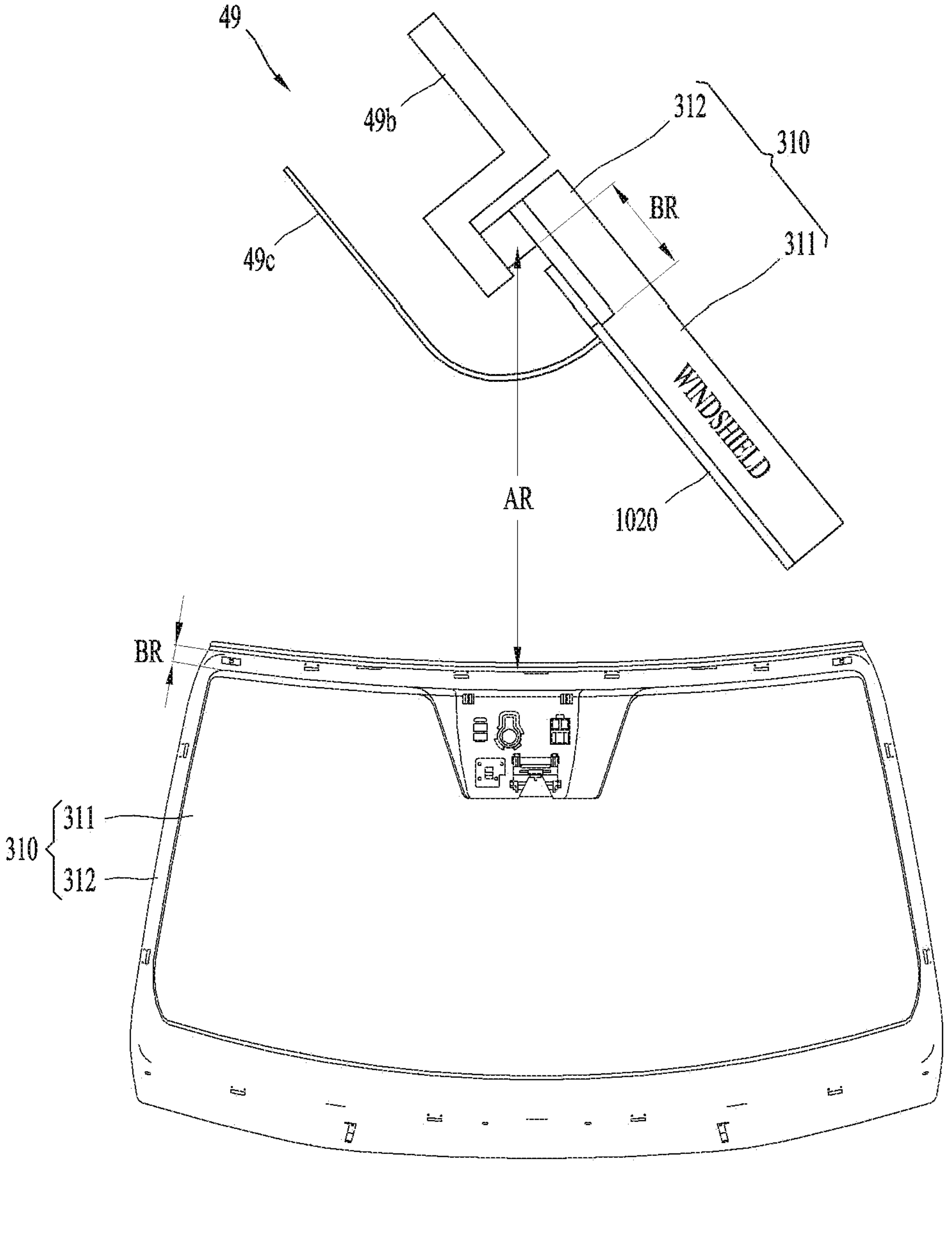
FIG. 11 shows a front view and a lateral view of an antenna assembly which may be attached on front glass of a vehicle.

Referring to FIG. 11, a metal mesh layer 1020 which is a transparent pattern may be formed as an antenna pattern in a region of a glass panel 310 adjacent to a metal frame 49 of the vehicle. An interior cover 49*c* may include a metal material or dielectric material. When the interior cover 49*c* includes the metal material, the interior cover 49*c* and the body 49*b* made of a metal material may constitute a metal frame 49.

The metal mesh layer 1020 formed as the antenna pattern may be formed in a region of front glass, for example, in an upper region of the front glass to be adjacent to the metal frame 49, but is not limited to this, and may change depending on the application. The glass panel 310 may include a transparent region 311 and an opaque region 312. The metal mesh layer 1020 as the transparent pattern may be formed in the transparent region 311, and an FPCB 1100*b* for feeding an antenna may be formed in the opaque region 312.

An attachment region AR corresponding to a sealant region for attachment of the glass panel 310 to the metal frame 49 may be formed in a side end region of the opaque region 312. The FPCB 1100*b* may be bonded to the glass panel 310 through a bonding region BR. The FPCB 1100*b* for feeding may be formed with a first length. An end of the FPCB 1100*b* and an end of the attachment region AR may form a bonding tolerance of a second length which is shorter than the first length. For example, the FPCB 1100*b* may be formed with a first length of about 12 mm, and the end of the FPCB 1100*b* and the end of the attachment region AR may be apart from each other by a second length of about 8 mm.

Meanwhile, a cable structure for feeding the antenna assembly according to the specification may be arranged vertically or horizontally to the metal frame 49 of the vehicle. In this regard, FIGS. 12A to 12C compare cable structures and reflection coefficient characteristics of antenna assemblies according to embodiments.

Figure 12A:
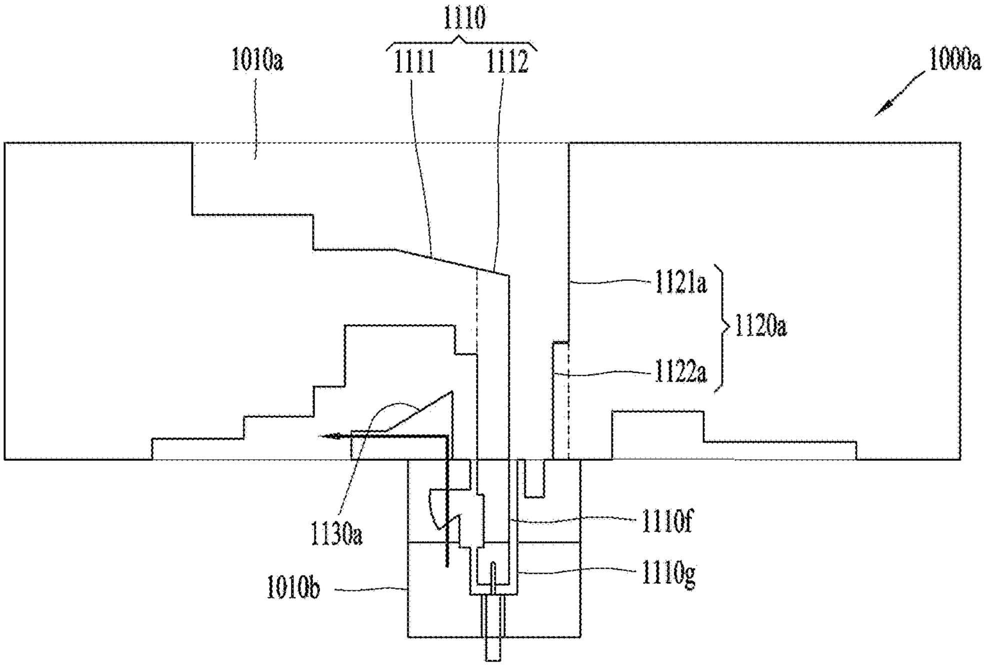
FIGS. 12A to 12C compare cable structures and reflection coefficient characteristics of antenna assemblies according to embodiments.
Figure 12A:
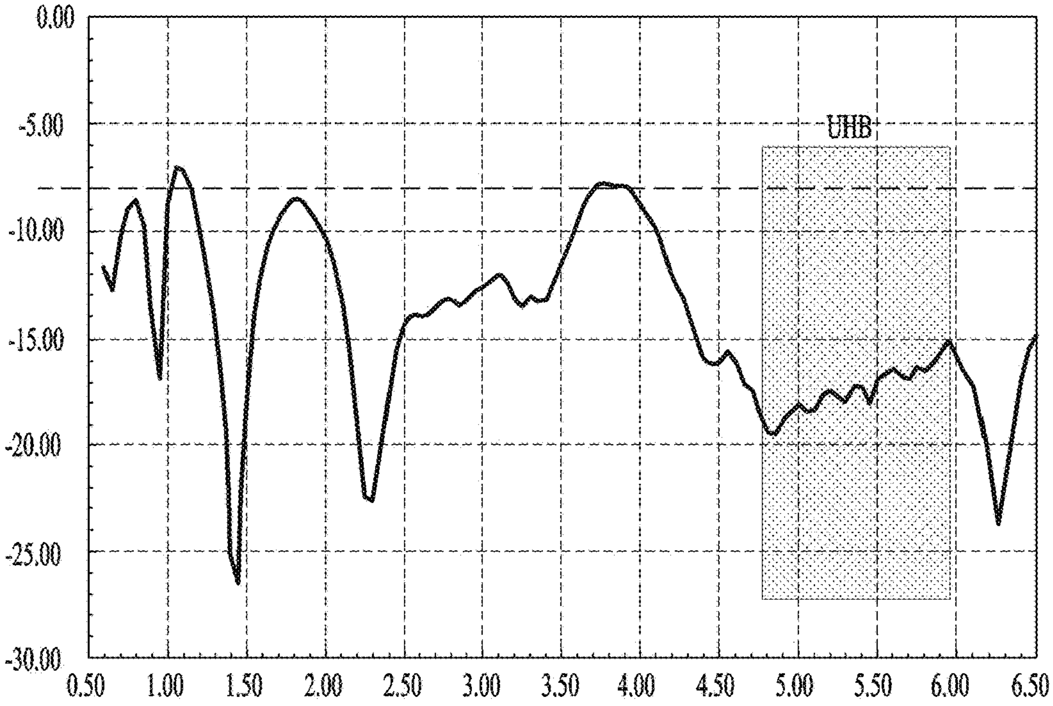

(a) of FIG. 12A shows a first structure of an antenna assembly 1000*a* which includes first to third conductive patterns 1110, 1120*a*, and 1130*a*. The first to third conductive patterns 1110*a*, 1120*a*, and 1130*a* may be arranged on a first dielectric substrate 1010*a*, and a feeding pattern 1110*f* and a ground conductive pattern 1110*g* may be formed in an FPCB structure on a second dielectric substrate 1010*b*. The first conductive pattern 1110*a* may include a first part 1111 and a second part 1112 formed perpendicular to the first part 1111. The second conductive pattern 1120*a* may include a third part 1121*a* and a fourth part 1122*a* formed perpendicular to the third part 1121*a*. The third conductive pattern 1130*a* may be located between the first conductive pattern 1110*a* and the ground conductive pattern 1110*g*.

(b) of FIG. 12A shows the reflection coefficient characteristics of the antenna assembly 1000*a*. Referring to FIG. 12A, the antenna assembly 1000*a* configured by the third conductive pattern 1130*a* may exhibit a resonance characteristic of −15 dB or less in an ultra-high band (UHB) of at least 4.5 GHZ. UHB may be a frequency band higher than operating frequency bands of the first conductive pattern 1110 and the second conductive pattern 1120.

Figure 12B:
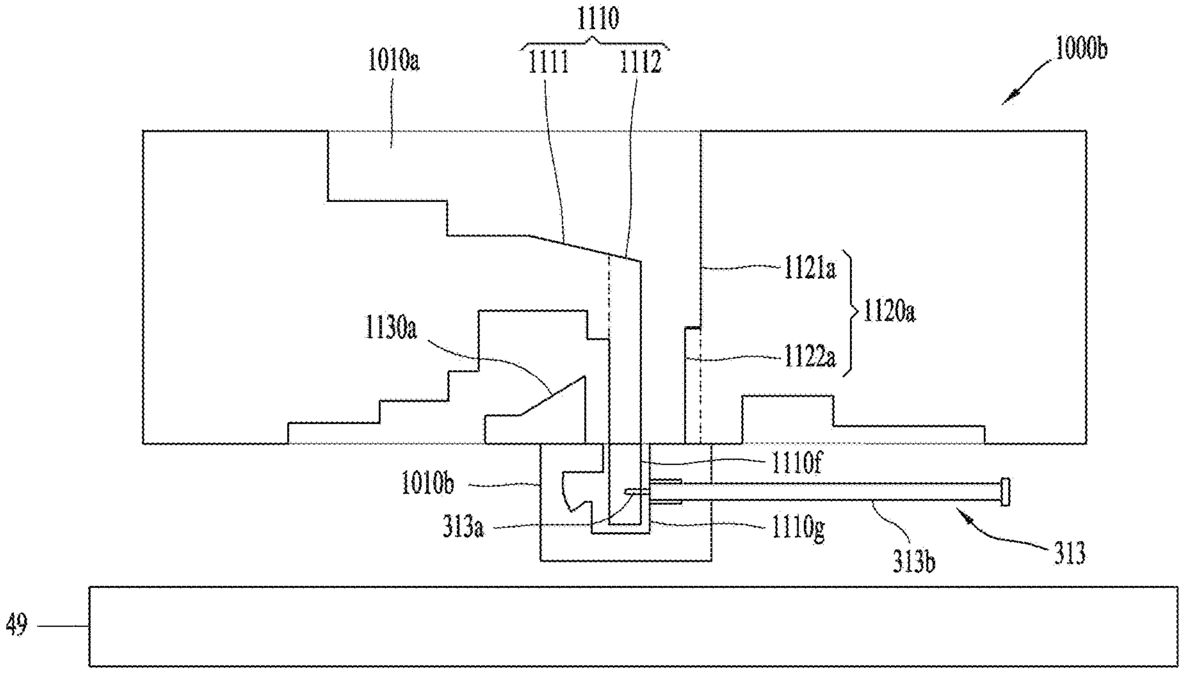
Figure 12B:
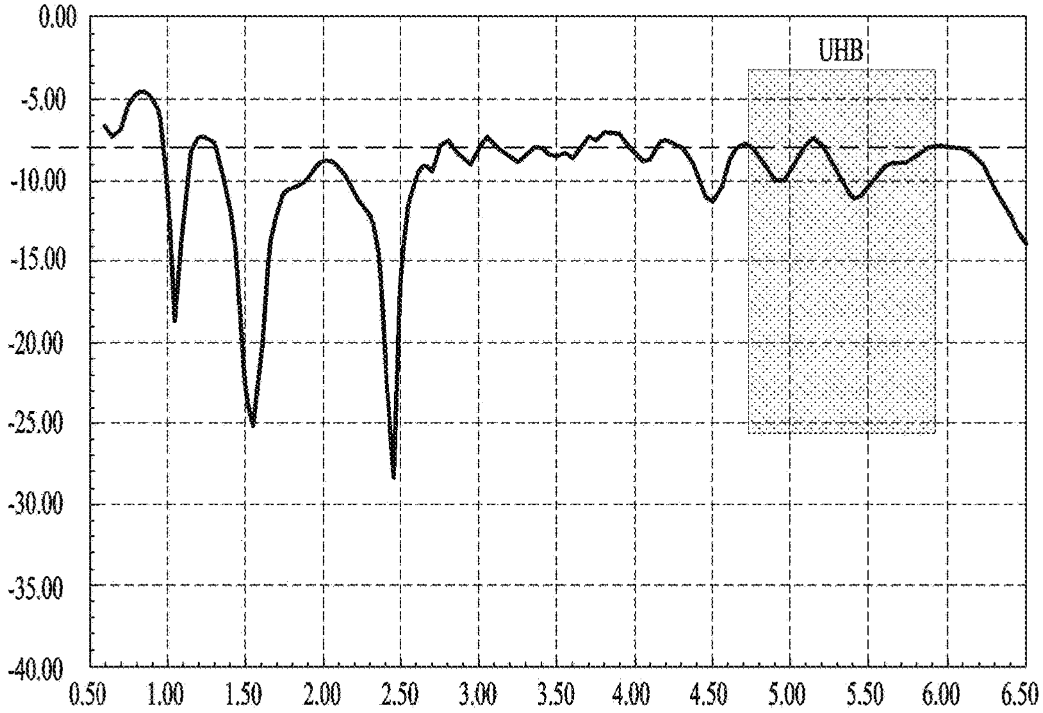
Figure 12C:
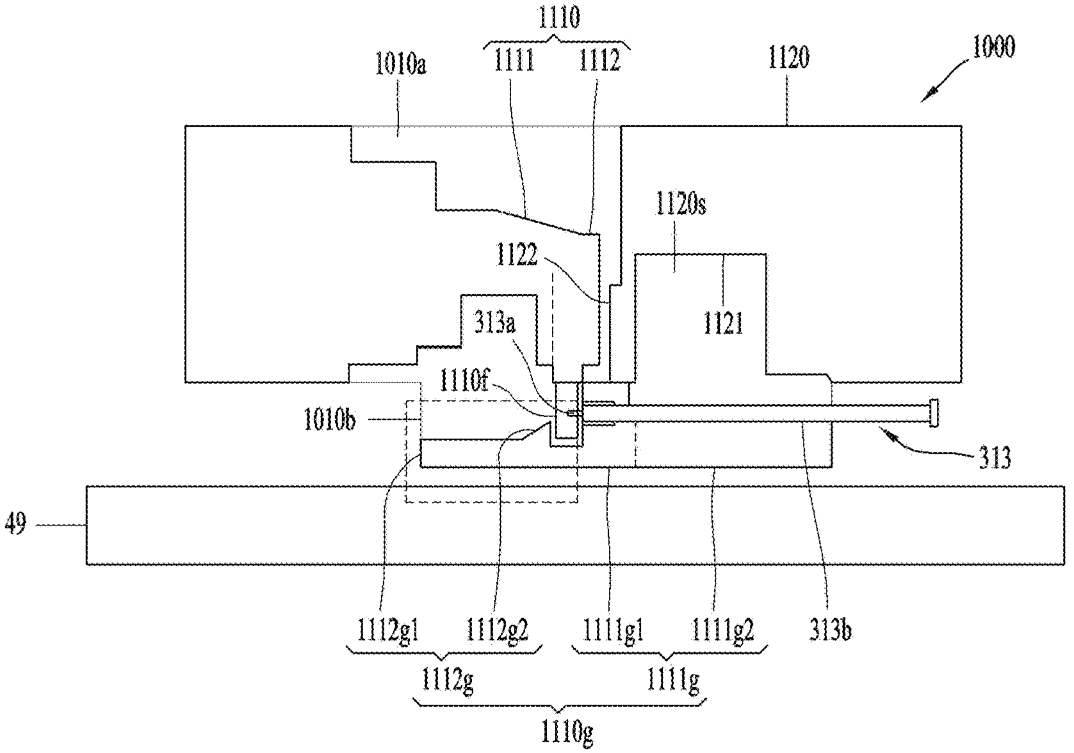
Figure 12C:
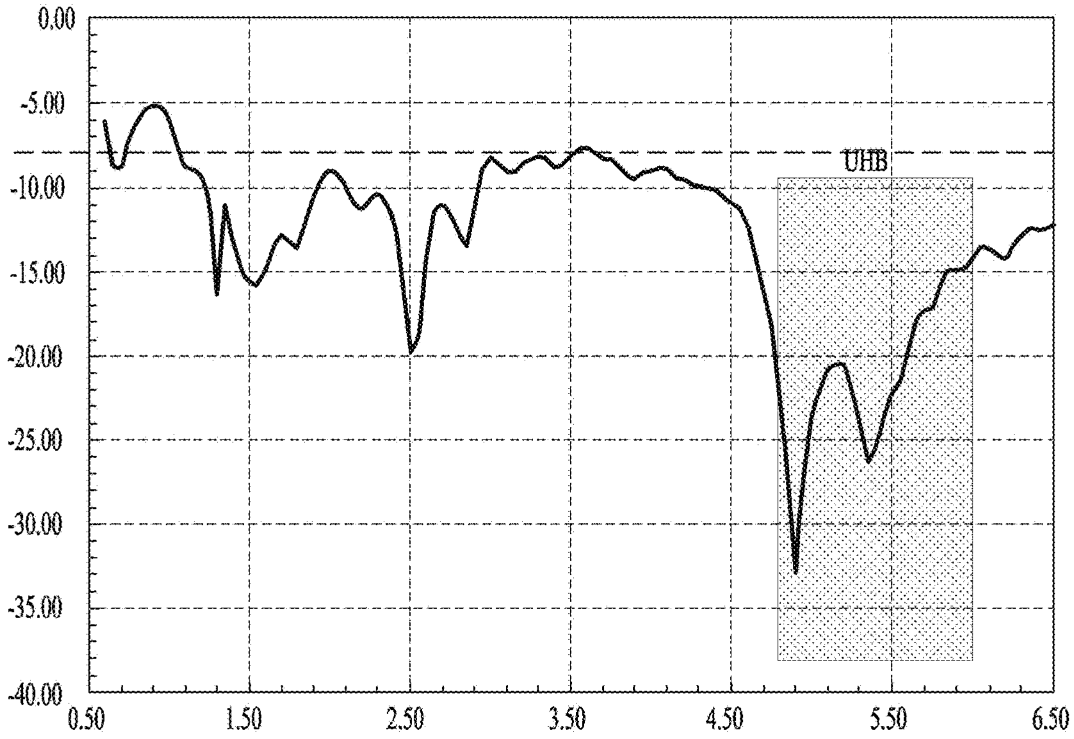

(a) of FIG. 12B shows a second structure in which an antenna assembly 1000*b* is placed adjacent to the metal frame 49 of the vehicle. The metal frame 49 may be arranged adjacent to the antenna assembly 1000*b*, which includes first to third conductive patterns 1110, 1120*a*, and 1130*a*. The first to third conductive patterns 1110, 1120*a*, and 1130*a* may be arranged on a first dielectric substrate 1010*a*, and a feeding pattern 1110*f* and a ground conductive pattern 1110*g* may be formed in an FPCB structure on a second dielectric substrate 1010*b*. A coaxial cable 313 may be arranged parallel to the metal frame 49. A signal line 313*a* of the coaxial cable 313 may be connected to the feeding pattern 1110*f*, and a ground 313*b* of the coaxial cable 313 may be connected to the ground conductive pattern 1110*g*.

(b) of FIG. 12B shows the reflection coefficient characteristics of the antenna assembly 1000*b*. Referring to FIG. 12B, the antenna assembly 1000*b* which is configured by the third conductive pattern 1130*a*, may exhibit a deteriorated resonance characteristic in the UHB band of at least 4.5 GHz in the structure in which the coaxial cable 313 is arranged parallel to the metal frame 49.

(a) of FIG. 12C shows a third structure in which an antenna assembly 1000 is placed adjacent to the metal frame 49 of the vehicle. (a) of FIG. 12C shows a structure in which the metal frame 49 of the vehicle is arranged adjacent to the antenna assembly 1000 including first and second conductive patterns 1110 and 1120. The first and second conductive patterns 1110 and 1120 may be arranged on a first dielectric substrate 1010*a*, and a feeding pattern 1110*f* and a ground conductive pattern 1110*g* may be formed in an FPCB structure on a second dielectric substrate 1010*b*. A first region 1111*g* of the ground conductive pattern 1110*g* may be connected to a ground 313*b* of a coaxial cable 313. A portion of the first region 1111*g* of the ground conductive pattern 1110*g* may be connected to the second conductive pattern 1120. A second region 1112*g* of the ground conductive pattern 1110*g* may operate as a UHB radiator. The coaxial cable 313 may be arranged parallel to the metal frame 49. A signal line 313*a* of the coaxial cable 313 may be connected to the feeding pattern 1110*f*, and the ground 313*b* of the coaxial cable 313 may be connected to the ground conductive pattern 1110*g*.

(b) of FIG. 12C shows the reflection coefficient characteristics of the antenna assembly 1000. Referring to FIG. 12C, the antenna assembly 1000 which is configured by the second region 1112*g* of the ground conductive pattern 1110*g*, may exhibit an improved resonance characteristic in the UHB band of at least 4.5 GHz in the structure in which the coaxial cable 313 is arranged parallel to the metal frame 49. The antenna assembly 1000 including the second region 1112*g* of the ground conductive pattern 1110*g* may exhibit a resonance characteristic of −15 dB or less in the UHB band of at least 4.5 GHZ.

Hereinafter, antenna radiation characteristics will be described with reference to views of electric field distributions in those structures of the antenna assemblies described above. In this regard, FIG. 13 is a view of electric field distributions of the structures of the antenna assemblies illustrated in FIGS. 12A to 12C.

Figure 13:
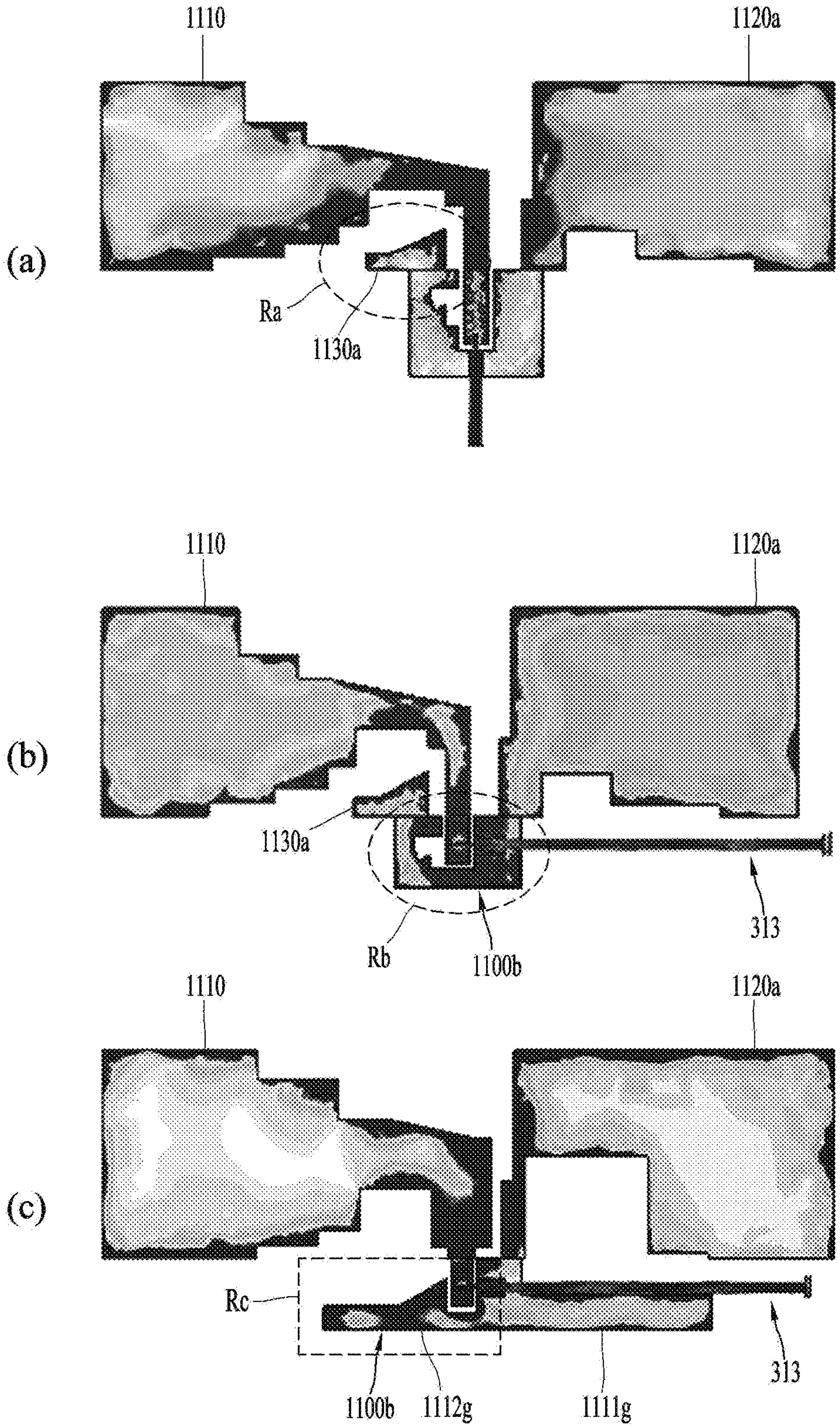
FIG. 13 is a view of electric field distributions of the structures of the antenna assemblies illustrated in FIGS. 12A to 12C.

Referring to FIG. 12A and (a) of FIG. 13, it may be confirmed that an electric field distribution value of a first region Ra in which the third conductive pattern 1130*a* formed as a stub is arranged is higher than those of other regions. Accordingly, the radiation contribution of the third conductive pattern 1130*a* may be higher than the radiation contributions of other conductive patterns. The third conductive pattern 1130*a* may have an optimal shape formed by combining triangular and square structures, enabling broadband impedance tuning in the UHB band.

Referring to FIG. 12B and (b) of FIG. 13, the electric field distribution may be concentrated in the second region Rb of the FPCB 1100*b* due to the change in the arrangement structure of the coaxial cable 313 for feeding. Accordingly, the electric field distribution in the third conductive pattern 1130*a* formed as the stub may be relatively low. Therefore, the radiation contribution of the second region Rb of the FPCB 1100*b* may be higher than the radiation contribution of the third conductive pattern 1130*a*. In this regard, broadband impedance tuning may not be achieved in the UHB band because the second region Rb of the FPCB 1100*b* does not have an optimal shape.

Referring to FIG. 12C and (c) of FIG. 13, the ground conductive pattern of the FPCB 1100*b* may extend to an area symmetrical to the area where the coaxial cable 313 is arranged, to be used as a radiator in the UHB band. In this regard, the electric field distribution value of a third region Rc where the second region 1112*g* of the ground conductive pattern 1110*g* is arranged may be higher than the electric field distribution values of other regions. The third region Rc in which the second region 1112*g* of the ground conductive pattern 1110*g* is arranged may operate as a radiator in the UHB band. Accordingly, the second region 1112*g* of the ground conductive pattern 1110*g* may replace the third conductive pattern which is implemented as a transparent antenna in the UHB band. The second region 1112*g* of the ground conductive pattern 1110*g* may be formed in a structure in which triangular and square structures are combined, enabling broadband impedance tuning in the UHB band.

Figure 14A:
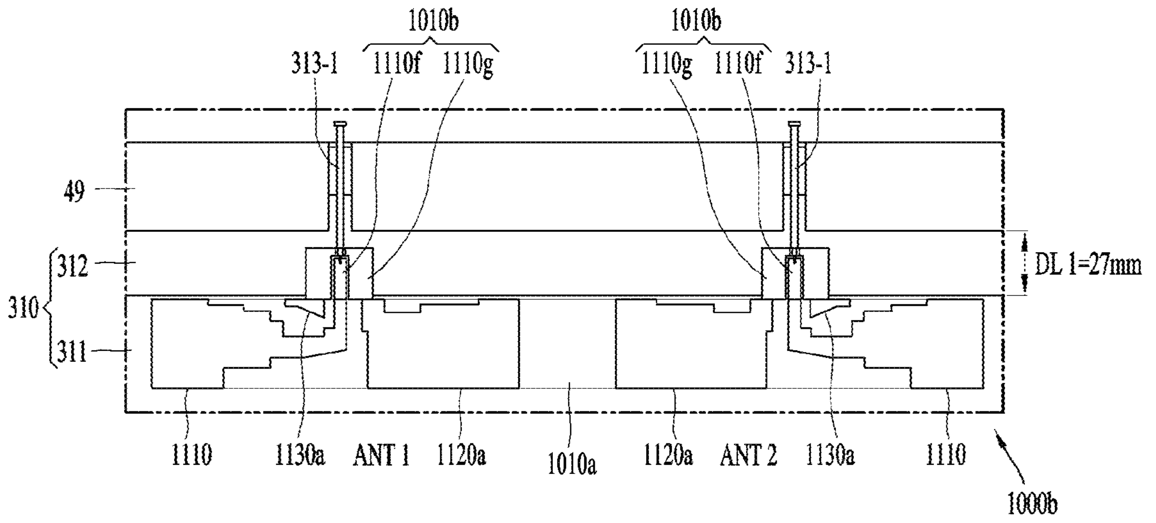
FIG. 14A compares a first structure arranged vertically and a second structure arranged horizontally on a metal frame of a vehicle according to embodiments.

The antenna assembly may be arranged vertically or horizontally on the metal frame of the vehicle. In this regard, FIG. 14A compares a first structure arranged vertically and a second structure arranged horizontally on a metal frame of a vehicle according to embodiments. FIG. 14B compares antenna efficiencies of the first and second structures of FIG. 14A.

Referring to FIGS. 11 and 14A, the metal mesh layer 1020 may be arranged in the transparent region 311 of the glass panel 310 on the first dielectric substrate 1010*a* of the antenna assembly 1000*b*, 1000. The first to third conductive patterns 1110, 1120*a*, and 1130*a* formed on the first dielectric substrate 1010*a* may be configured as a first antenna ANT1. A second antenna ANT2 may be formed symmetrically with the first antenna ANT1 at a certain distance from the first antenna ANT1. Fourth to sixth conductive patterns 1110, 1120*a*, and 1130*a* formed on the first dielectric substrate 1010*a* may be configured as the second antenna ANT2.

(a) of FIG. 14A shows a first structure in which a coaxial cable 313-1 is arranged in a direction perpendicular to the metal frame 49 of the vehicle. In some embodiments, (b) of FIG. 13A shows a second structure in which the coaxial cable 313 is arranged in a horizontal direction with respect to the metal frame 49 of the vehicle.

Referring to FIG. 11 and (a) of FIG. 14A, the feeding pattern 1110*f* and the ground conductive pattern 1110*g* may be formed on the second dielectric substrate 1010*b* of the antenna assembly 1000*b*. The second dielectric substrate 1010*b* may be located in the opaque region 312 of the glass panel 310. The frame 49 of the vehicle may be arranged adjacent to the opaque region 312 of the glass panel 310. In the first structure in which the coaxial cable 313-1 connected to the feeding pattern 1110*f* is arranged in the direction perpendicular to the metal frame 49 of the vehicle, the opaque region 312 may be formed with a first length DL1 in a first axial direction. For example, the first length DL1 of the opaque region 312 in the first axial direction may be about 27 mm.

Referring to FIG. 11 and (b) of FIG. 14A, the feeding pattern 1110*f* and the ground conductive pattern 1110*g* may be formed on the second dielectric substrate 1010*b* of the antenna assembly 1000. The second dielectric substrate 1010*b* may be located in the opaque region 312 of the glass panel 310. The frame 49 of the vehicle may be arranged adjacent to the opaque region 312 of the glass panel 310. In the second structure in which the coaxial cable 313 connected to the feeding pattern 1110*f* is arranged in the horizontal direction with respect to the metal frame 49 of the vehicle, the opaque region 312 may be formed with a second length DL2 in the first axial direction. For example, the second length DL2 of the opaque region 312 in the first axial direction may be about 19 mm. In the second structure where the coaxial cable 313 is arranged in the horizontal direction with respect to the metal frame 49 of the vehicle, a TCU may be coupled between the coaxial cables 313. Accordingly, the second structure in which the coaxial cable 313 is arranged in the horizontal direction with respect to the metal frame 49 of the vehicle may be a structure which facilitates coupling with the TCU.

Referring to (a) of FIG. 14A and FIG. 14B, (i) the first structure in which the coaxial cable 313-1 is arranged in the direction perpendicular to the metal frame 49 of the vehicle may exhibit the antenna efficiency characteristic of at least −3 dB in a frequency band of 600 MHZ to 0.6 GHz. Referring to (b) of FIG. 14A and FIG. 14B, (ii) the second structure in which the coaxial cable 313 is arranged in the horizontal direction with respect to the metal frame 49 of the vehicle may exhibit the antenna efficiency of −3 dB or less in a frequency band of 600 MHZ to 800 MHZ. For example, at a frequency of about 700 MHZ, LB antenna efficiency may be reduced by about 1.5 dB.

Referring to (a) of FIG. 14A and FIG. 14B, (i) the first structure in which the coaxial cable 313-1 is arranged in the direction perpendicular to the metal frame 49 of the vehicle may exhibit the antenna efficiency characteristic of at least −3 dB in a frequency band of 4.5 GHZ to 6 GHz. (ii) The second structure in which the coaxial cable 313 is arranged in the horizontal direction with respect to the metal frame 49 of the vehicle may exhibit the antenna efficiency of −3 dB or less in a frequency band of 4.5 GHz to 6 GHz. For example, at a frequency of about 5.6 GHZ, UHB antenna efficiency may be reduced by about 1.5 dB.

Therefore, in the antenna assembly according to the specification, the reduction in distance between the metal frame 49 of the vehicle and the transparent antenna pattern may cause a decrease in antenna efficiency of at least 1.5 dB in the LB band. In another example, in the antenna assembly according to the specification, the reduction in antenna efficiency of at least 1.5 dB occurs in the UHB band depending on a direction in which the coaxial cable is mounted.

Figure 14A:
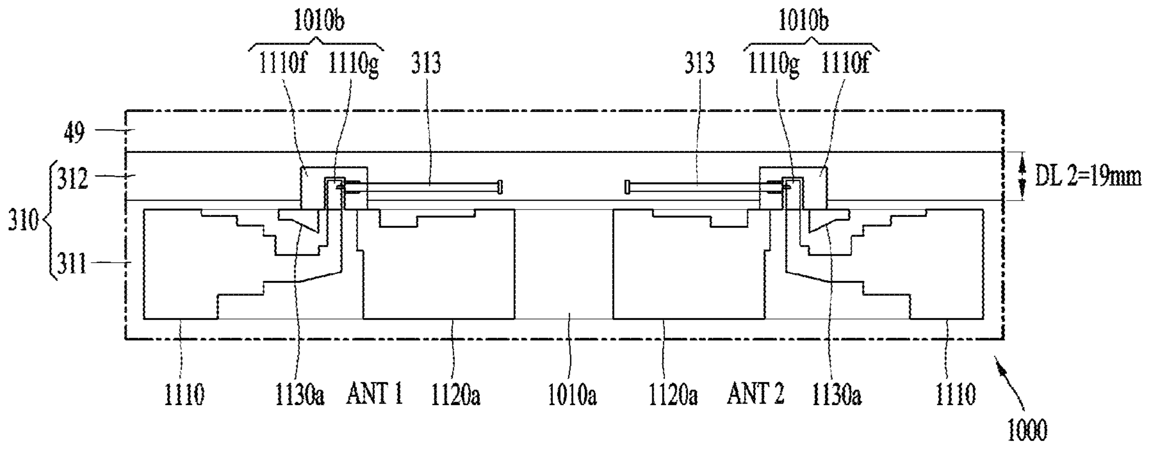
Figure 14B:
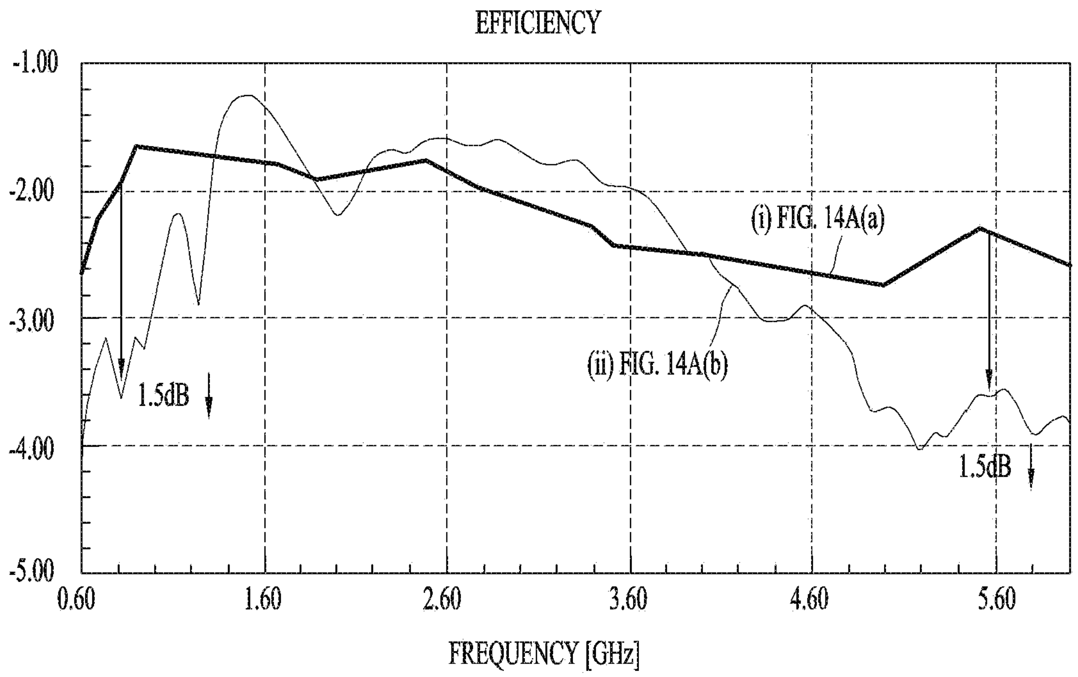
FIG. 14B compares antenna efficiencies of the first and second structures of FIG. 14A.
Figure 15A:
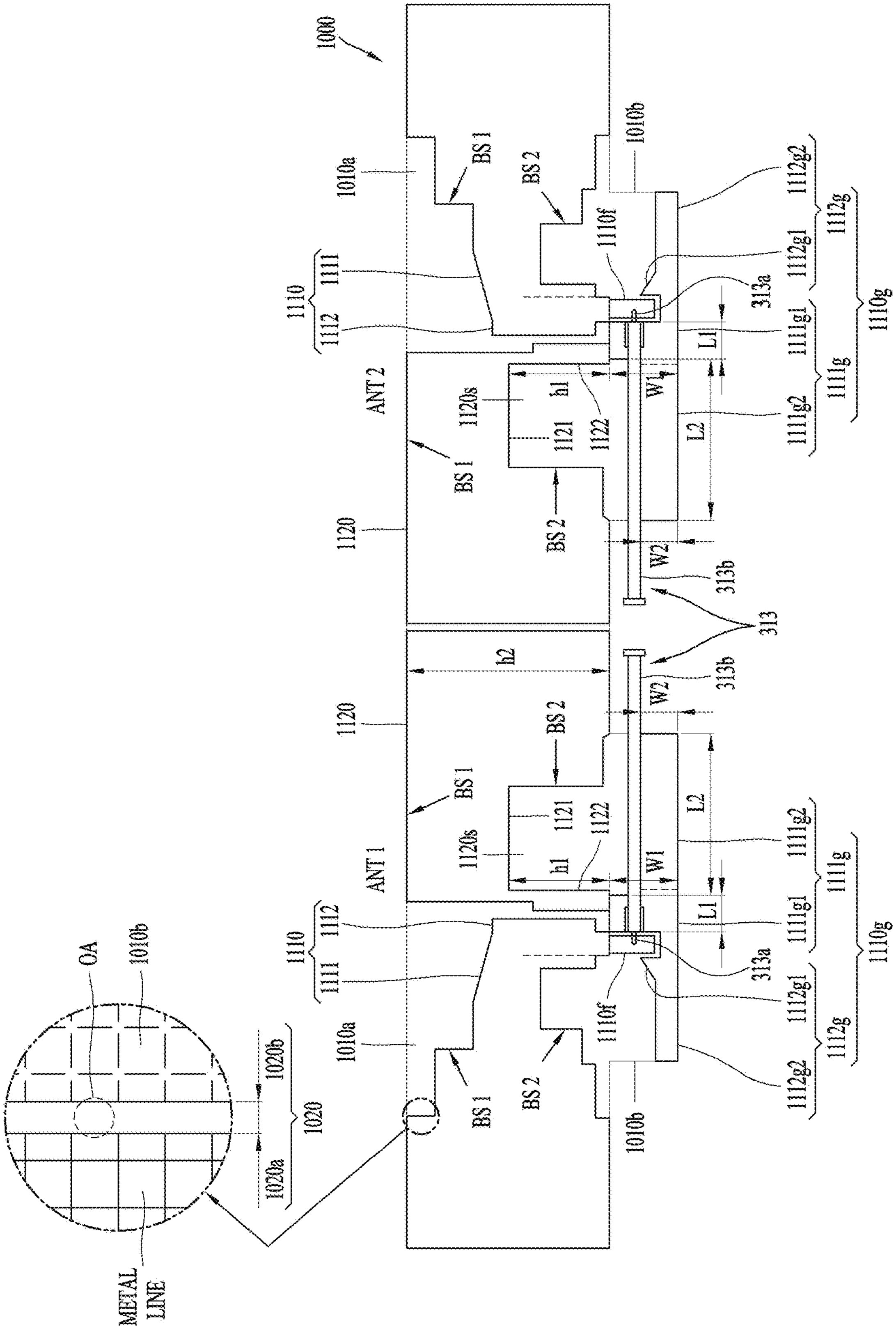
FIG. 15A is a front view of an antenna assembly according to the disclosure.
Figure 15B:
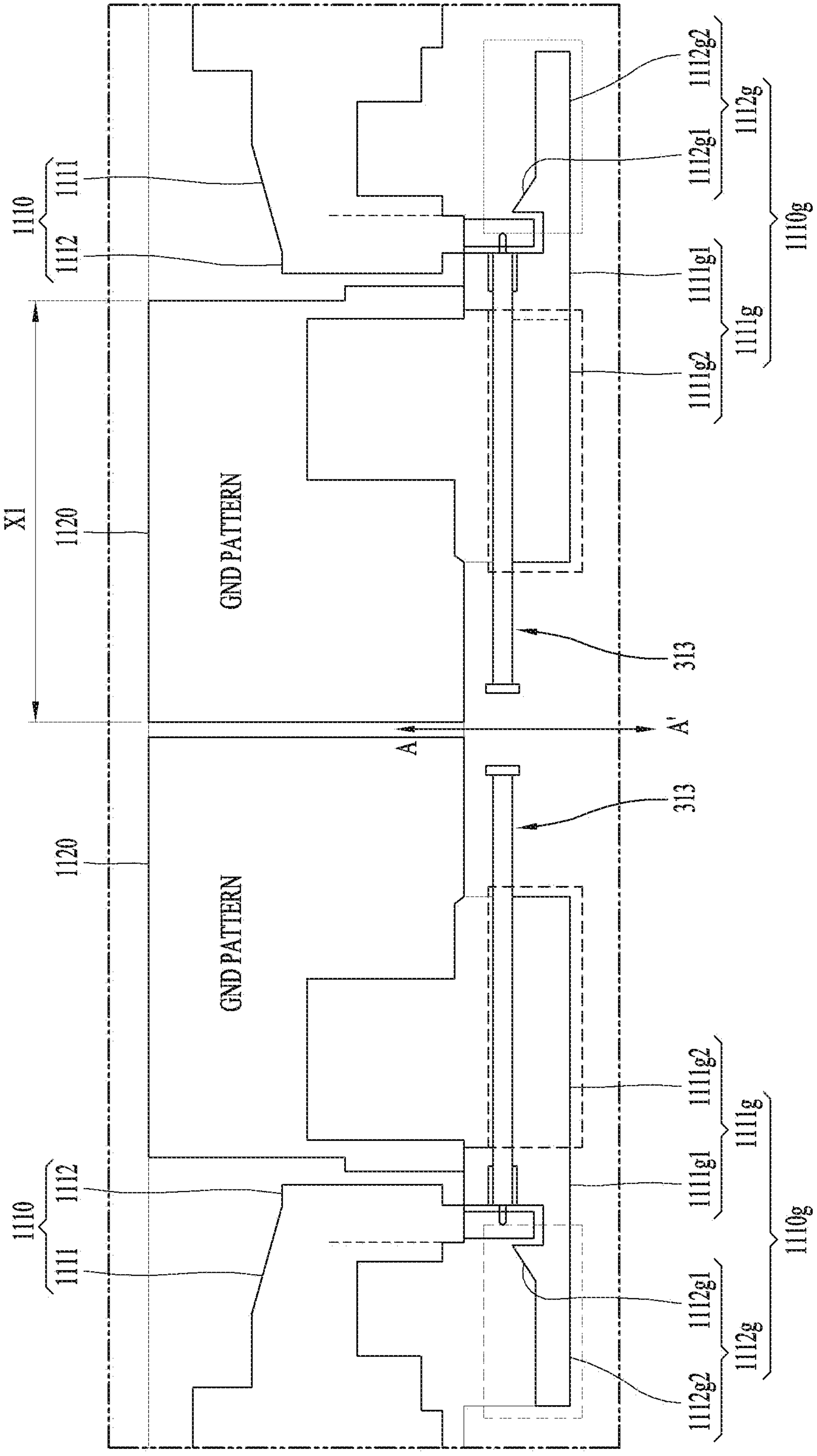
FIG. 15B is an enlarged view of the antenna assembly of FIG. 14 arranged adjacent to a metal frame.
Figure 16:
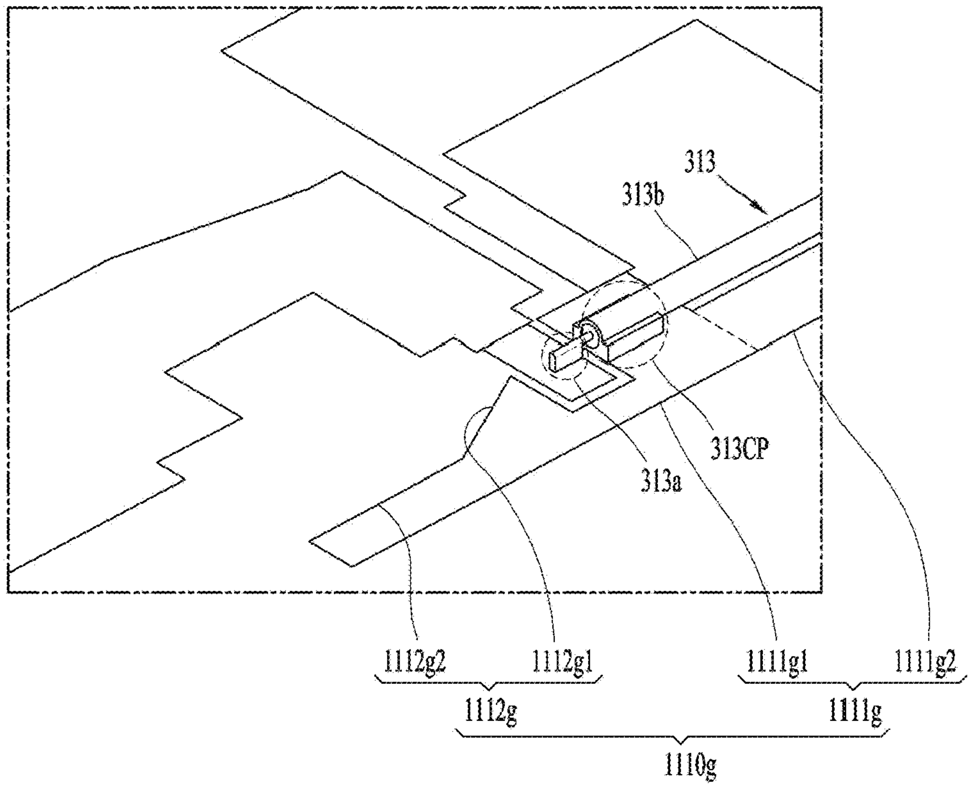
FIG. 16 is a view of a structure in which a signal line and a ground of a coaxial cable are connected to a feeding pattern and a ground conductive pattern in the antenna assembly of FIG. 15A.
Figure 16:
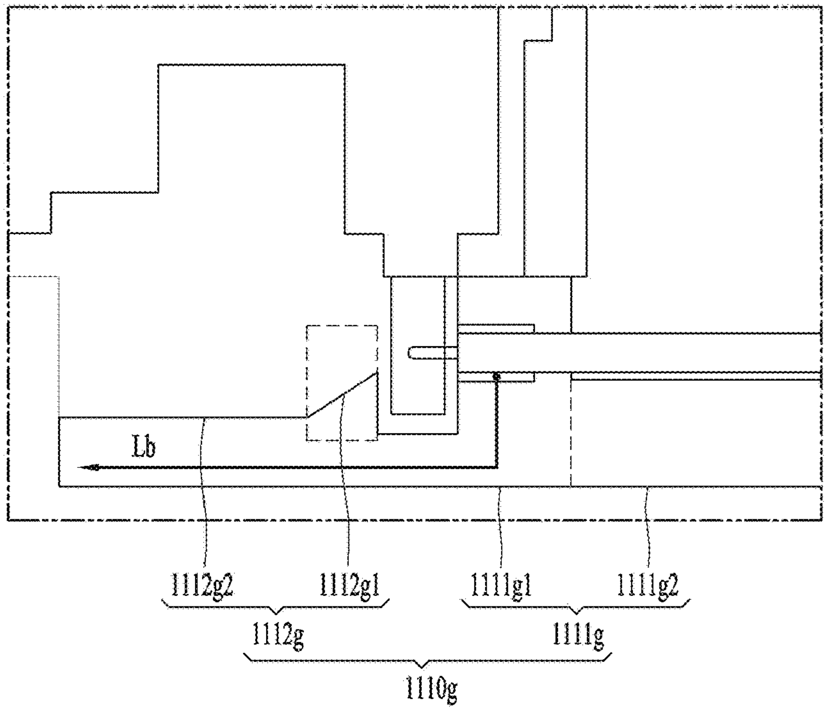

Hereinafter, an antenna assembly arranged adjacent to a metal frame of a vehicle according to the specification will be described. in this regard, FIG. 15A is a front view of an antenna assembly according to the disclosure. FIG. 15B is an enlarged view of the antenna assembly of FIG. 14 arranged adjacent to the metal frame. FIG. 16 is a view of a structure in which a signal line and a ground of a coaxial cable are connected to a feeding pattern and a ground conductive pattern in the antenna assembly of FIG. 15A.

Referring to FIGS. 15A and 15B, an antenna assembly 1000 may include a first dielectric substrate 1010*a* as a transparent substrate and a second dielectric substrate 1010*b* as an opaque substrate. The first dielectric substrate 1010*a* may be referred to as the transparent substrate and the second dielectric substrate 1010*b* may be referred to as the opaque substrate.

The first dielectric substrate 1010*a* may include a first conductive pattern 1110 and a second conductive pattern 1120 formed on a surface of the first dielectric substrate 1010*a*. The second dielectric substrate 1010*b* may form an opaque region, and include a ground conductive pattern 1110*g* and a feeding pattern 1110*f* formed on a surface of the second dielectric substrate 1010*b*. The antenna assembly 1000 may further include a first antenna ANT1 and a second antenna ANT2. The first antenna ANT1 may include the first conductive pattern 1110 and the second conductive pattern 1120. The second antenna ANT2 may include the first conductive pattern 1110 and the second conductive pattern 1120.

The first conductive pattern 1110 may include a first part 1111 and a second part 1112 perpendicular to the first part 1111. The second conductive pattern 1120 may include a third part 1121 and a fourth part 1122 perpendicular to the third part 1121. The second conductive pattern 1120 may also be referred to as a ground pattern because the second conductive pattern 1120 is connected to a ground conductive pattern 1110*g* of the second dielectric substrate 1010*b*.

The ground conductive pattern 1110*g* of the second dielectric substrate 1010*b* may include a first region 1111*g* and a second region 1112*g*. The second part 1112 of the first conductive pattern 1110 may be connected to a feeding pattern 1110*f*. The fourth part 1122 of the second conductive pattern 1120 may be connected to a first region 1111*g* of the ground conductive pattern 1110*g*.

The first region 1111*g* of the ground conductive pattern 1110*g* may be connected to a ground 313*b* of the coaxial cable 313. A portion of the first region 1111*g* of the ground conductive pattern 1110*g* may be connected to the fourth part 1122 of the second conductive pattern 1120. A second region 1112*g* of the ground conductive pattern 1110*g* may operate as a UHB radiator. The second region 1112*g* of the ground conductive pattern 1110*g* may operate as a ground stub-type radiator of the UHB band. UHB is a frequency band higher than operating frequency bands of the first conductive pattern 1110 and the second conductive pattern 1120. In some embodiments, the coaxial cable 313 may be arranged parallel to the second region 1111*g* of the ground conductive pattern 1110*g* to improve the isolation characteristics in the LB band.

(a) of FIG. 16 is an enlarged view of a structure, in which the signal line 313*a* of the coaxial cable 313 is connected to the feeding pattern 1110*f*, and a contact portion 313CP in which the coaxial cable 313 is received is connected to the ground conductive pattern 1110*g*. (b) of FIG. 16 is a front view of (a) of FIG. 16, which shows the first region 1111*g* and the second region 1112*g* of the ground conductive pattern 1110*g*. A length Lb from one point where the contact portion 313CP is formed to an end of a second sub-region 1111*g*2 of the second region 1112*g* of the ground conductive pattern 1110*g* may be in the range of 0.5 to 1 wavelength at a specific frequency in the UHB band.

For example, the length Lb may be in the range of 0.5 λg to λg based on a wavelength λg corresponding to 5.25 GHz, which is a central frequency in the UHB band ranging from 4.5 to 6 GHZ.

Referring to FIGS. 11 to 16, the signal line 313*a* corresponding to one end of the coaxial cable 313 may be connected to the feeding pattern 1110*f*. The ground 313*b* of the coaxial cable 313 may be connected to the contact portion 313CP which is formed concavely to accommodate the coaxial cable 313. The contact portion 313CP may be arranged in a first sub-region 1111*g*1 of the first region 1111*g* of the ground conductive pattern 1110*g*.

The first region 1111*g* of ground conductive pattern 1110*g* may include a first sub-region 1111*g*1 and a second sub-region 1111*g*2. A second length L2 of the second sub-region 1111*g*2 may be longer than a first length L1 of the first sub-region 1111*g*1 in a first axial direction. A second width W2 of the second sub-region may be narrower than a first width W1 of the first sub-region 1111*g*1 in a second axial direction. The coaxial cable 313 may be arranged spaced apart from the second sub-region 1111*g*2.

The second part 1112 of the first conductive pattern 1110 may be connected to the signal line 313*a* of the coaxial cable 313 through the feeding pattern 1110*f*. The fourth part 1122 of the second conductive pattern 1120 may be connected to the ground 313*g* of the coaxial cable 313 through the first sub-region 1111*g*1 of the second region 1112*g* of the ground conductive pattern 1110*g*.

Figure 17A:
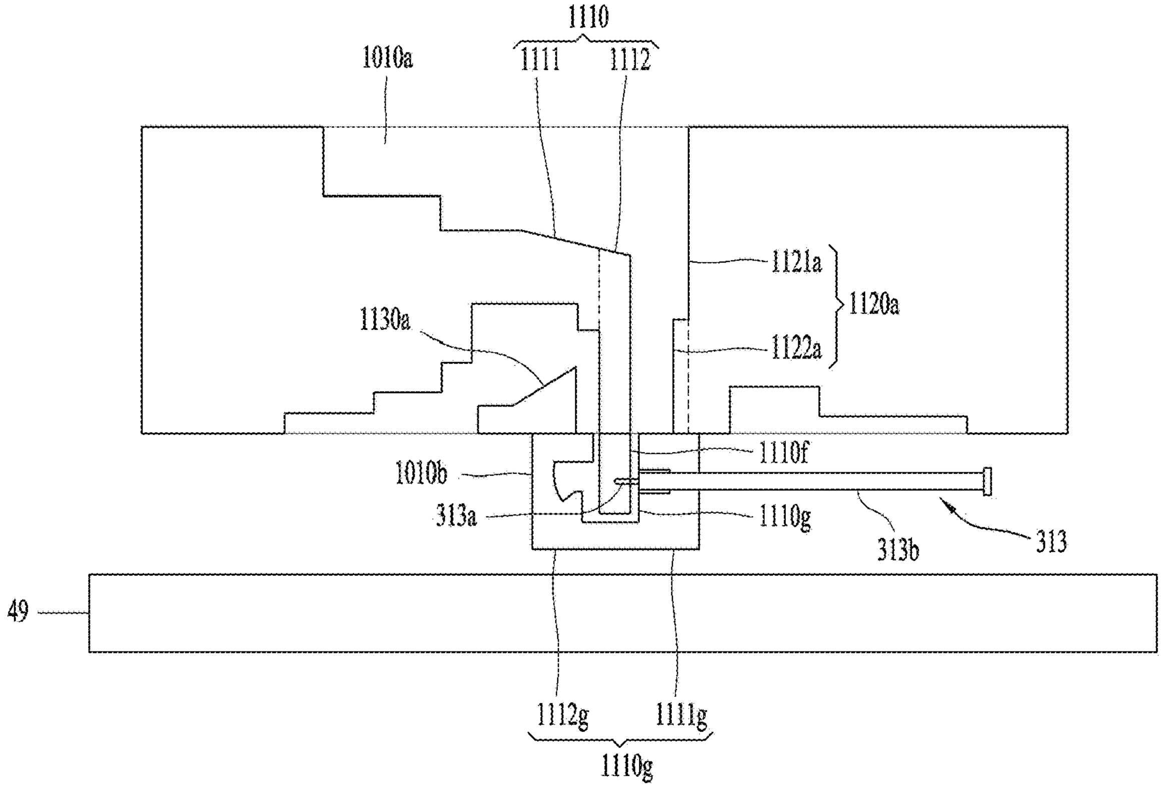
FIG. 17A is a view of a third conductive pattern formed on a second region of the ground conductive pattern.
Figure 17B:
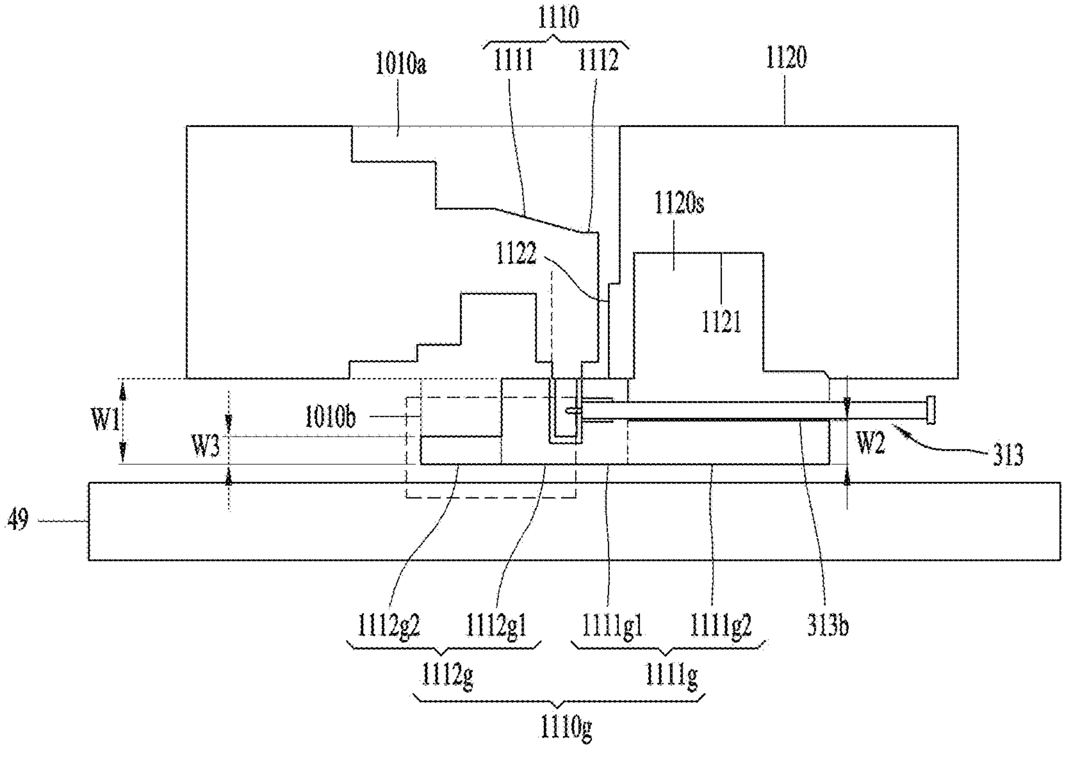
FIG. 17B is a view of the second region of the ground conductive pattern which is formed in a rectangular structure having different widths.
Figure 17C:
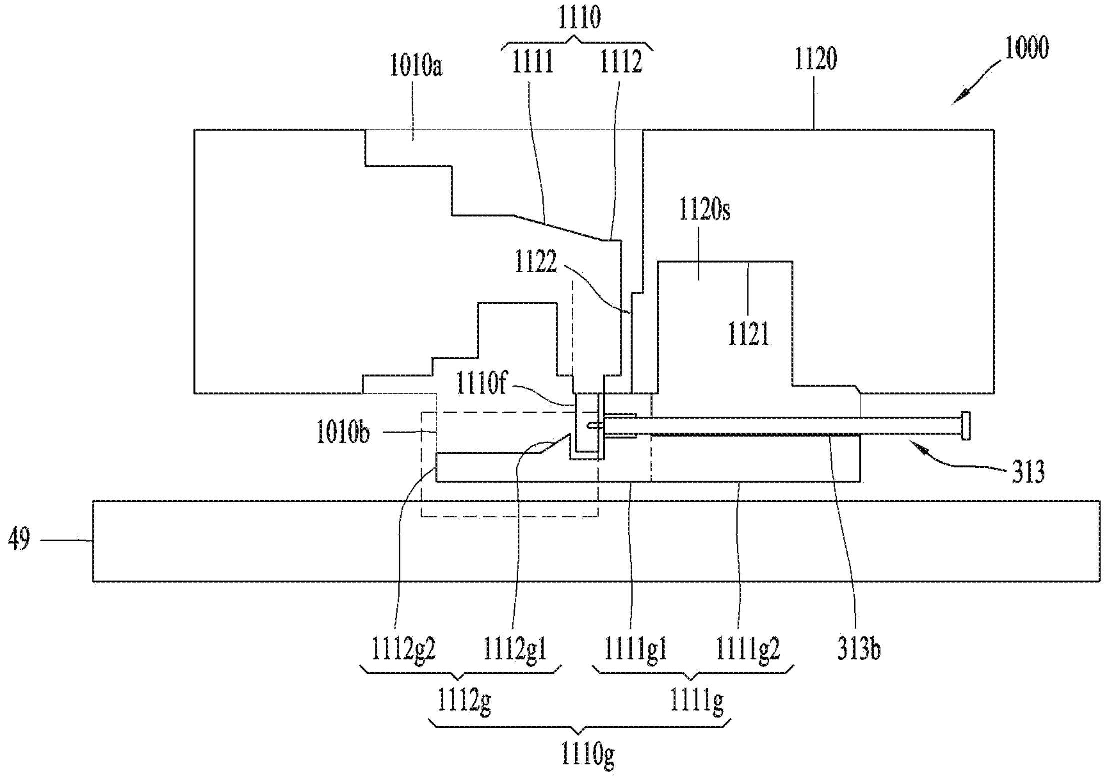
FIG. 17C is a view of the second region of the ground conductive pattern which is formed in a combined structure of a triangular structure and a rectangular structure.

According to another embodiment of the specification, the second region 1112*g* of the ground conductive pattern 1110*g* of the antenna module, which is arranged adjacent to the metal frame 49, may be formed in various structures. In this regard, FIG. 17A is a view of a third conductive pattern formed on a second region of the ground conductive pattern. FIG. 17B is a view of the second region of the ground conductive pattern which is formed in a rectangular structure having different widths. FIG. 17C is a view of the second region of the ground conductive pattern which is formed in a combined structure of a triangular structure and a rectangular structure.

Referring to FIG. 17A, the first region 1111*g* and the second region 1112*g* of the ground conductive pattern 1110*g* may be formed in a rectangular structure on one side and another side of the feeding pattern 1110*f*. The first region 1111*g* of the ground conductive pattern 1110*g* may be connected to the third conductive pattern 1130*a*. The second region 1112*g* of the ground conductive pattern 1110*g* may be connected to the second conductive pattern 1120*a*. The third conductive pattern 1110 may be arranged between the first conductive pattern 1110 and the second region 1112*g* of the ground conductive pattern 1110*g*. The third conductive pattern 1130*a* may operate as a UHB radiator.

Referring to FIG. 17B, the second region 1112*g* of the ground conductive pattern 1110*g* may include a third sub-region 1112*g*1 and a fourth sub-region 1112*g*2. The third sub-region 1112*g*1 may be arranged spaced apart from an end of the feeding pattern 1110*f*. The third sub-region 1112*g*1 may be formed in a rectangular shape having a first width W1 in a second axial direction. The fourth sub-region 1112*g*2 may be connected to the third sub-region 1112*g*1. The fourth sub-region 1112*g*2 may be formed in a rectangular shape having a third width W3 narrower than the first width W1. The second region 1112*g* of the ground conductive pattern 1110*g* may operate as a UHB radiator.

Referring to FIGS. 14, 15, and 17C, the second region 1112*g* of the ground conductive pattern 1110*g* may include a third sub-region 1112*g*1 and a fourth sub-region 1112*g*2. The third sub-region 1112*g*1 may be arranged spaced apart from an end of the feeding pattern 1110*f*. The third sub-region 1112*g*1 may be formed in a triangular shape with a certain angle of inclination. The third sub-region 1112*g*1 may be formed with a width which decreases in the second axial direction as the third sub-region 1112*g*1 is away from the feeding pattern 1110*f*. The fourth sub-region 1112*g*2 may be connected to the third sub-region 1112*g*1. The fourth sub-region 1112*g*2 may be formed in a rectangular shape. The second region 1112*g* of the ground conductive pattern 1110*g* may operate as a UHB radiator.

Figure 18A:
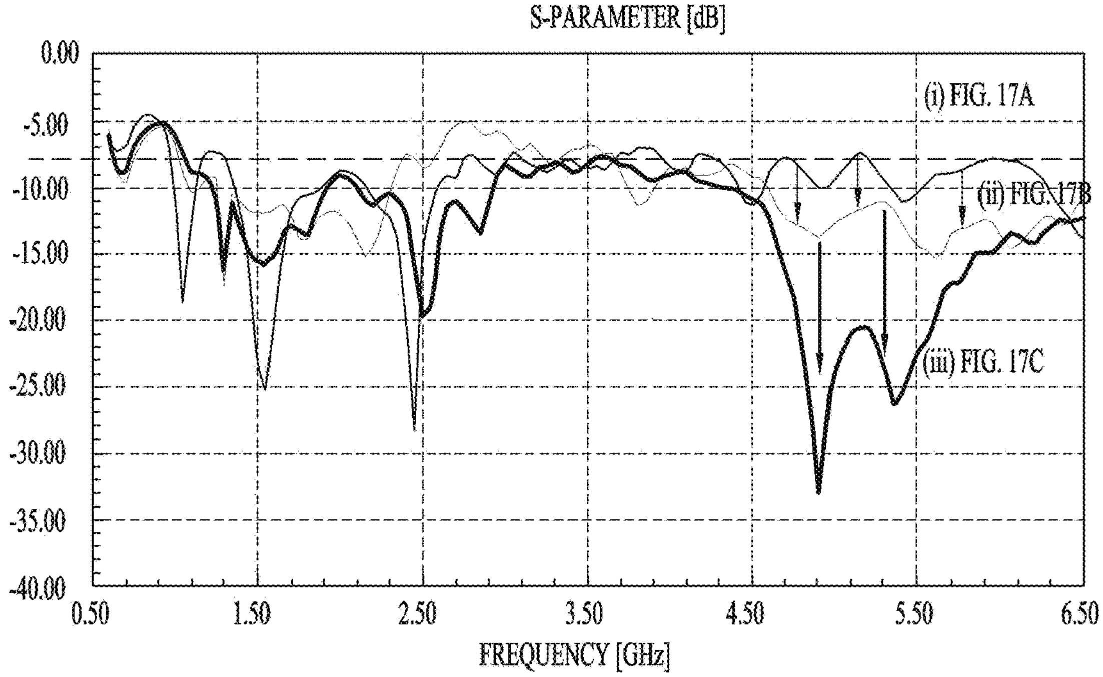
FIG. 18A is a view of reflection coefficient characteristics in CPW antenna structures of FIGS. 17A to 17C.
Figure 18B:
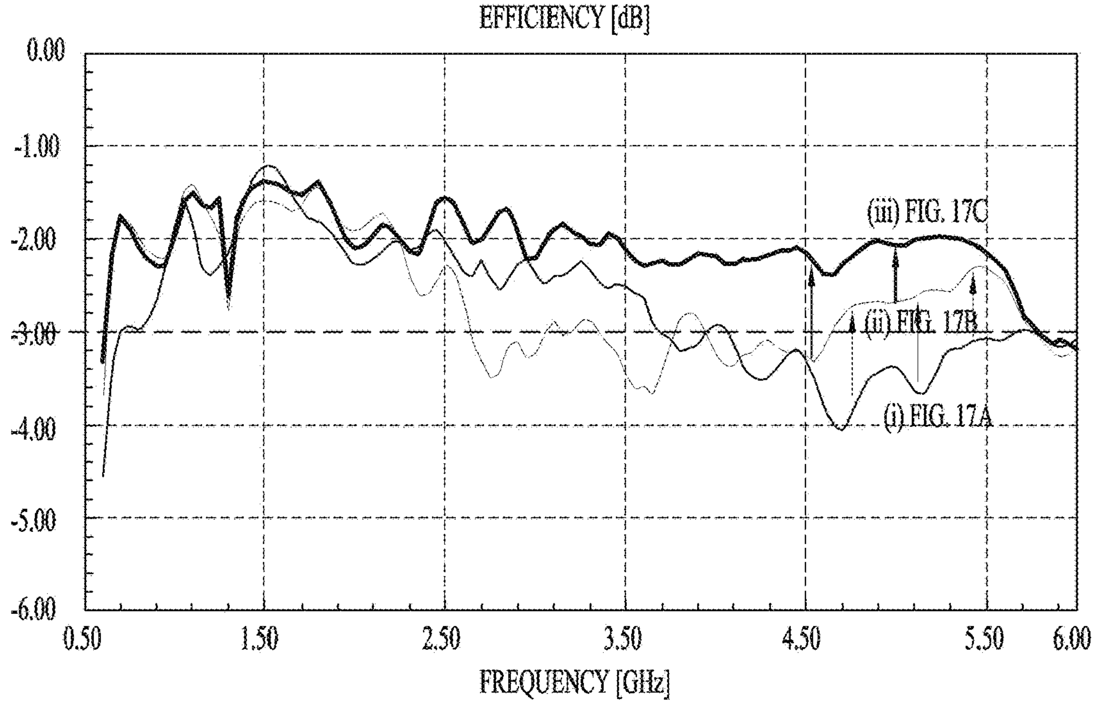
FIG. 18B is a view of efficiency characteristics in the CPW antenna structures of FIGS. 17A to 17C.

Hereinafter, the antenna characteristics will be described with respect to the CPW antenna structures of FIGS. 17A to 17C. FIG. 18A is a view of reflection coefficient characteristics in the CPW antenna structures of FIGS. 17A to 17C. FIG. 18B is a view of efficiency characteristics in the CPW antenna structures of FIGS. 17A to 17C.

Referring to FIGS. 17A and 18A, the antenna assembly 1000*a* including the third conductive pattern 1130*a* may exhibit a reflection coefficient characteristic of about −8 dB in the UHB band of at least 4.5 GHZ. Referring to FIGS. 17B and 18A, the antenna assembly 1000*b* including the second region 1112*g* of the ground conductive pattern 1110*g* having a rectangular stepped structure may exhibit a reflection coefficient characteristic of about −10 dB to −15 dB in the UHB band of at least 4.5 GHZ. Therefore, the second region 1112*g* of the ground conductive pattern 1110*g* having the rectangular stepped structure may be implemented in a UHB resonance mode through the design of the FPCB stub structure.

Referring to FIGS. 17C and 18A, the antenna assembly 1000 including the second region 1112*g* of the ground conductive pattern 1110*g* having the combined structure of the triangular and rectangular structures may exhibit a reflection coefficient characteristic of −15 dB or less in the UHB band of at least 4.5 GHZ. Therefore, the second region 1112*g* of the ground conductive pattern 1110*g* having the combined structure of the triangular and rectangular structures may improve the impedance matching characteristics of the UHB resonance mode through the design of the CPW feeder tuning structure.

Referring to FIGS. 17A and 18B, the antenna assembly 1000*a* including the third conductive pattern 1130*a* may exhibit an efficiency characteristic of −3 dB or less in the UHB band of at least 4.5 GHZ. Referring to FIGS. 14B and 15A, the antenna assembly 1000*b* including the second region 1112*g* of the ground conductive pattern 1110*g* having the rectangular stepped structure may have an efficiency characteristic of about −3 dB in the UHB band of at least 4.5 GHz. Therefore, the second region 1112*g* of the ground conductive pattern 1110*g* having the rectangular stepped structure may improve the efficiency of the UHB band through the design of the FPCB stub structure.

Referring to FIGS. 17C and 18B, the antenna assembly 1000 including the second region 1112*g* of the ground conductive pattern 1110*g* having the combined structure of the triangular and rectangular structures may exhibit an efficiency characteristic of about −2 dB in the UHB band of at least 4.5 GHz. Therefore, the second region 1112*g* of the ground conductive pattern 1110*g* having the combined structure of the triangular and rectangular structures may improve the efficiency characteristics of the UHB band through the design of the CPW feeder tuning structure.

Hereinafter, a description will be given of a method of designing the second conductive pattern 1120 and the ground conductive pattern 1110*g* for optimizing antenna performance, with respect to FIGS. 11 to 16 and FIG. 17C.

To optimize antenna performance in the UHB band, a length from the contact portion 313CP to an end of the fourth sub-region 1112*g*2 of the second region 1112*g* of the ground conductive pattern 1110*g* may be set in a certain range. The length from the contact portion 313CP to the end of the fourth sub-region 1112*g*2 of the second region 1112*g* of the ground conductive pattern 1110*g* may be in a range from 0.5 to 1 time a specific wavelength corresponding to a specific frequency of the UHB band.

While optimizing the performance of the antenna assembly 1000, an overall antenna size needs to be limited to a certain size. To this end, the second region 1112*g* of the ground conductive pattern 1110*g* may be arranged below the second part 1112 of the first conductive pattern 1110. The first conductive pattern 1110 and the second conductive pattern 1120 may each be formed to have a second thickness h1 in the second axial direction. The fourth part 1122 of the second conductive pattern 1120 may include a slot region 1120*s* from which a conductive pattern has been removed by a second height h2. The second height h2 of the slot region 1120*s* of the second conductive pattern 1120 may be at least 0.5 times higher than the first height h1.

In some embodiments, the antenna assembly 1000 according to the specification may operate in a plurality of frequency bands for 4G/5G wireless communications. The antenna assembly 1000 may operate in a dipole antenna mode in a first frequency band of 617 to 960 MHz. The first frequency band may correspond to the LB band of 4G/5G. The antenna assembly 1000 may operate in a monopole antenna mode in a second frequency band of 1520 to 4500 MHz. The second frequency band may correspond to an MB band and an HB band of 4G/5G. The antenna assembly 1000 may operate as a radiator through additional resonance in a third frequency band of 4500 to 6000 MHz. The third frequency band may correspond to a UHB band of 4G/5G.

Referring to FIGS. 11 to 16 and FIG. 17C, the radiation principle and operation of the antenna assembly 1000 for each frequency band will be described. The first conductive pattern 1110 and the second conductive pattern 1120 may operate in a dipole antenna mode in the first frequency band. The first conductive pattern 1110 and the second conductive pattern 1120 may have an asymmetrical structure. The first part 1111 of the first conductive pattern 1110 may have an upper boundary BS1 and a lower boundary BS2, each of which has a step shape. The third part 1121 of the second conductive pattern 1120 may have an upper boundary BS1 formed in a straight line shape and a lower boundary BS2 formed in a step shape.

Therefore, the first conductive pattern 1110 may operate in the monopole antenna mode in the second frequency band. The second region 1112*g* of the ground conductive pattern 1110*g* may operate as a radiator in the third frequency band. The second frequency band may be set to be higher than the first frequency band. The third frequency band may be set to be higher than the second frequency band.

In some embodiments, an antenna assembly according to the specification may be configured in a transparent antenna structure. In this regard, referring to FIGS. 7B and 14, the first conductive pattern 1110 and the second conductive pattern 1120 of the antenna assembly 1100 may be formed in a metal mesh shape 1020 having a plurality of open regions OA on the first dielectric substrate 1010*a*. The first conductive pattern 1110 and the second conductive pattern 1120 may each include metal grid patterns 1020*a*. The metal grid patterns 1020*a* may have open regions OA from dummy mesh grid patterns 1020*b*. The first conductive pattern 1110 and the second conductive pattern 1120 may configure a CPW structure on the first dielectric substrate 1010*a*.

The antenna assembly 1000 may include a plurality of dummy mesh grid patterns 1020*b* on an outer portion of the radiator region, namely, the first region 1100*a* on the first dielectric substrate 1010*a*. The plurality of dummy mesh grid patterns 1020*b* may also be arranged even in a dielectric region between the first and the second conductive patterns 111 and 1120. The plurality of dummy metal grid patterns 1020*b* may be formed not to be connected to the feeding pattern 1110*f* and the ground conductive pattern 1110*g*. The plurality of dummy mesh grid patterns 1020*b* may be separated from each other.

Figure 19A:
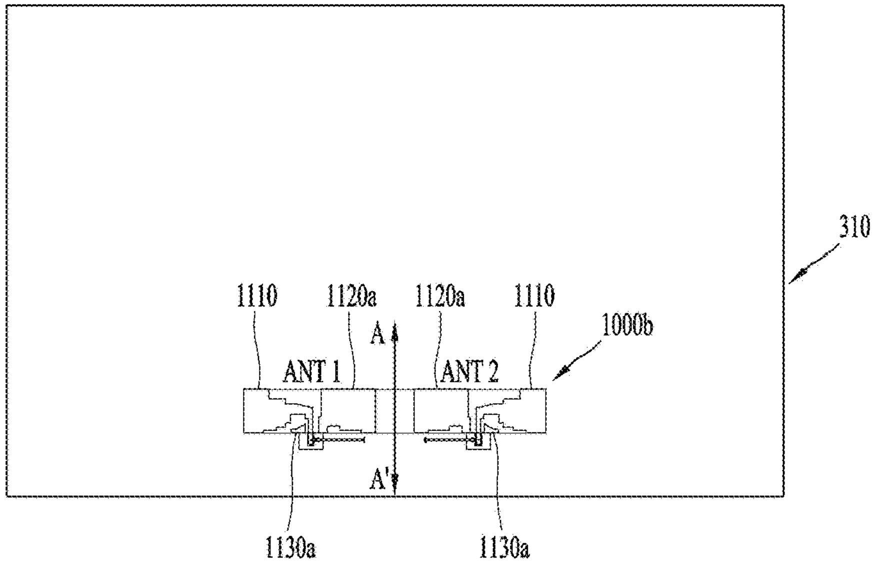
FIG. 19A is a view of a structure in which the antenna assembly of FIG. 12B having a plurality of antenna elements is arranged on vehicle glass.
Figure 19B:
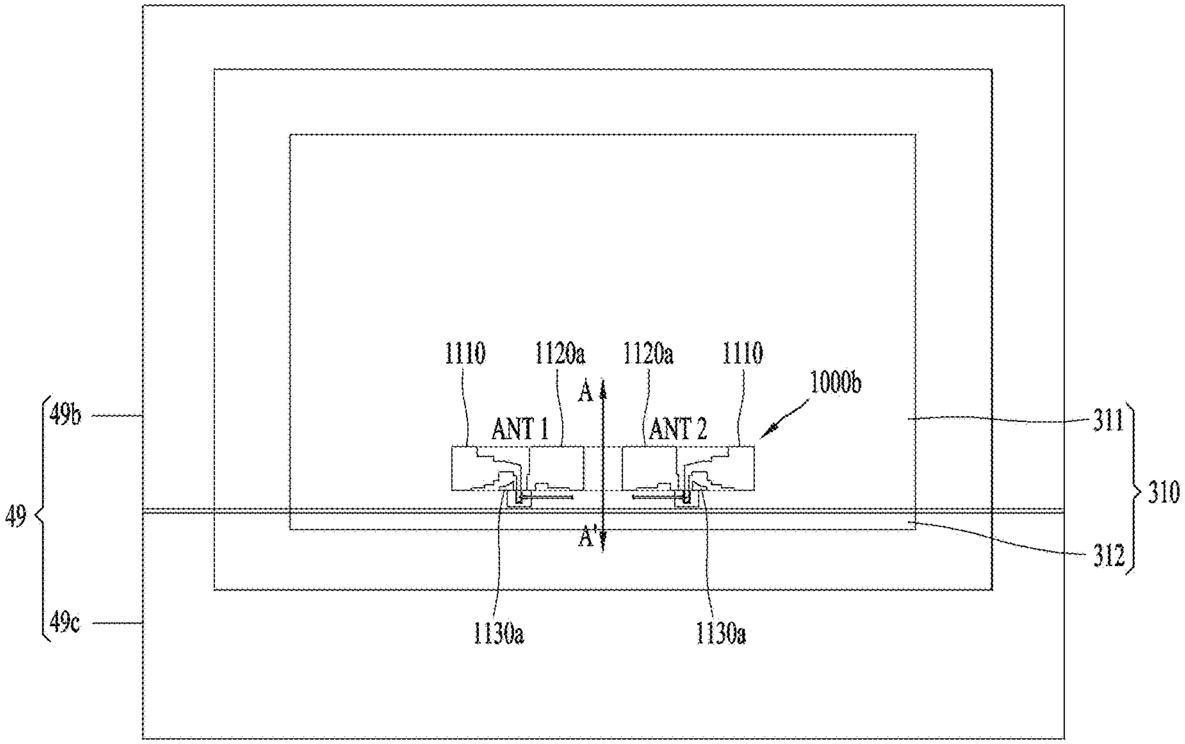
FIG. 19B is a view of a structure in which the antenna assembly of FIG. 12B having the plurality of antenna elements is arranged on a glass panel which is located inside a metal frame.
Figure 19C:
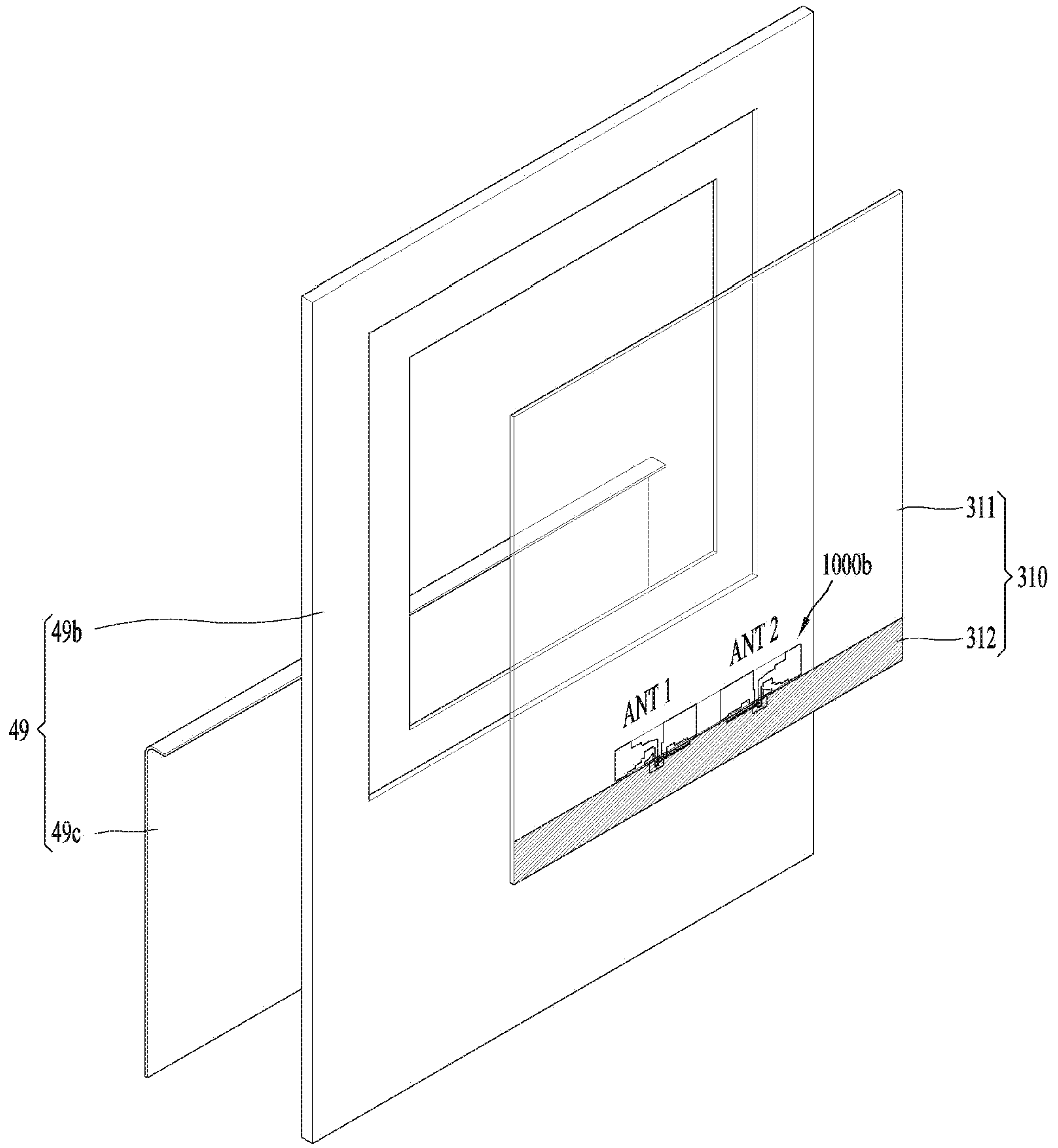
FIG. 19C is an exploded lateral perspective view of a coupling structure between the metal frame and the glass panel with the antenna assembly of FIG. 19B.

As described above, the antenna assembly according to the specification may be arranged on the vehicle glass and may be located adjacent to the metal frame of the vehicle. Additionally, the antenna assembly according to the specification may include a plurality of antenna elements to perform multi-input/multi-output (MIMO). In this regard, FIG. 19A is a view of a structure in which the antenna assembly of FIG. 12B having the plurality of antenna elements is arranged on vehicle glass. FIG. 19B is a view of a structure in which the antenna assembly of FIG. 12B having the plurality of antenna elements is arranged on the glass panel which is located within the metal frame. FIG. 19C is an exploded lateral perspective view of a coupling structure between the metal frame and the glass panel with the antenna assembly of FIG. 19B.

Referring to FIGS. 12B and 19A, the antenna assembly 1000*b* including the first antenna ANT1 and the second antenna ANT2 may be arranged on the glass panel 310. The glass panel 310 may be formed to have certain length, width, and thickness. For example, the glass panel 310 may have a size of 600×400 mm and a thickness of 3.5 t. However, the size and thickness are not limited thereto and may vary depending on the application. The first antenna ANT1 and the second antenna ANT2 each including the first to third conductive patterns 1110, 1120*a*, and 1130*a* may have a symmetrical structure with respect to a line A-A'.

Referring to FIGS. 11, 12B, 19B, and 19C, the antenna assembly 1000*b* including the first antenna ANT1 and the second antenna ANT2 may be arranged on the glass panel 310 arranged in the metal frame 49. The metal frame 49 may include the body 49*b* made of the metal material and the interior cover 49*c*. The interior cover 49*c* may include a metal material or dielectric material. The interior cover 49*c* may be arranged below the body 49*b* made of the metal material to overlap the body 49*b* made of the metal material.

The glass panel 310 may be arranged in an empty space inside the metal frame 49. The glass panel 310 may include the transparent region 311 and the opaque region 312. A frit pattern 312*f* may be formed in the opaque region 312. At least a portion of the opaque region 312 may be arranged to overlap the body 49*b* made of the metal material.

The glass panel 310 may have certain length, width, and thickness. For example, the glass panel 310 may have a size of 600×400 mm and a thickness of 3.5 t. However, the size and thickness are not limited thereto and may vary depending on the application. The first antenna ANT1 and the second antenna ANT2 each including the first to third conductive patterns 1110, 1120*a*, and 1130*a* may have a symmetrical structure with respect to a line AA'.

Figure 20A:
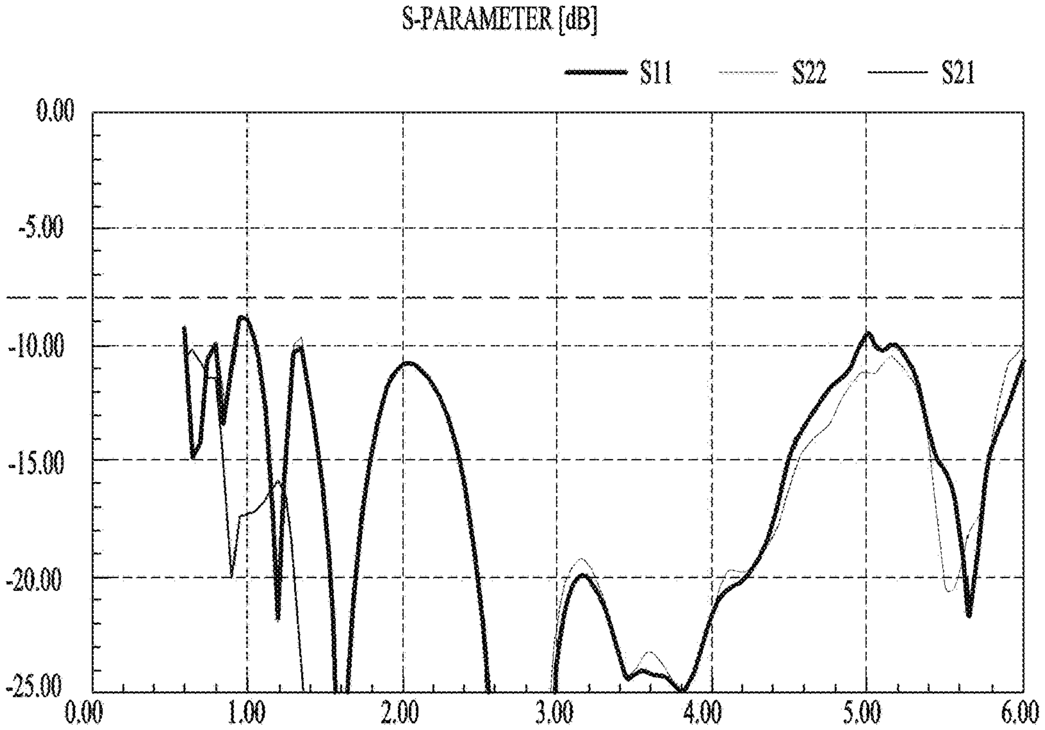
FIG. 20A is a view of reflection coefficient characteristics and efficiency characteristics of the antenna assembly of FIG. 19A.
Figure 20A:
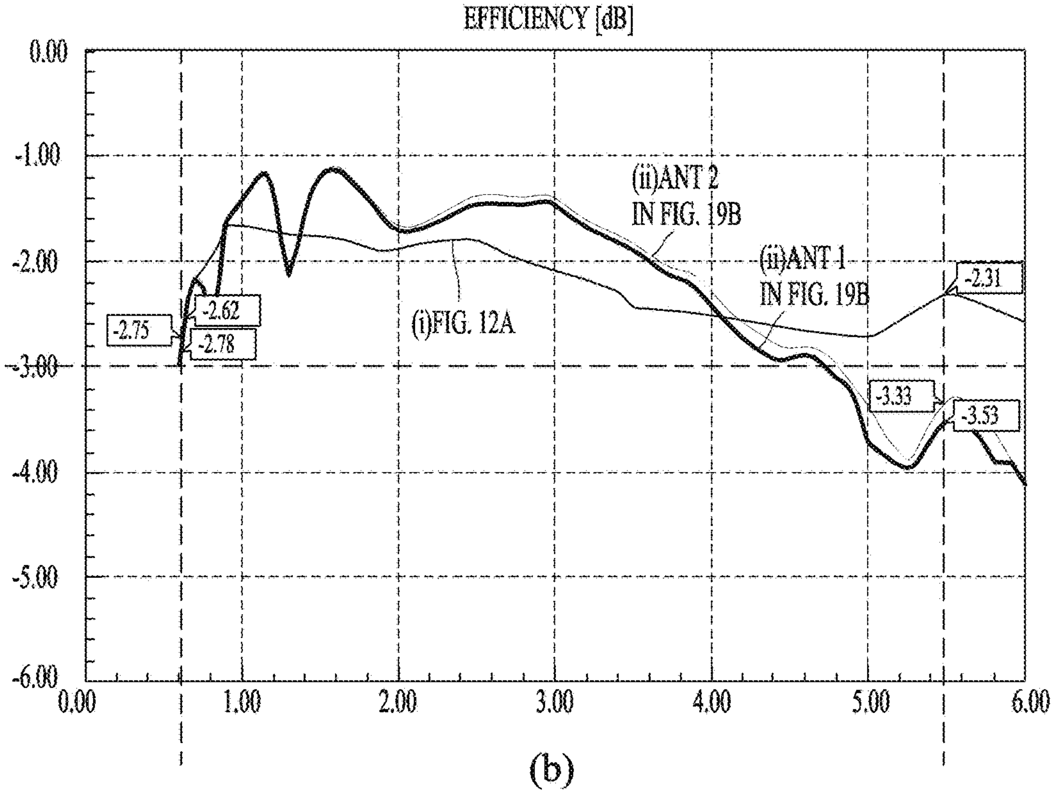
Figure 20B:
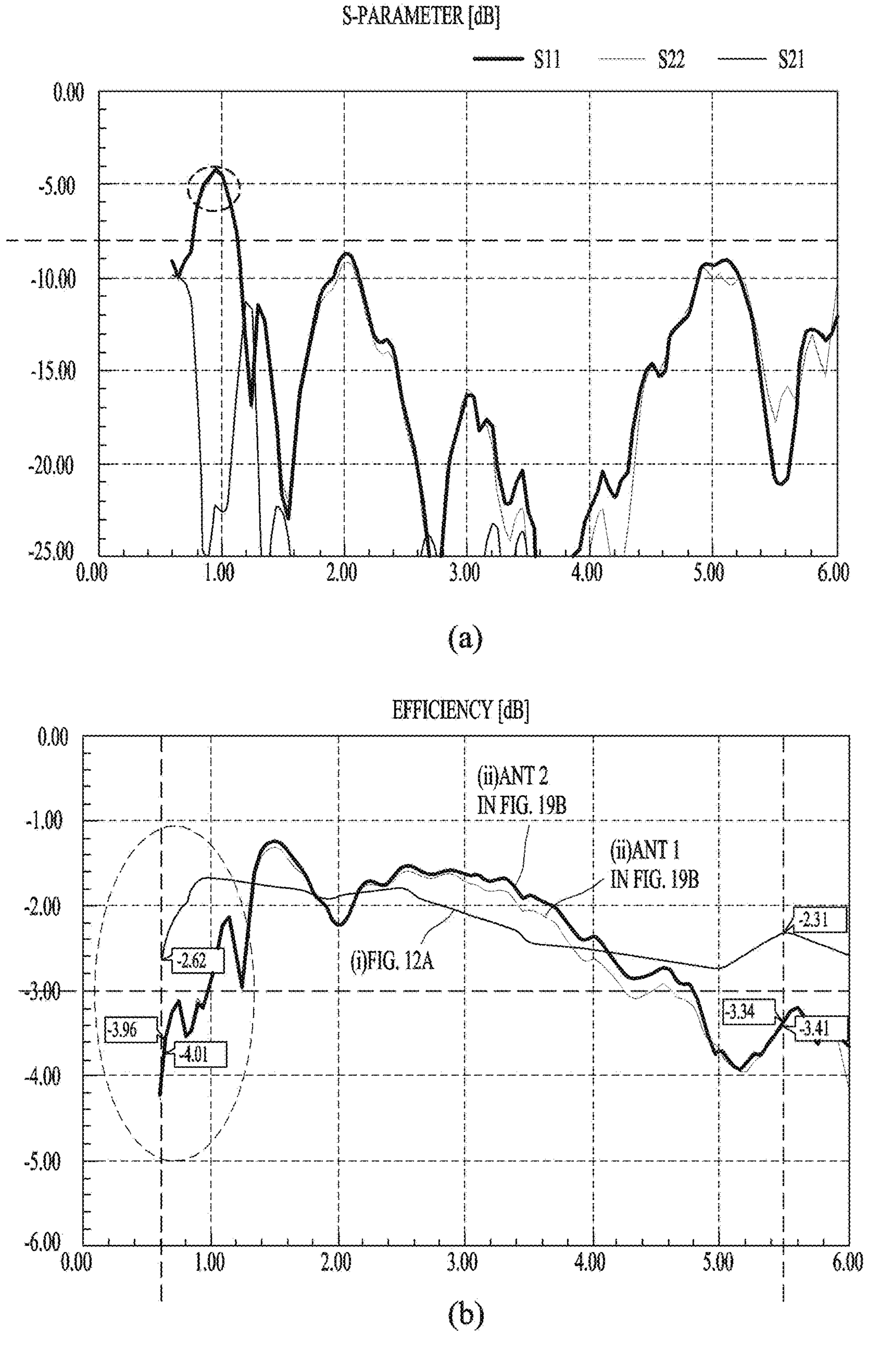
FIG. 20B is a view of reflection coefficient characteristics and efficiency characteristics of the antenna assembly of FIG. 19B adjacent to the metal frame.

In some embodiments, FIG. 20A is a view of reflection coefficient characteristics and efficiency characteristics of the antenna assembly of FIG. 19A. FIG. 20B is a view of reflection coefficient characteristics and efficiency characteristics of the antenna assembly of FIG. 19B adjacent to the metal frame.

Referring to FIG. 19A and (a) of FIG. 20A, the antenna assembly 1000*b* may have reflection coefficient characteristics S11 and S22 of −8 dB or less in the full frequency band of 600 MHz to 6 GHz for 4G/5G wireless communications. Here, S11 and S22 represent the reflection coefficient characteristics of the first antenna ANT1 and the second antenna ANT2, respectively. An isolation S21 between the first antenna ANT1 and the second antenna ANT2 may have a value of −10 dB or less in the full frequency band of 600 MHz to 6 GHZ.

Referring to FIG. 12A, FIG. 19A, and (b) of FIG. 20A, (i) the antenna assembly 1000*a* may have an antenna efficiency characteristic of at least −3 dB, in the full frequency band of 600 MHz to 6 GHz. Referring to FIG. 12B, FIG. 19A, and (b) of FIG. 20A, (ii) the antenna efficiencies of the first and second antennas ANT1 and ANT2 of the antenna assembly 1000*b* may be reduced to −3 dB or less in the UHB band of at least 4.5 GHZ, in the full frequency band of 600 MHz to 6 GHz. In FIG. 12B, (ii) the antenna efficiency of the antenna assembly 1000*b* may be reduced in the UHB band even in a structure without a metal frame, due to the reduced length of the FPCB 1100*b*, the exclusion of the third conductive pattern, and the arrangement structure of the coaxial cable 313*c*.

Referring to FIG. 19B and (a) of FIG. 20B, the reflection coefficient characteristics S11 and S22 of the antenna assembly 1000*b* may be reduced by at least −8 dB in a band of about 900 MHZ, in the full frequency band of 600 MHz to 6 GHz for 4G/5G wireless communications. The reflection coefficient characteristics S11 and S22 may be reduced by at least −8 dB in a band of 800 to 1100 MHz, in the full frequency band of 600 MHz to 6 GHZ. Here, S11 and S22 represent the reflection coefficient characteristics of the first antenna ANT1 and the second antenna ANT2, respectively. An isolation S21 between the first antenna ANT1 and the second antenna ANT2 may have a value of −10 dB or less in the band of 600 MHz to 6 GHz.

Referring to FIG. 12A, FIG. 19A, and (b) of FIG. 20B, (i) the antenna assembly 1000*a* may have an antenna efficiency characteristic of at least −3 dB in the band of 600 MHz to 6 GHz. Referring to FIG. 12B, FIG. 19B, and (b) of FIG. 20B, (ii) the antenna efficiencies of the first and second antennas ANT1 and ANT2 of the antenna assembly 1000*b* may be reduced to −3 dB or less in the UHB band of at least 4.5 GHZ, in the full band of 600 MHz to 6 GHZ. In FIG. 12B, (ii) the antenna efficiency of the antenna assembly 1000*b* may be reduced in the UHB band, due to the reduced length of the FPCB 1100*b*, the exclusion of the third conductive pattern, and the arrangement structure of the coaxial cable 313*c*. In FIG. 12B, (ii) the antenna efficiencies of the first and second antennas ANT1 and ANT2 of the antenna assembly 1000*b* may be reduced to −3 dB or less even in the band of 600 MHz to 1 GHZ.

Referring to FIG. 12B, FIG. 19B, and FIG. 20B, the reflection loss characteristic may be reduced and antenna efficiency may be lowered by about 1.2 dB in the LB band, for example, in the band of 900 MHZ, due to the metal frame 49 located adjacent to the antenna assembly 1000*b*.

Figure 21A:
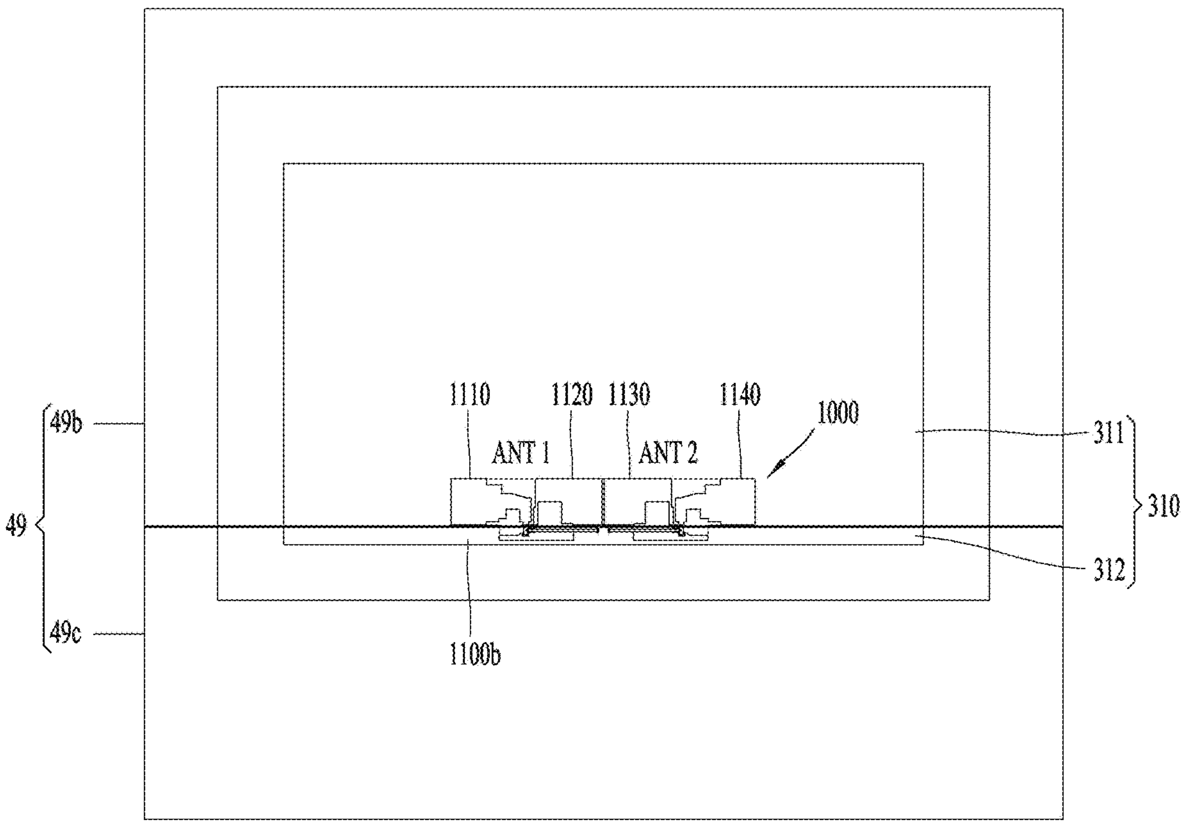
FIG. 21A is a view of a structure in which the antenna assembly of FIG. 12C having the plurality of antenna elements is arranged on the vehicle glass which is located inside the metal frame.
Figure 21A:
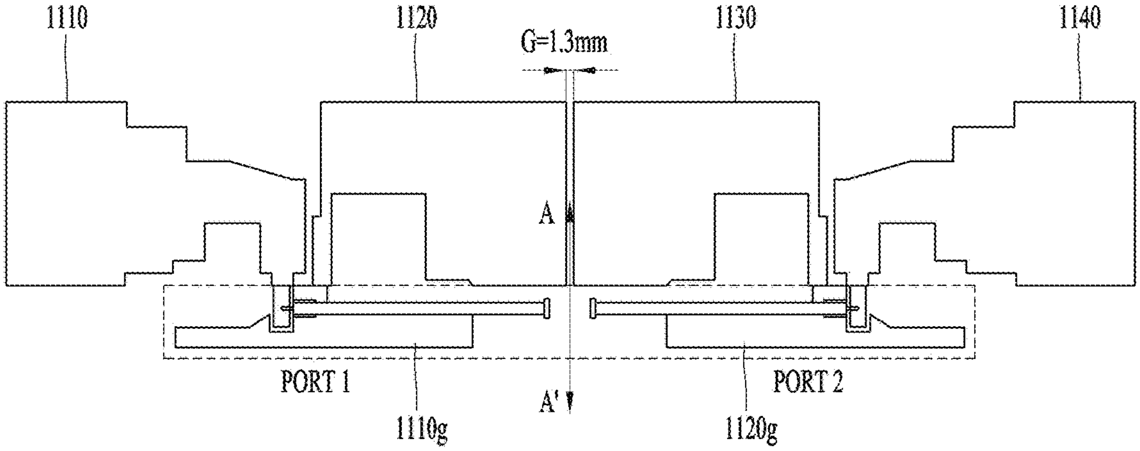
Figure 21B:
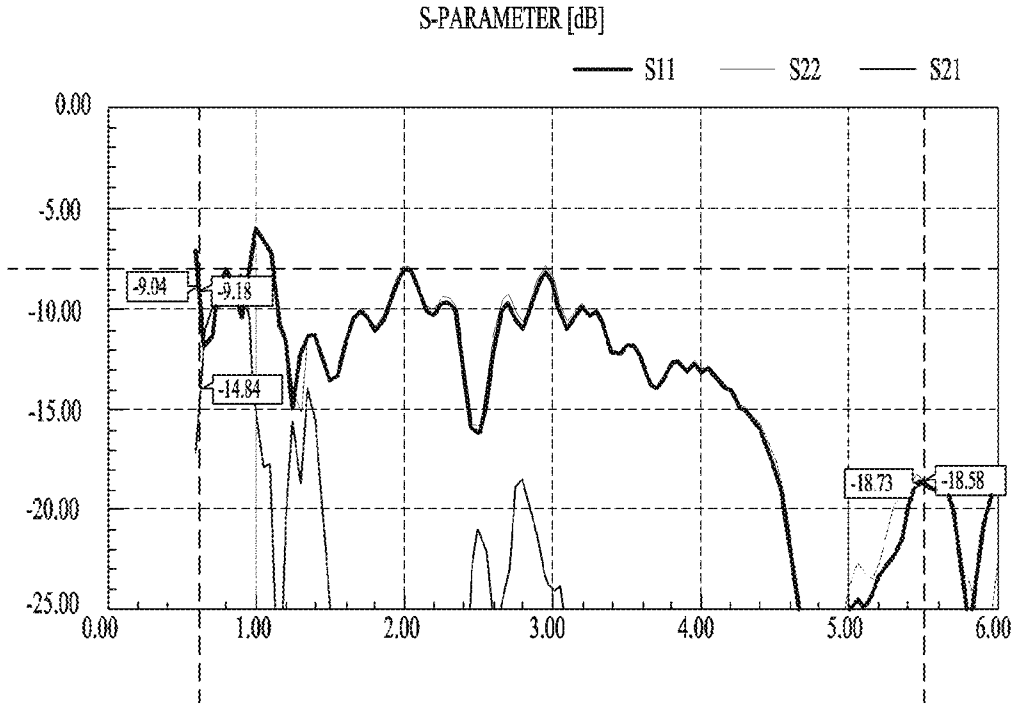
FIG. 21B is a view of reflection coefficient characteristics and efficiency characteristics of the antenna assembly of FIG. 21A.
Figure 21B:
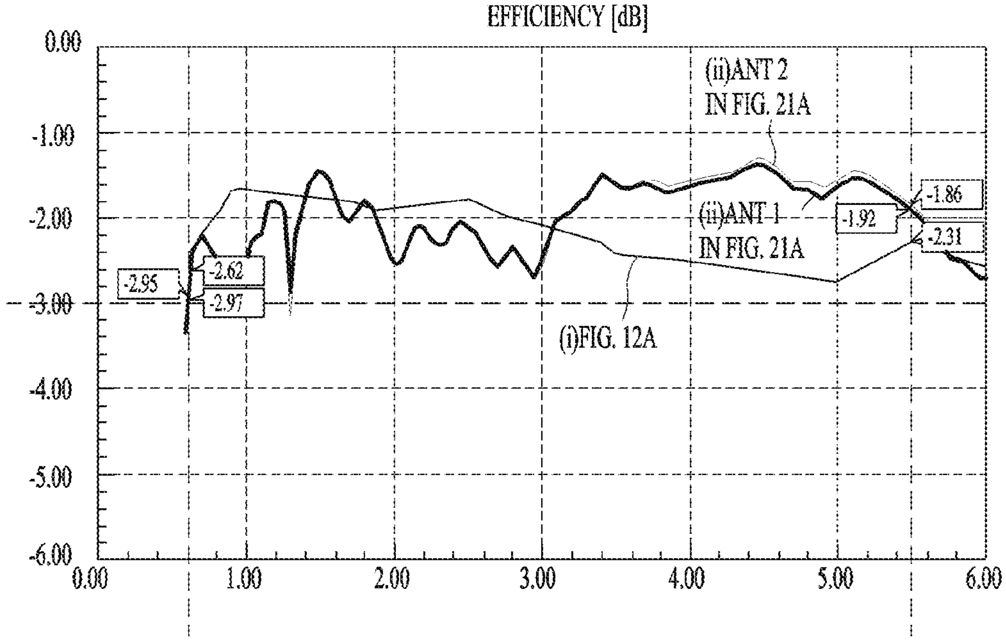

As described above, the antenna assembly according to the specification may be arranged on the vehicle glass and may be located adjacent to the metal frame of the vehicle. Additionally, the antenna assembly according to the specification may include a plurality of antenna elements to perform multi-input/multi-output (MIMO). In this regard, FIG. 21A is a view of a structure in which the antenna assembly of FIG. 12C having the plurality of antenna elements is arranged on the vehicle glass which is located within the metal frame. FIG. 21B is a view of reflection coefficient characteristics and efficiency characteristics of the antenna assembly of FIG. 21A.

Referring to FIGS. 12C, 15B, and 21A, the antenna assembly 1000 including the first antenna ANT1 and the second antenna ANT2 may be arranged on the vehicle glass 310. The vehicle glass 310 may have certain length, width, and thickness. The second antenna ANT2 may have a symmetrical structure with respect to the line A-A'. The first antenna ANT1 may include the first and second conductive patterns 1110 and 1120 and the ground conductive pattern 1110*g*. The second antenna ANT2 may include third and fourth conductive patterns 1130 and 1140 and a second ground conductive pattern 1120*g*.

Referring to FIG. 12A, FIG. 19A, and (b) of FIG. 21B, (i) the antenna assembly 1000*a* may have an antenna efficiency characteristic of at least −3 dB in the band of 600 MHZ to 6 GHz. Referring to FIG. 21A and (a) of FIG. 21B, the antenna assembly 1000 may have reflection coefficient characteristics S11 and S22 of −8 dB or less in the full frequency band of 600 MHz to 6 GHz for 4G/5G wireless communications. Here, S11 and S22 represent the reflection coefficient characteristics of the first antenna ANT1 and the second antenna ANT2, respectively. An isolation S21 between the first antenna ANT1 and the second antenna ANT2 may have a value of −10 dB or less in the full band of 600 MHz to 6 GHz.

Referring to FIG. 21A and (b) of FIG. 21B, the first and second antennas ANT1 and ANT2 of the antenna assembly 1000 may have an antenna efficiency value of at least −3 dB in the LB band, in the full band of 600 MHz to 6 GHz. The first and second antennas ANT1 and ANT2 of the antenna assembly 1000 may have an antenna efficiency value of at least −3 dB in the UHB band of at least 4.5 GHZ, in the full band of 600 MHZ to 6 GHZ. Therefore, the antenna efficiency may be improved in the LB band and the UHB band, in spite of the reduced length of the FPCB 1100*b*, the exclusion of the third conductive pattern, and the arrangement structure of the coaxial cable 313*c*.

In some embodiments, an antenna assembly according to the specification may include a first transparent dielectric substrate, on which a transparent electrode layer is formed, and a second dielectric substrate. In this regard, FIGS. 22A and 22B are views of the flow of processes in which an antenna assembly is manufactured by being coupled to a glass panel according to embodiments.

Figure 22A:
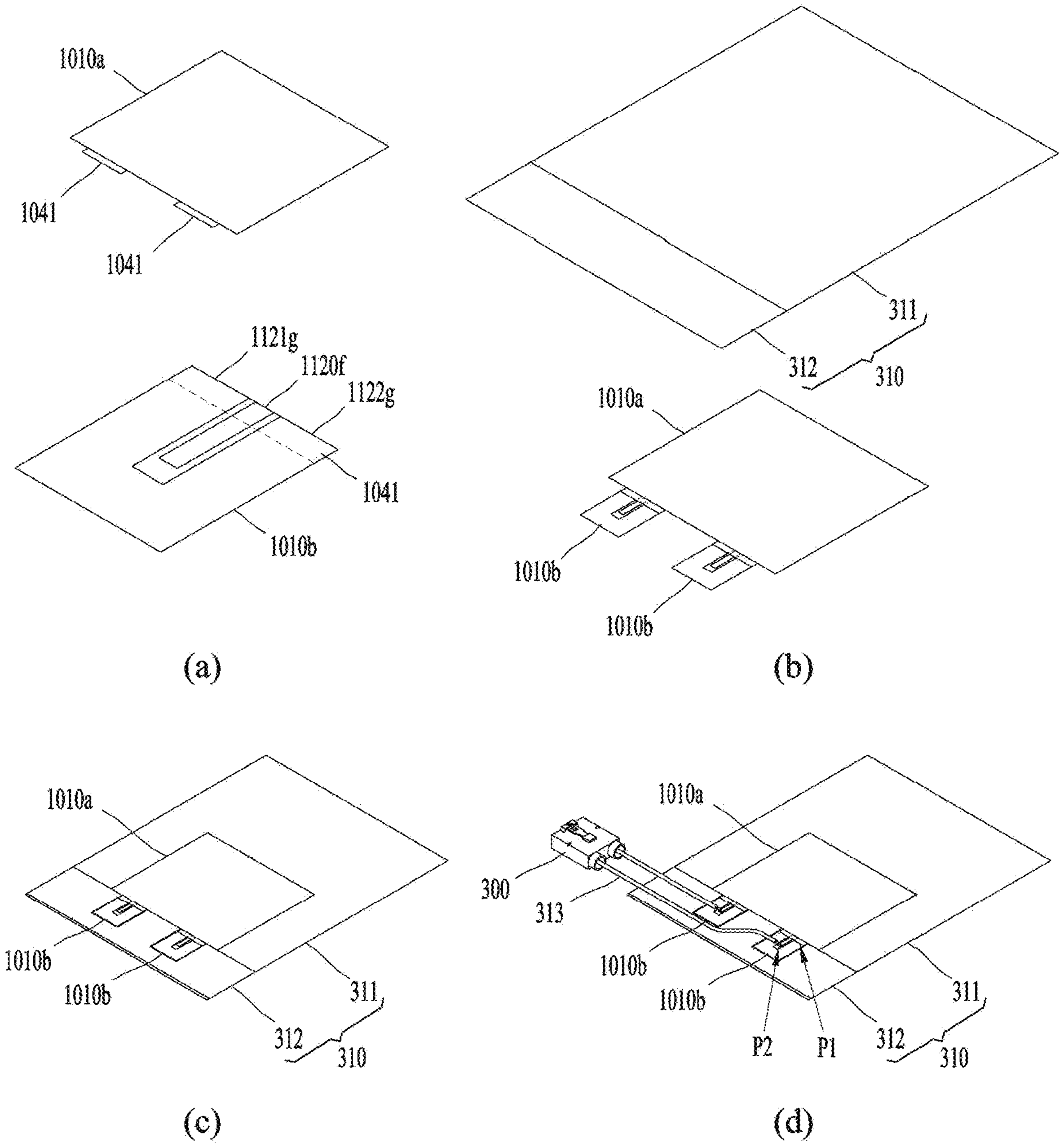
FIGS. 22A and 22B are views of the flow of processes in which an antenna assembly according to one or more embodiments is manufactured by being coupled to a glass panel.
Figure 22B:
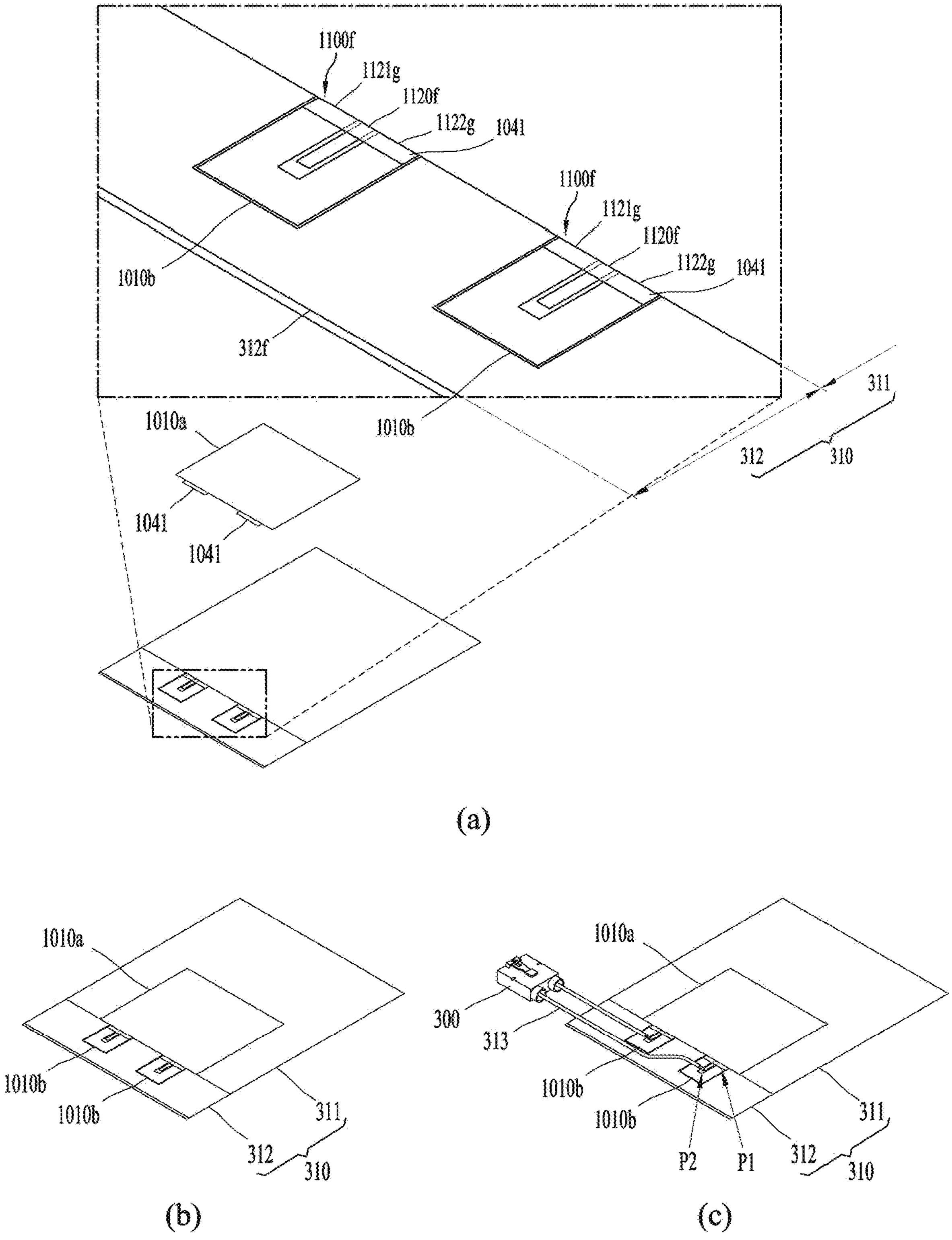

Referring to (a) of FIG. 22A, a first transparent dielectric substrate 1000*a* on which a transparent electrode layer is formed may be manufactured. In addition, a second dielectric substrate 1000*b* which includes a feeding pattern 1120*f* and ground patterns 1121*g* and 1122*g* formed on opposite sides of the feeding pattern 1120*f* may be manufactured. The second dielectric substrate 1000*b* may be implemented as an FPCB, but is not limited thereto. Adhesion regions corresponding to adhesive layers 1041 may be formed on the first transparent dielectric substrate 1000*a* and the second dielectric substrate 1000*b*, respectively.

Referring to (b) of FIG. 22A, a glass panel 310 with a transparent region 311 and an opaque region 312 may be manufactured. In addition, an antenna assembly 1000 may be manufactured by coupling at least one second dielectric substrate 1000*b* to a lower region of the first transparent dielectric substrate 1000*a*. The first transparent dielectric substrate 1000*a* and the second dielectric substrate 1000*b* may be coupled through ACF bonding or low-temperature soldering to be implemented as a transparent antenna assembly. Through this, a first conductive pattern formed on the first transparent dielectric substrate 1000*a* may be electrically connected to a second conductive pattern formed on the second dielectric substrate 1000*b*. When a plurality of antenna elements are implemented on the glass panel 310, a feeding structure 1100*f* manufactured by the second dielectric substrate 1000*b* may also be implemented as a plurality of feeding structures.

Referring to (c) of FIG. 22A, the transparent antenna assembly 1000 may be attached to the glass panel 310. In this regard, the first transparent dielectric substrate 1000*a* on which the transparent electrode layer is formed may be disposed in the transparent region 311 of the glass panel 310. In some embodiments, the second dielectric substrate 1000*b*, which is an opaque substrate, may be disposed in the opaque region 312 of the glass panel 310.

Referring to (d) of FIG. 22A, the first transparent dielectric substrate 1000*a* and the second dielectric substrate 1000*b* may be bonded at a first position P1. A connector part 313, such as a Fakra cable, may be bonded to the second dielectric substrate 1000*b* at a second position P2. The transparent antenna assembly 1000 may be coupled to a TCU 300 through the connector part 313. To this end, the second conductive pattern formed on the second dielectric substrate 1010*b* may be electrically connected to a connector on one end of the connector part 313. A connector on another end of the connector part 313 may be electrically connected to the TCU 300.

An antenna assembly of FIG. 22B has a structural difference, compared to the antenna assembly of FIG. 21C, in that an opaque substrate is not manufactured separately but is manufactured integrally with a glass panel 310. The antenna assembly of FIG. 22B is implemented in such a way that a feeding structure implemented with the opaque substrate is directly printed on the glass panel 310 rather than being separately manufactured as an FPCB.

Referring to (a) of FIG. 22B, a first transparent dielectric substrate 1000*a* on which a transparent electrode layer is formed may be manufactured. In addition, the glass panel 310 with a transparent region 311 and an opaque region 312 may be manufactured. In the process of manufacturing of the glass panel of the vehicle, metal wires/pads for connection of connectors may be implemented (fired). Like heat lines implemented on vehicle glass, a transparent antenna mounting portion may be formed in a metal form on the glass panel 310. In this regard, a second conductive pattern may be implemented in a region where an adhesive layer 1041 is formed for electrical connection to a first conductive pattern of the first transparent dielectric substrate 1000*a*.

In this regard, the second dielectric substrate 1000*b* on which the second conductive pattern is formed may be manufactured integrally with the glass panel 310. The second dielectric substrate 1000*b* may be formed integrally with the glass panel 310 in the opaque region 312 of the glass panel 310. A frit pattern 312 may be removed from the opaque region 312 where the second dielectric substrate 1000*b* is formed. The second conductive pattern may be implemented on the second dielectric substrate 1000*b* by forming a feeding pattern 1120*f* and a ground patterns 1121*g* and 1122*g* on opposite sides of the feeding pattern 1120*f*.

Referring to (b) of FIG. 22B, the transparent antenna assembly 1000 may be attached to the glass panel 310. In this regard, the first transparent dielectric substrate 1000*a* on which the transparent electrode layer is formed may be disposed in the transparent region 311 of the glass panel 310. The antenna assembly 1000 may be manufactured by coupling at least one second dielectric substrate 1000*b* to the lower region of the first transparent dielectric substrate 1000*a*. The first transparent dielectric substrate 1000*a* and the second dielectric substrate 1000*b* may be coupled through ACF bonding or low-temperature soldering to be implemented as a transparent antenna assembly. Through this, a first conductive pattern formed on the first transparent dielectric substrate 1000*a* may be electrically connected to the second conductive pattern formed on the second dielectric substrate 1000*b*. When a plurality of antenna elements are implemented on the glass panel 310, a feeding structure 1100*f* manufactured by the second dielectric substrate 1000*b* may also be implemented as a plurality of feeding structures.

Referring to (c) of FIG. 22B, the first transparent dielectric substrate 1000*a* and the second dielectric substrate 1000*b* may be bonded at a first position P1. A connector part 313, such as a Fakra cable, may be bonded to the second dielectric substrate 1000*b* at a second position P2. The transparent antenna assembly 1000 may be coupled to a TCU 300 through the connector part 313. To this end, the second conductive pattern formed on the second dielectric substrate 1010*b* may be electrically connected to a connector on one end of the connector part 313. A connector on another end of the connector part 313 may be electrically connected to the TCU 300.

Figure 23:
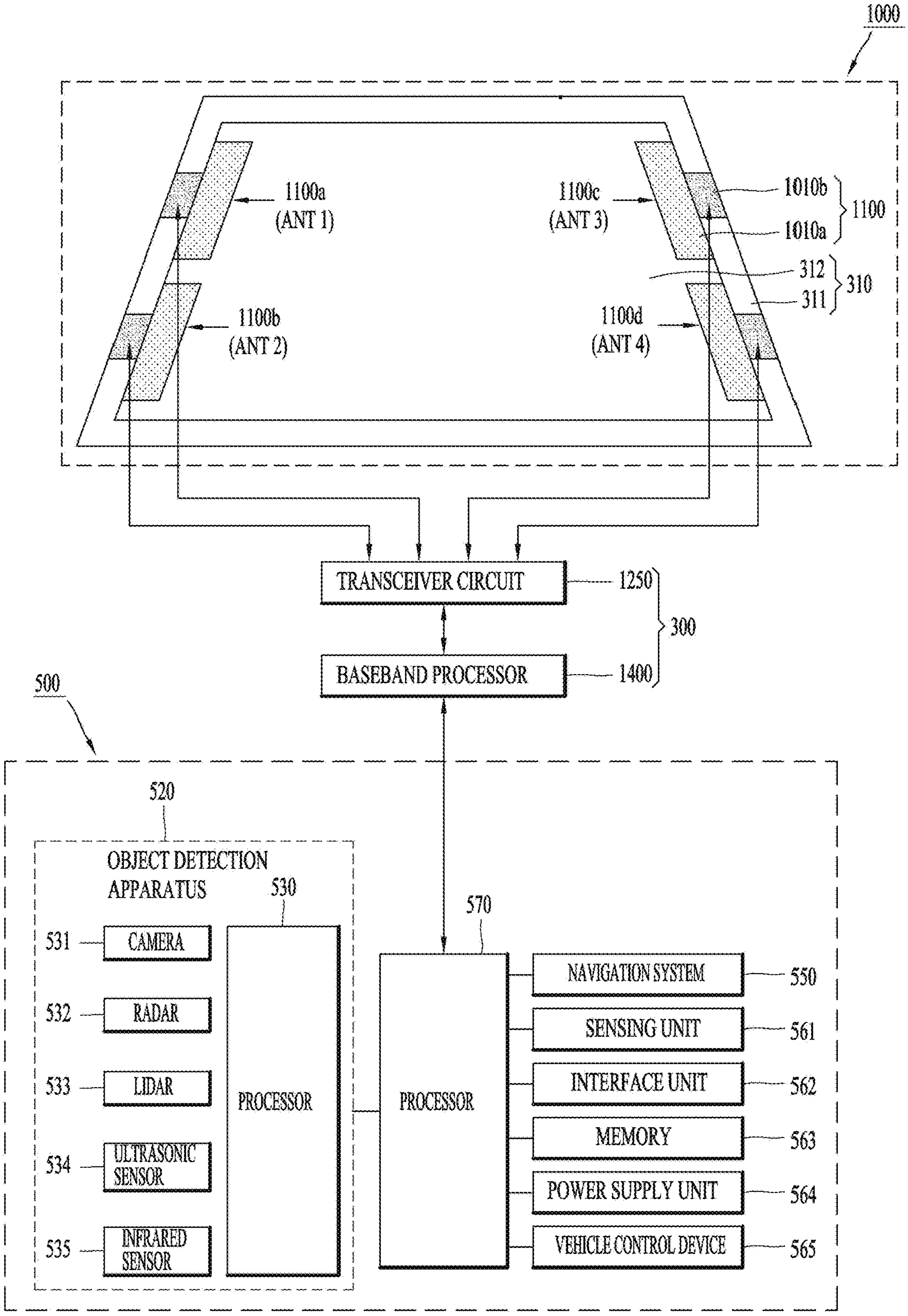
FIG. 23 is a view of an example of a configuration in which a plurality of antenna modules disposed at different positions of a vehicle are coupled with other components of the vehicle.

Hereinafter, a vehicle having an antenna module according to one aspect of the specification will be described in detail. In this regard, FIG. 23 is a view of a configuration in which a plurality of antenna modules disposed at different positions of a vehicle are coupled with other components of the vehicle.

Referring to FIGS. 1 to 23, the vehicle 500 may include a conductive vehicle body operating as an electrical ground. The vehicle 500 may include a plurality of antennas 1100*a* to 1100*d* which may be located at different positions on the glass panel 310. The antenna assembly 1000 may be configured such that the plurality of antennas 1100*a* to 1100*d* include a communication module 300. The communication module 300 may include a transceiver circuit 1250 and a processor 1400. The communication module 300 may correspond to the TCU of the vehicle or may constitute at least a portion of the TCU.

The vehicle 500 may include an object detection device 520 and a navigation system 550. The vehicle 500 may further include a separate processor 570 in addition to the processor 1400 included in the communication module 300. The processor 1400 and the separate processor 570 may be physically or functionally separated and may be implemented on one substrate. The processor 1400 may be implemented as a TCU, and the processor 570 may be implemented as an electronic control unit (ECU).

In the case where the vehicle 500 is an autonomous vehicle, the processor 570 may be an autonomous driving control unit (ADCU) integrated with the ECU. Based on information detected by a camera 531, radar 532, and/or LiDAR 533, the processor 570 may search for a path and control the vehicle 500 to be accelerated or decelerated. To this end, the processor 570 may interwork with a processor 530 corresponding to a micro control unit (MCU) arranged in the object detection device 520 and/or the communication module 300 corresponding to the TCU.

The vehicle 500 may include the first transparent dielectric substrate 1010*a* and the second dielectric substrate 1010*b* disposed on the glass panel 310. The first transparent dielectric substrate 1010*a* may be formed inside the glass panel 310 of the vehicle or may be attached to the surface of the glass panel 310. The first transparent dielectric substrate 1010*a* may be configured such that conductive patterns in the shape of metal mesh grids are formed. The vehicle 500 may include an antenna module 1100 having conductive patterns formed in a metal mesh shape on one side of the dielectric substrate 1010 to radiate radio signals.

The vehicle 500 may include the metal frame 49, the glass panel 310, and the antenna assembly 1100. The metal frame 49 may have an opening formed inside the metal frame 49, and the glass panel 310 may be arranged in the opening. The glass panel 310 may include the transparent region 311 and the opaque region 312.

The antenna assembly 1100 may include the first transparent dielectric substrate 1010*a* which is disposed in the transparent region 311 of the glass panel 310 and including the first conductive pattern 1110 and the second conductive pattern 1120. The antenna assembly 1100 may include the second transparent dielectric substrate 1010*b* which is disposed in the opaque region 312 of the glass panel 310 and including the ground conductive pattern 1110*g* and the feeding pattern 1110*g*. The first conductive pattern 1110 may include the first part 1111 and the second part 1112 perpendicular to the first part 1111. The second conductive pattern 1120 may include the third part 1121 and the fourth part 1122 perpendicular to the third part 1121.

The ground conductive pattern 1110*g* of the second dielectric substrate 1010*b* may include the first region 1111*g* and the second region 1112*g*. The second part 1112 of the first conductive pattern 1110 may be connected to the feeding pattern 1110*f*. The second conductive pattern 1120 may be connected to the first region 1111*g* of the ground conductive pattern 1110*g*.

The first region 1111*g* of the ground conductive pattern 1110*g* may be connected to the ground 313*b* of the coaxial cable 313. A portion of the first region 1111*g* of the ground conductive pattern 1110*g* may be connected to the second conductive pattern 1120. The second region 1112*g* of the ground conductive pattern 1110*g* may be configured to operate as a UHB radiator, which is higher than the operating frequency bands of the first conductive pattern 1110 and the second conductive pattern 1120.

The signal line 313*a* corresponding to one end of the coaxial cable 313 may be connected to the feeding pattern 1110*g*. The ground 313*b* of the coaxial cable 313 may be connected to the contact portion 313CP which is formed concavely to accommodate the coaxial cable 313. The contact portion 313CP may be arranged in the first sub-region 1111*g*1 of the second region 1112*g* of the ground conductive pattern 1110*g*.

The first region 1111*g* of the ground conductive pattern 1110*g* may include the first sub-region 1111*g*1 and the second sub-region 1111*g*2. The second length L2 of the second sub-region 1111*g*2 may be longer than the first length L1 of the first sub-region 1111*g*1 in the first axial direction. The second width W2 of the second sub-region 1111*g*2 may be narrower than the first width W2 of the first sub-region 1111*g*1 in the second axial direction. The coaxial cable 313 may be arranged spaced apart from the second sub-region 1111*g*2.

The second part 1112 of the first conductive pattern 1110 may be connected to the signal line 313*a* of the coaxial cable 313 through the feeding pattern 1110*f*. The fourth part 1122 of the second conductive pattern 1120 may be connected to the ground 313*g* of the coaxial cable 313 through the first sub-region 1111*g*1 of the second region 1112*g* of the ground conductive pattern 1110*g*.

The second region 1112*g* of the ground conductive pattern 1110*g* may include the third sub-region 1112*g*1 which is arranged spaced apart from one end of the feeding pattern 1110*f* and formed in a triangular shape with a certain angle of inclination. The second region 1112*g* of the ground conductive pattern 1110*g* may include the fourth sub-region 1112*g*2 which is connected to the third sub-region 1112*g*1 and is formed in a rectangular shape.

The length from the contact portion 313CP to the end of the fourth sub-region 1112*g*2 of the second region 1112*g* of the ground conductive pattern 1110*g* may be in the range from 0.5 to 1 time a specific wavelength corresponding to a specific frequency of the first frequency band.

The first conductive pattern 1110 and the second conductive pattern 1120 may operate in the dipole antenna mode in the first frequency band. The first conductive pattern 1110 and the second conductive pattern 1120 may have the asymmetrical structure. The first part 1111 of the first conductive pattern 1110 may have the upper boundary BS1 and the lower boundary BS2, each of which has the step shape. The third part 1121 of the second conductive pattern 1120 may have the upper boundary BS1 formed in the straight line shape and the lower boundary BS2 formed in the step shape.

Therefore, the first conductive pattern 1110 may operate in the monopole antenna mode in the second frequency band. The second region 1112*g* of the ground conductive pattern 1110*g* may operate as the radiator in the third frequency band. The second frequency band may be set to be higher than the first frequency band. The third frequency band may be set to be higher than the second frequency band.

The antenna assembly 1000 may include a first antenna module 1100*a* to a fourth antenna module 1100*d* to perform MIMO. The first antenna module 1100*a*, the second antenna module 1100*b*, the third antenna module 1100*c*, and the fourth antenna module 1100*d* may be disposed on the upper left, lower left, upper right, and lower right sides of the glass panel 310, respectively. The first antenna module 1100*a* to the fourth antenna module 1100*d* may be referred to as a first antenna ANT1 to a fourth antenna ANT4, respectively. The first antenna ANT1 to the fourth antenna ANT4 may be referred to as a first antenna module ANT1 to a fourth antenna module ANT4, respectively.

As described above, the vehicle 500 may include the telematics control unit (TCU) 300, which corresponds to the communication module. The TCU 300 may control signals to be received and transmitted through at least one of the first to fourth antenna modules 1100*a* to 1100*d*. The TCU 300 may include a transceiver circuit 1250 and a processor 1400.

Accordingly, the vehicle may further include the transceiver circuit 1250 and the processor 1400. A portion of the transceiver circuit 1250 may be disposed in units of antenna modules or in combination thereof. The transceiver circuit 1250 may control a radio signal of at least one of first to third frequency bands to be radiated through the antenna modules ANT1 to ANT4. The first to third frequency bands may be an LB band, an MB band, and an HB band for 4G/5G wireless communications, but are not limited thereto.

The processor 1400 may be operably coupled to the transceiver circuit 1250 and may be configured as a modem operating in a baseband. The processor 1400 may receive or transmit a signal through at least one of the first antenna module ANT1 and the second antenna module ANT2. The processor 1400 may perform a diversity operation or MIMO using the first antenna module ANT1 and the second antenna module ANT2 such that a signal is transmitted to the inside of the vehicle.

Antenna modules may be disposed in different regions of one side surface and another side surface of the glass panel 310. The antenna modules may perform MIMO by simultaneously receiving signals from the front of the vehicle. In this regard, to perform 4×4 MIMO, the antenna modules may further include the third antenna module ANT3 and the fourth antenna module ANT4 in addition to the first antenna module ANT1 and the second antenna module ANT2.

The processor 1400 may select an antenna module to perform communication with an entity communicating with the vehicle based on a driving path of the vehicle and a communication path with the entity. The processor 1400 may perform MIMO by using the first antenna module ANT1 and the second antenna module ANT2 based on a direction that the vehicle travels. Alternatively, the processor 1400 may perform MIMO through the third antenna module ANT2 and the fourth antenna module ANT4 based on the direction that the vehicle travels.

The processor 1400 may perform MIMO in a first band through at least two of the first antenna ANT1 to the fourth antenna ANT4. The processor 1400 may perform MIMO in at least one of a second band and a third band through at least two of the first antenna ANT1 to the fourth antenna ANT4.

Accordingly, when signal transmission/reception performance of the vehicle deteriorates in any one band, signal transmission/reception in the vehicle may be performed in other bands. For example, the vehicle may preferentially perform communication linkage in the first band, which is the low band, for wide communication coverage and linkage reliability, and then perform communication linkage in the second and third bands.

The processor 1400 may control the transceiver circuit 1250 to perform carrier aggregation (CA) or dual connectivity (DC) through at least one of the first antenna ANT1 to the fourth antenna ANT4. In this regard, a communication capacity may be expanded through the aggregation of the second band and the third band, which are wider than the first band. In addition, communication reliability may be improved through the DC with neighboring vehicles or entities by using the plurality of antenna elements disposed at the different regions of the vehicle.

The foregoing description has been given of the broadband transparent antenna assembly, which may be arranged on the vehicle glass formed in the metal frame, and the vehicle having the same. Hereinafter, the technical effects of the broadband transparent antenna assembly, which may be arranged on the vehicle glass formed in the metal frame, and the vehicle having the same will be described.

According to the specification, 4G/5G broadband wireless communications in a vehicle may be enabled by providing a broadband transparent antenna assembly, which may be arranged on vehicle glass and includes conductive patterns and an FPCB stub structure.

According to the specification, antenna efficiency may be improved by optimizing the shapes of conductive patterns and an FPCB stub shape and employing an asymmetrical antenna structure in a broadband transparent antenna assembly, which may be arranged on vehicle glass.

According to the specification, a broadband antenna structure made of a transparent material, which may improve antenna efficiency, may be implemented by setting a different antenna operation mode for each frequency band while reducing feeding loss.

According to the specification, a broadband antenna structure considering an actual environment, in which the broadband antenna structure is attached to a vehicle, by analyzing the change in antenna performance according to the affection by a metal chassis as well as a glass panel of the vehicle and a cable structure.

According to the specification, a CPW FPCB stub structure may be provided to improve degradation of antenna performance in a UHB band of 4 GHz to 6 GHz due to a coaxial cable, which is arranged perpendicular to a CPW feeding line.

According to the specification, a transparent antenna structure, which enables wireless communications in 4G and 5G frequency bands while minimizing changes in antenna performance and a difference in transparency between an antenna region and a surrounding region, may be provided.

Further scope of applicability of the disclosure will become apparent from the following detailed description. It should be understood, however, that the detailed description and specific examples, such as the preferred embodiments, are given by way of illustration only, since various changes and modifications within the technical idea and scope of the disclosure will be apparent to those skilled in the art.

In relation to the aforementioned disclosure, the design and operations of an antenna assembly having transparent antennas and a vehicle controlling the same may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna assembly comprising:

a first dielectric substrate forming a transparent region, and comprising a first conductive pattern and a second conductive pattern; and a second dielectric substrate forming an opaque region, and comprising a ground conductive pattern and a feeding pattern, wherein:

the first conductive pattern comprises a first part and a second part substantially perpendicular to the first part;

the second conductive pattern comprises a third part and a fourth part substantially perpendicular to the third part, the ground conductive pattern of the second dielectric substrate comprises a first region and a second region;

the second part of the first conductive pattern is connected to the feeding pattern, and the fourth part of the second conductive pattern is connected to the first region of the ground conductive pattern;

the first region of the ground conductive pattern is connected to a ground of a coaxial cable, and a portion of the first region is connected to the second conductive pattern; and the second region of the ground conductive pattern operates as a radiator of an ultra high band (UHB) frequency band, which is higher than respective operating frequency bands of the first conductive pattern and the second conductive pattern.

2. The antenna assembly of claim 1, wherein:

a signal line corresponding to one end of the coaxial cable is connected to the feeding pattern; and the ground of the coaxial cable is connected to a contact portion formed concavely to receive the coaxial cable; and the contact portion is arranged at a first sub-region of the first region of the ground conductive pattern.

3. The antenna assembly of claim 2, wherein:

the first region of the ground conductive pattern comprises the first sub-region and a second sub-region;

a second length of the second sub-region is longer than a first length of the first sub-region in a first direction;

a second width of the second sub-region is narrower than a first width of the first sub-region in a second direction; and the coaxial cable is spaced apart from the second sub-region.

4. The antenna assembly of claim 3, wherein the second region of the ground conductive pattern comprises:

a third sub-region spaced apart from one end of the feeding pattern and formed in a rectangular shape having a first width in the second direction; and a fourth sub-region connected to the third sub-region; and formed in a rectangular shape having a third width narrower than the first width in the second direction.

5. The antenna assembly of claim 3, wherein the second region of the ground conductive pattern comprises:

a third sub-region spaced apart from one end of the feeding pattern and formed in a triangular shape having an inclined side; and a fourth sub-region connected to the third sub-region and formed in a rectangular shape.

6. The antenna assembly of claim 5, wherein a length from the contact portion to an end of the fourth sub-region of the second region of the ground conductive pattern is in a range of 0.5 to 1 times a specific wavelength corresponding to a specific frequency of the UHB.

7. The antenna assembly of claim 5, wherein the second region of the ground conductive pattern is arranged below the second part of the first conductive pattern with respect to the second direction.

8. The antenna assembly of claim 5, wherein:

the first conductive pattern and the second conductive pattern are formed at to have a first height in the second direction;

the fourth part of the second conductive pattern comprises a slot region having a second height in the second direction; and the second height of the slot region is at least 0.5 times the first height.

9. The antenna assembly of claim 2, wherein the second part of the first conductive pattern is connected to the signal line of the coaxial cable through the feeding pattern, and the fourth part of the second conductive pattern is connected to the ground of the coaxial cable through the first sub-region of the first region of the ground conductive pattern.

10. The antenna assembly of claim 1, wherein:

the first conductive pattern and the second conductive pattern operate in a dipole antenna mode in a first frequency band;

the first conductive pattern and the second conductive pattern form an asymmetrical structure; and the first part of the first conductive pattern has an upper end and a lower end each formed to have a stepped shape, and the third part of the second conductive pattern has a lower end formed to have a stepped shape.

11. The antenna assembly of claim 10, wherein:

the first conductive pattern operates in a monopole antenna mode in a second frequency band;

the second region of the ground conductive pattern operates as a radiator in a third frequency band; and the second frequency band is higher than the first frequency band, and the third frequency band is higher than the second frequency band.

12. The antenna assembly of claim 1, wherein:

the first conductive pattern and the second conductive pattern are formed in a metal mesh shape with a plurality of open regions on the first dielectric substrate;

the first conductive pattern and the second conductive pattern form a radiator region; and the first conductive pattern and the second conductive pattern form a coplanar waveguide (CPW) structure on the first dielectric substrate.

13. The antenna assembly of claim 12, further comprising a plurality of dummy mesh grid patterns on at an outer portion of the radiator region on the first dielectric substrate, wherein:

the plurality of dummy mesh grid patterns are not connected to the feeding pattern and the ground conductive pattern; and the plurality of dummy mesh grid patterns are separated from each other.

14. A glass panel assembly comprising:

a transparent region;

an opaque region formed outside the transparent region; and an antenna assembly arranged on the transparent region and comprising:

a first dielectric substrate arranged in the transparent region and comprising a first conductive pattern and a second conductive pattern; and a second dielectric substrate arranged in the opaque region and comprising a ground conductive pattern and a feeding pattern, wherein:

the first conductive pattern comprises a first part and a second part substantially perpendicular to the first part;

the second conductive pattern comprises a third part and a fourth part substantially perpendicular to the third part;

the ground conductive pattern of the second dielectric substrate comprises a first region and a second region;

the second part of the first conductive pattern is connected to the feeding pattern, and the fourth part of the second conductive pattern is connected to the first region of the ground conductive pattern;

the first region of the ground conductive pattern is connected to a ground of a coaxial cable and a portion of the first region is connected to the second conductive pattern; and the second region of the ground conductive pattern operates as a radiator of an ultra high band (UHB) frequency band which is higher than respective operating frequency bands of the first conductive pattern and the second conductive pattern.

15. The vehicle-glass panel assembly of claim 14, wherein:

a signal line corresponding to one end of the coaxial cable is connected to the feeding pattern;

the ground of the coaxial cable is connected to a contact portion formed concavely to receive the coaxial cable; and the contact portion is arranged at a first sub-region of the first region of the ground conductive pattern.

16. The glass panel assembly of claim 15, wherein:

the first region of the ground conductive pattern comprises the first sub-region and a second sub-region;

a second length of the second sub-region is longer than a first length of the first sub-region in a first direction;

a second width of the second sub-region is narrower than a first width of the first sub-region in a second direction; and the coaxial cable is spaced apart from the second sub-region.

17. The glass panel assembly of claim 16, wherein the second region of the ground conductive pattern comprises:

a third sub-region spaced apart from one end of the feeding pattern; and formed in a triangular shape having an inclined side; and a fourth sub-region connected to the first sub-region and formed in a rectangular shape.

18. The glass panel assembly of claim 17, wherein a length from the contact portion to an end of the fourth sub-region of the second region of the ground conductive pattern is in a range of 0.5 to 1 times a specific wavelength corresponding to a specific frequency of a first frequency band.

19. The glass panel assembly of claim 15, wherein the second part of the first conductive pattern is connected to the signal line of the coaxial cable through the feeding pattern, and the fourth part of the second conductive pattern is connected to the ground of the coaxial cable through the first sub-region of the first region of the ground conductive pattern.

20. The glass panel assembly of claim 14, wherein:

the first conductive pattern and the second conductive pattern operate in a dipole antenna mode in a first frequency band;

the first conductive pattern and the second conductive pattern form an asymmetrical structure; and the first part of the first conductive pattern has an upper end and a lower end each formed to have a stepped shape;

the third part of the second conductive pattern has a lower end formed to have a stepped shape;

the first conductive pattern operates in a monopole antenna mode in a second frequency band;

the second region of the ground conductive pattern operates as a radiator in a third frequency band; and the second frequency band is higher than the first frequency band, and the third frequency band is higher than the second frequency band.

* * * * *